US006934690B1

(12) United States Patent
Van Horn et al.

(10) Patent No.: US 6,934,690 B1
(45) Date of Patent: Aug. 23, 2005

(54) SYSTEM AND METHOD FOR EXTENSION OF GROUP BUYING THROUGHOUT THE INTERNET

(75) Inventors: Tom Van Horn, Bellevue, WA (US); Jon C. Engman, Redmond, WA (US); Richard V. Halbert, Redmond, WA (US); Niklas Gustafsson, Bellevue, WA (US); Dale A. Woodford, Redmond, WA (US); Jerome P. Pache, Seattle, WA (US); Greg C. Dean, Redmond, WA (US)

(73) Assignee: Vulcan Portals, Inc., Seattle, WA (US)

( * ) Notice: Subject to any disclaimer, the term of this patent is extended or adjusted under 35 U.S.C. 154(b) by 0 days.

(21) Appl. No.: 09/409,237

(22) Filed: Sep. 30, 1999

Related U.S. Application Data

(60) Provisional application No. 60/142,471, filed on Jul. 6, 1999.

(51) Int. Cl.[7] .................................................. G06F 17/60
(52) U.S. Cl. ........................................ 705/26; 705/27
(58) Field of Search ..................................... 705/26, 27

(56) References Cited

U.S. PATENT DOCUMENTS

| | | |
|---|---|---|
| 3,581,072 A | 5/1971 | Nymeyer |
| 4,567,359 A | 1/1986 | Lockwood |
| 4,789,928 A | 12/1988 | Fujisaki |
| 4,949,248 A | 8/1990 | Caro |
| 5,148,365 A | 9/1992 | Dembo |
| 5,255,184 A | 10/1993 | Hornick et al. |
| 5,270,921 A | 12/1993 | Hornick |
| 5,377,095 A | 12/1994 | Maeda et al. |
| 5,576,951 A | 11/1996 | Lockwood |
| 5,640,569 A | 6/1997 | Miller et al. |
| 5,712,985 A | 1/1998 | Lee et al. |
| 5,724,521 A | 3/1998 | Dedrick |

(Continued)

FOREIGN PATENT DOCUMENTS

| | | |
|---|---|---|
| WO | WO 00/30004 | 5/2000 |
| WO | WO 00/30005 | 5/2000 |
| WO | WO 00/34841 | 6/2000 |
| WO | WO 00/34842 | 6/2000 |
| WO | WO 00/34843 | 6/2000 |
| WO | WO 00/34886 | 6/2000 |
| WO | WO 00/43928 | 7/2000 |
| WO | WO 00/43929 | 7/2000 |
| WO | WO 00/43938 | 7/2000 |
| WO | WO 00/45318 | 8/2000 |

OTHER PUBLICATIONS

US 6,000,826, 12/1999, Parunak et al. (withdrawn)
Bailey et al.; "An Exploratory Study of the Emerging Role of Electronic Intermediaries," International Journal of Electronic Commerce, vol. 1, n3, p. 7–20, Spring 1997.*

(Continued)

*Primary Examiner*—Jeffrey A. Smith
*Assistant Examiner*—Forrest Thompson
(74) *Attorney, Agent, or Firm*—Fenwick & West LLP

(57) ABSTRACT

A method and system are provided that enable partner sites to join in the sale of products/services via a PowerBuy business method. A seller registers a list of products/services to be displayed on partner sites. Customers/visitors who access partner sites may link to one or more PowerBuys conducted on an owner's main site. Accordingly, the method and system enable a super demand aggregation for products/services offered for sale by the PowerBuy business method. The invention provides a partner menu tree that allows partners to pre-select products/categories for display to customers linking to the PowerBuy from their partner site. Sellers may provide particular products, services, categories, and abstract terms to help partners select which products/services to display for customers from among all the PowerBuy products/services. The invention has applicability to sales paradigms other than the PowerBuy business method.

40 Claims, 13 Drawing Sheets

U.S. PATENT DOCUMENTS

| | | | |
|---|---|---|---|
| 5,727,165 A | | 3/1998 | Ordish et al. |
| 5,729,700 A | | 3/1998 | Melnikoff |
| 5,745,882 A | | 4/1998 | Bixler et al. |
| 5,758,327 A | | 5/1998 | Gardner et al. |
| 5,758,328 A | | 5/1998 | Giovannoli |
| 5,765,143 A | | 6/1998 | Sheldon et al. |
| 5,794,207 A | | 8/1998 | Walker et al. |
| 5,794,219 A | | 8/1998 | Brown |
| 5,797,127 A | | 8/1998 | Walker et al. |
| 5,799,284 A | | 8/1998 | Bourquin |
| 5,806,047 A | | 9/1998 | Hackel et al. |
| 5,809,144 A | | 9/1998 | Sirbu et al. |
| 5,818,914 A | | 10/1998 | Fujisaki |
| 5,826,244 A | | 10/1998 | Huberman |
| 5,832,459 A | | 11/1998 | Cameron et al. |
| 5,835,896 A | | 11/1998 | Fisher et al. |
| 5,842,178 A | | 11/1998 | Giovannoli |
| 5,845,265 A | | 12/1998 | Woolston |
| 5,845,266 A | | 12/1998 | Lupien et al. |
| 5,890,137 A | | 3/1999 | Koreeda |
| 5,890,138 A | | 3/1999 | Godin et al. |
| 5,895,454 A | | 4/1999 | Harrington |
| 5,897,639 A | | 4/1999 | Greef et al. |
| 5,913,210 A | | 6/1999 | Call |
| 5,915,209 A | | 6/1999 | Lawrence |
| 5,933,811 A | * | 8/1999 | Angles et al. ............... 705/27 |
| 5,950,176 A | | 9/1999 | Keiser et al. |
| 5,956,709 A | | 9/1999 | Xue |
| 5,970,475 A | * | 10/1999 | Barnes et al. ............... 705/26 |
| 5,983,199 A | | 11/1999 | Kaneko |
| 5,991,740 A | * | 11/1999 | Messer ...................... 705/27 |
| 6,014,644 A | | 1/2000 | Erickson |
| 6,021,398 A | | 2/2000 | Ausubel |
| 6,026,383 A | | 2/2000 | Ausubel |
| 6,035,288 A | | 3/2000 | Solomon |
| 6,041,308 A | | 3/2000 | Walker et al. |
| 6,055,504 A | | 4/2000 | Chou et al. |
| 6,067,528 A | | 5/2000 | Breed et al. |
| 6,076,070 A | | 6/2000 | Stack |
| 6,078,897 A | | 6/2000 | Rubin et al. |
| 6,081,789 A | | 6/2000 | Purcell |
| 6,085,169 A | | 7/2000 | Walker et al. |
| 6,101,484 A | | 8/2000 | Halbert et al. |
| 6,112,189 A | | 8/2000 | Rickard et al. |
| 6,119,101 A | | 9/2000 | Peckover |
| 6,141,653 A | | 10/2000 | Conklin et al. |
| 6,141,666 A | * | 10/2000 | Tobin ......................... 705/27 |
| 6,260,024 B1 | * | 7/2001 | Shkedy ....................... 705/26 |
| 6,269,343 B1 | | 7/2001 | Pallakoff |
| 6,332,129 B1 | | 12/2001 | Walker et al. |
| 6,418,415 B1 | * | 7/2002 | Walker et al. ............... 705/26 |
| 6,473,740 B2 | * | 10/2002 | Cockrill et al. .............. 705/27 |
| 6,584,451 B1 | * | 6/2003 | Shoham et al. .............. 705/26 |
| 6,604,089 B1 | * | 8/2003 | Van Horn et al. ........... 705/26 |
| 6,631,356 B1 | * | 10/2003 | Van Horn et al. ........... 705/26 |

OTHER PUBLICATIONS

Negromante, Nicholas; "Psst? Transactions," Forbes, 80th Issue, Jul. 7, 1997.*

U.S. Appl. No. 60/097,933, filed Sep. 1998, Matthew Pallakoff.*

U.S. Appl. No. 60/097,932, filed Sep. 1998, Matthew Pallakoff.*

An Exploratory Study of the Emerging Role of Electronic Intermediaries, by Joseph B. Bailey and Yannis Bakos, International Journal of Electronic Commerce, vol. 1, No. 3, Spring 1997, pp. 7–20 . (Document submitted includes Abstract and pages numbered 1–14.)

Internet World (Mecklemedia), Cliff Figallo, "Hosting Web Communities," Building Relationships, Increasing Customer Loyality, and Maintaining a Competitive Edge. Published by John Wiley & Sons, Inc, Copyright 1998.

Online document from Savvio.com, "Savvio.com: Our Story," wysiwyg://8/http://www.savvio.com/about/aboutUS.jsp, Printed Sep. 28, 2000.

"Retail Federation Group Buying Set," HDF–The Weekly Home Furnishings Newspaper, v0, n0, p. 9, Dec. 26, 1994.

"Frontier Rings Up a Sale with National Retail Federation," PR Newswire, p119NYM057, Jan. 19, 1998.

"Retail Federation Group Buying Set," HFD–The Weekly Furnishings Newspaper, v68, n52, p. 9(1), Dec. 26, 1994.

"Mosher view ARA as survival kit for small specialty stores," Daily News Record, v24, n22, p. 4(1), Feb. 2, 1994.

"KMART" Targets GE as EDI Provider Signals GE's Re–Commitment to EDI, EDI News, v11, n21, Oct. 13, 1997.

"National Federation Selects GE Information Services for EDI Service Partnership," PR Newswire, p1006DCM009, Oct. 6, 1997.

Mielczarski, W.; Michalik, G.; Widjaja, M.; "Bidding strategies in electricity markets," PIC Proceedings of the $21^{st}$ 1999 IEEE International Conference, p. 71–76, May 16–21, 1999, Cat. #99CH36351, 1999.

Press Release from MobShop, formerly known as Accompany, Inc., obtained from the Internet at http://www.mobshop.com/press_release?release=20 on Apr. 2000, which explains that Accompany, Inc. received Notice of Allowance from the U.S. Patent & Trademark Office.

Press Release from iCoop, Inc. obtained from the Internet at http://www.icoop.com/press_pressreleases2.htm on Apr. 10, 2000, which explains that iCoop, Inc. has filed two patent applications and has provisional patent applications which were filed on Jan. 22, 1999.

Press Release from beMANY! obtained from the Internet at http://www.bemany.com/press02112000_bemany.html on Apr. 10, 2000, which explains that beMany! has a "patent pending process".

Press Release from the company BazaarE.com obtained from the Internet at http://www.bazzare.com/pr_03111999.cfm?CFID=62916& CFTOKEN=75630214 on Apr. 10, 2000, which explains that BazaarE.com has a "patent–pending platform."

Search Report (Ref.: COOL01–10024).

Online Document: Cooperative Educational Service Agency 5 "Cooperative Buying," http://www.cesa5.K12.us/buying htm, Printed Sep. 20, 1999.

Online Document: :Cooperative Purchasing, http:/www.cynric.org/OCM/administration/management/services/coop.html, Printed Sep. 20, 1999.

Online Document from Franklin Regional Counsel of Governments, :Cooperative Bidding and Purchasing—Western Massachusetts, http://www.frcog.org/purch.html, Printed Sep. 20, 1999.

Dialog , The Gale Group Newsletter, "New Twist to Online Shopping: Service Hopes to Break Customer Apathy," Internet Week, 1(7), May 22, 1995.

Dialog , The Gale Group Newsletter, "In Year 2020, Auctions and Agents to Rule Web," Newsbytes,Mar. 23, 1998.

Dialog, "New Tricks in Pet Supplies," by Minkoff, J., Discount Merchandiser, 34 (12) 70–72, 1994.

Online Document from Software Patent Institute Database of Software Technology, http://m.spi.org/, Record 1: "Management Data Processing," Ser. No. acmr6512.0039, Printed Sep. 20, 1999.
Online Document from Software Patent Institute Database of Software Technology, http://m.spi.org/, Record 2: "Management Science," Ser. No. ACMGCL89.1066, Printed Sep. 20, 1999.
Online Document from Software Patent Institute Database of Software Technology, http://m.spi.org/, Record 17: "Distribution Resource Planning," Ser. No. HPAPPS.2620, Printed Sep. 20, 1999.
Online Document from IBM Intellectual Property Network, http://www.patents.ibm.com/, Titled: Personalized Optimized Decision/Transaction Program, Jan. 1995, Reprinted Nov. 24, 1999.
Online Document from Agorics, Inc., http://www.agorics.com/, Sections: "A Survey of Auctions," "English Auction," "A Dutch Auction," "The First Price Auction," "The Vickrey Auction," "The Double Auction," "Auction Offshoots," "Auction Strategies," "Auction Histories," "Government Securities—Auctioned Off," "Collusion in Auctions," "Auction Bibliography," Dated 1996, Reprinted Oct. 25, 1999.
Online Document from Forbes.com, http://www.forbes.com, Forbes Global, Computer Science Section of Dec. 28, 1998, "Comming Soon–Cyber Co–ops" by Karlgaard, Printed Nov. 16, 1999.
Management and Specialist Team, LetsBuyIt.com, http://www.euroferret.com, Jan. 15, 1999; Online Document, http://www.alumni.se/e–commerce/default.htm, Jan. 15, 1999, Printed Nov. 19, 1999.
Online Document from Bid.com, http://www.bid.com/dutch, Printed Sep. 03, 1999.
Online Document from Bullnet Online Auctions, http://www.bullnet.co.uk/auctions/info.htm, Printed Sep. 03, 1999.
Online Document from Who's Who for The Commerce Standard, http://www.gii.com/standard/who/index.html. Printed Nov. 19, 1999.
Online Document from Klik–Klok Online Dutch Auction, http://www.klik–klok.com/how.htm, printed Sep. 1999.
Online Document, ComputerSweden, "Icon–grundare satsar närmare halv miljard på e–handel," http://nyheter.idg.se, Jan. 23, 1999 (w/English translation).
Online Document from, Artiklar från AffärsData ("Resumé", http://www.ad.se, Feb. 25, 1999 (w/English translation).
Online Document from ComputerSweden, "Kjell Spåangberg . . . ," http://nyheter,idg.se, Mar. 3, 1999 (with English Translation).
Online Document from Accompany: About Team, http://www.accompany.com/about_press_faq.asp, Printed Mar. 3, 1999.
Online Document from Accompany: About US, http://www.accompany.com/about_press_0.asp, Printed Mar. 3, 1999.
Online Document from Accompany: About Team, http://www.accompany.com/about_team.asp, Printed Mar. 3, 1999.
Online Document from Accompany: About Team Advisors, http://www.accompany.com/ablut_team_advisors.asp, Printed Mar. 3, 1999.

Online Document from Accompany: About Team, http://www.accompany.com/about_press_analyst.asp, Printed Mar. 3, 1999.
Online Document from Accompany: About Team Advisors, http://www.accompany.com/about_teampartners.asp, Printed Mar. 3, 1999.
Online Document from Accompany: Contact, http://www.accompany.com/about_contact.asp, Printed Mar. 3, 1999.
Online Document from Ask Reggie Domain Search, Accompany.com Domain contacts, http://www.askreggie.com, Printed Mar. 3, 1999.
Online Document from Accompany: About US, http://www.accompany.com/about_press_background.asp, Printed Mar. 3, 1999.
Online Document from ZDNN, http://www.zdnet.com/stories/news, Printed Mar. 3, 1999.
NewsAlert, "Accompany, Inc. to Revolutionize Commerce; Buys Come Together for Best Value," http://www.accompany.com, Printed Mar. 3, 1999.
Online Document from Yahoo, "Web startup pushes volume shopping," http://dailynews.yahoo.com, Printed Mar. 4, 1999.
Online Document from Dagens Industri, "Rush into Net–shopping," http://www.di.se/Scripts/, Document dated Mar. 12, 1999, Printed Jan. 19, 2000 (with English Translation).
Online Document, "US–IL–Chicago–Cargo Revenue Management Analyst," "US–IL–Chicago—Revenue Manager," "US–IN–Indianapolis—Yield Analyst," "US–CA–San Jose—Financial Analyst," http://jobsearch.monster.com, Printed Mar. 24, 1999.
Online Document from hotjobs.com, "Filenet Corporation," http://www.hotjobs.com, Printed Mar. 24, 1999.
Online Document from The Revenue Management Home Page, "Revenue Management Defined," wysiwyg://212/http://www.geocities.com/WallStreet/Floor/4921/, Printed Mar. 18, 1999.
Online Document from The Revenue Management Home Page, "Articles on Revenue Management," wysiwyg://212/http://www.geocities.com/WallStreet/Floor/4921/articles.htm, Printed Mar. 18, 1999.
Online Document from The Revenue Management Home Page, "Companies Practicing Revenue Management," wysiwyg://212/http://www.geocities.com/WallStreet/Floor/4921/rmcomps.htm, Printed Mar. 18, 1999.
Online Document from Revenue Management Systems, Inc., "What is Revenue Management?" http://www.revenuemanagement.com/whatisrm.htm, Printed Mar. 19, 1999.
Online Document from profitoptim.com, "Definition of Revenue Management," http://www.profitoptim.com/papersdirectory/rmdaybrief/sld063.htm, Printed Mar. 19, 1999.
Online Document from profitoptim.com, "What is Revenue Management (cont.)?" http://www.profitoptim.com/papers-directory/resexpo97/sld006.htm, Printed Mar. 19, 1999.
Online Document from Amerian Way, "How Airline Pricing Works," http://www.aa.com/away/Vantage/Vantage–may98.htm, Printed Mar. 18, 1999.
Online Document from the Airline Discount, http://faculty.darden.edu/pfeiferp/airline.htm, Printed Mar. 18, 1999.
Online Document from The Innovation Network, "1994 Innovation Collection," http://198.49.220.47/texis/si/sc/i...e/+KoeMUi3WwBme+It0X0www/full.html, Printed Mar. 19, 1999.

Online Article by W. Lieberman of Veritec Solutions, Inc., "Yield Management: System or Program?"http://www.vertitecsolutions.com, Site visited on Mar. 19, 1999.

Online Article by W. Lieberman of Veritec Solutions, Inc., "Making Yield Management Work for You: Ten Steps to Enhanced Revenues," http://www.veritecsolutions.com, Site visited on Mar. 19, 1999.

Online Article by W. Lieberman of Veritec Solutions, Inc., "Debunking the Myths of Yield Mangement" http://www.veritecsoultions.com, Site visited on Mar. 19, 1999.

Online Document from StoreSearch Internet Shopping Guide, http://www.storesearch.com/, Site visited on Aug. 31, 1999.

Online Document from Netscape Netcenter, http://hsop.netscape.com/auctions/main.adp, Site visited on Aug. 31, 1999.

Online Document from Yahoo! Auctions, http://auctions.yahoo.com/, Site visited on Aug. 31, 1999.

Online Document from Lycos: Sales & Speicals, http://www.lycos.com/Shopping/sales_and_specoals/, Sited visited on Aug. 31, 1999.

Hutchinson, "E–Commerce: Building a Model," Communications Week, pp. 57–60, Mar. 17, 1997.

M2 Communications, "Icentral Inc: Web Retailers Band Together to Build Traffic and Sales," M2 Presswire, Feb. 25, 1997.

Berryman et al., "Electronic commerce: Three Emerging Strategies," McKinsey Quarterly, No. 1, pp. 152–159, 1998.

"BuyItOnline Revolutionizes Internet Retailing for Small Business Merchants," Business Wire, Sep. 8, 1998.

Abstract, World Reporter, Dagens Industri, "Expected success for internet shopping," WL 5900897, Mar. 12, 1999.

U.S. Appl. No. 60/119,220 Filing Receipt and Specification, "A method and apparatus for creating and managing groups for increasing buying power on the World Wide Web," Feb. 8, 1999.

Article from Sportfack, "Letsbuyit.com Kommer," Feb. 12, 1999 (with English Translation).

IBM Technical Disclosure Bulletin, "Multi–Product Delivery System Optimization Procedure," 38(4):502–503, Apr. 1995.

Kroll et al., "World Weary Web," Forbes, Dec. 28, 1998, pp. 98–100.

Pant et al., "Business on the Web: Strategies and Economics," Fifth International WWW Conferece, May 6–10, 1996, Paris, France.

Rockoff et al., "Design of an Internet–based System for Remote Dutch Auctions," *Internet Research: Electronic Networking Applications and Policy,* 5(4):10–16, 1995.

Stang et al., "Scans" Section, *Wired,* Sep. 1995, pp. 51–54, 56, and 58.

Woolley, "Price War?," *Forbes,* Dec. 14, 1998, pp. 182 and 184.

* cited by examiner

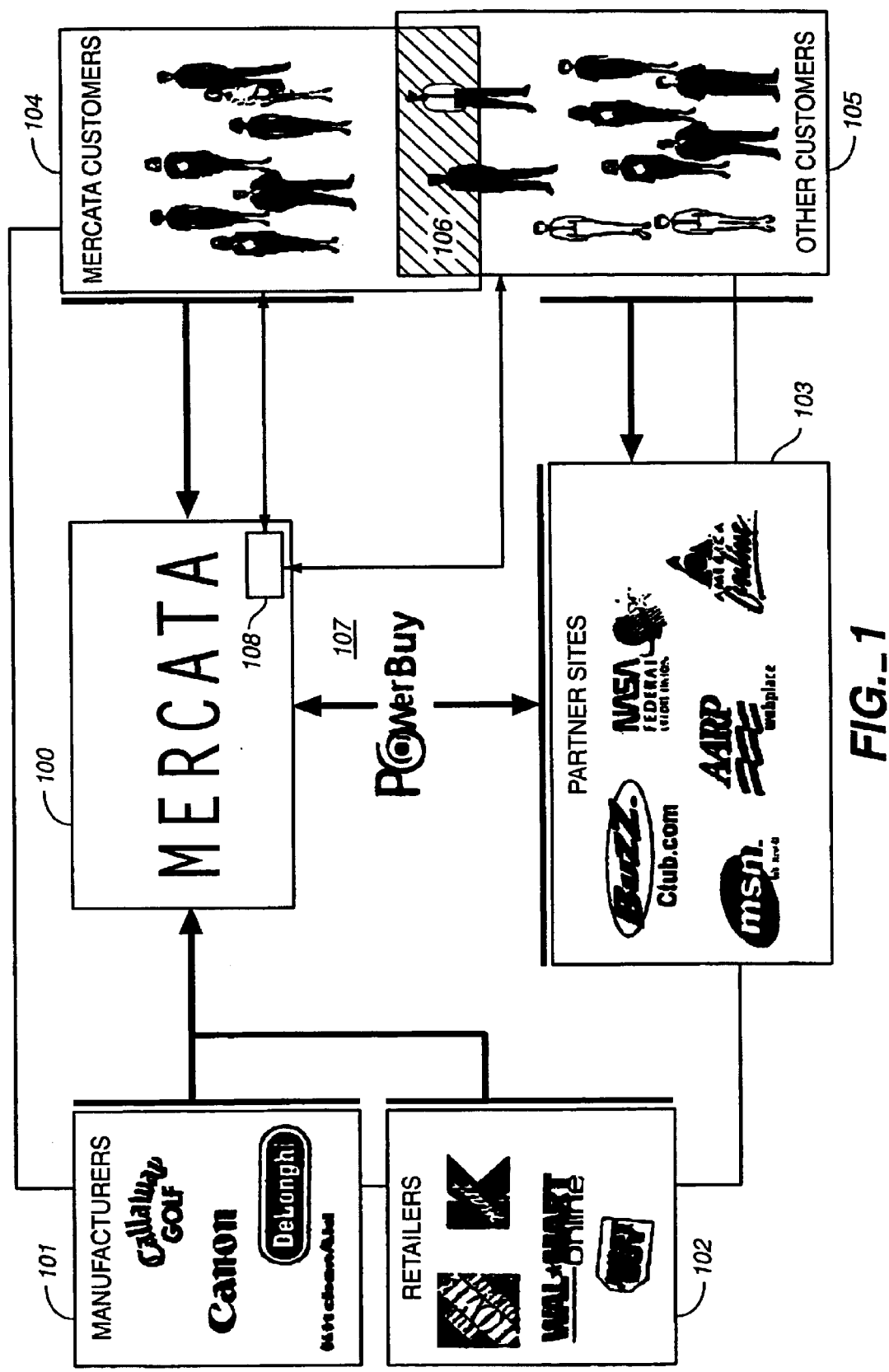
FIG._1

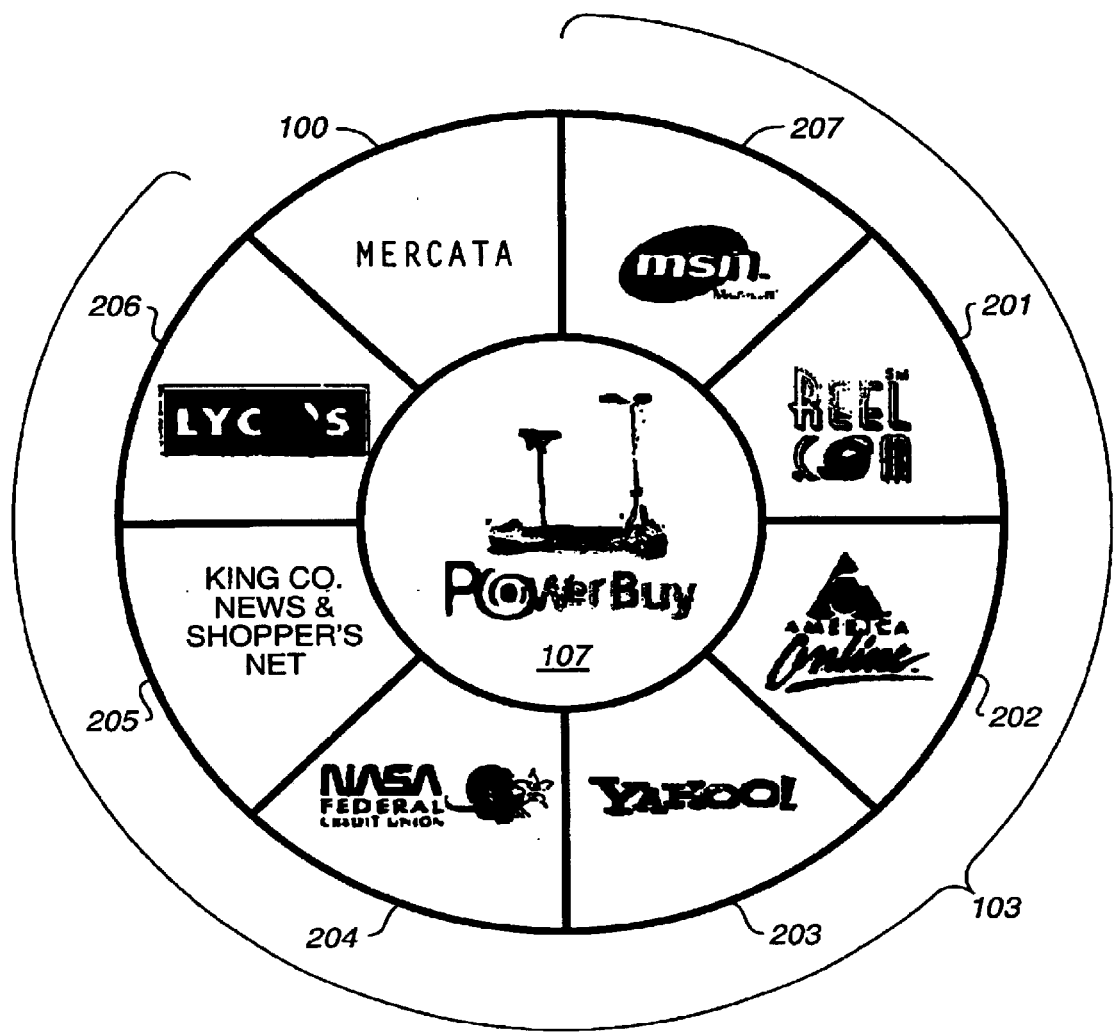
FIG._2

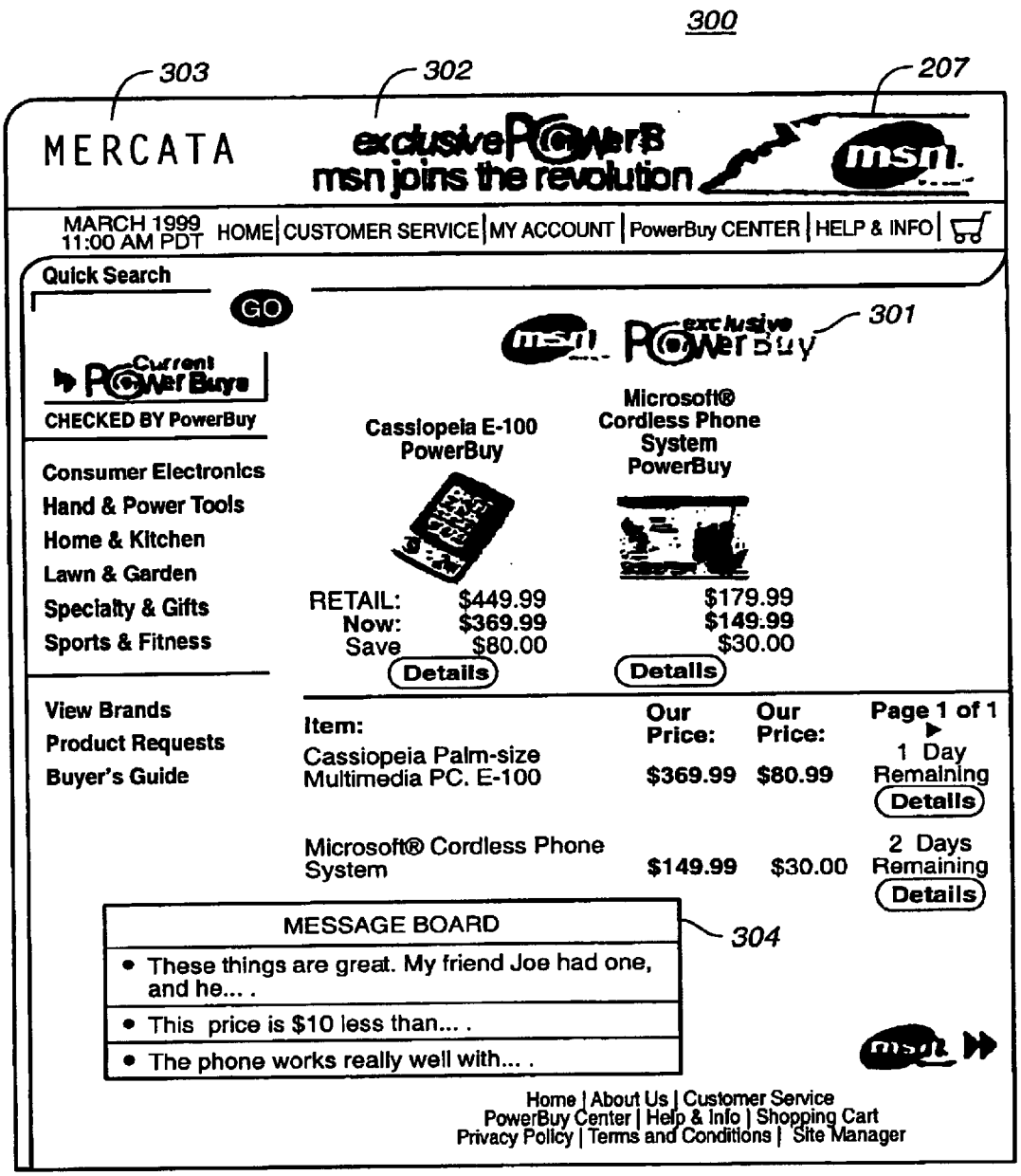
FIG._3

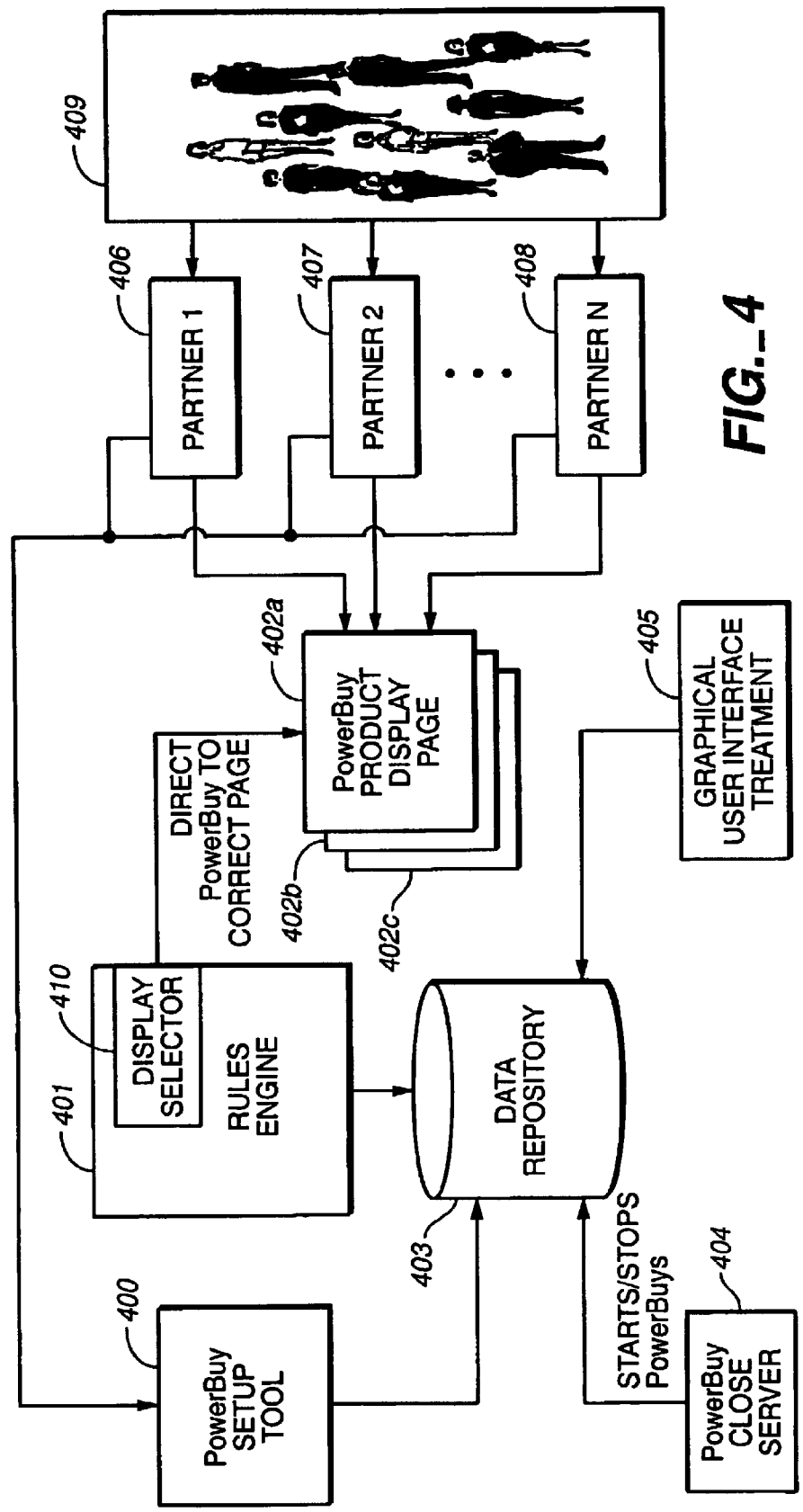
FIG._4

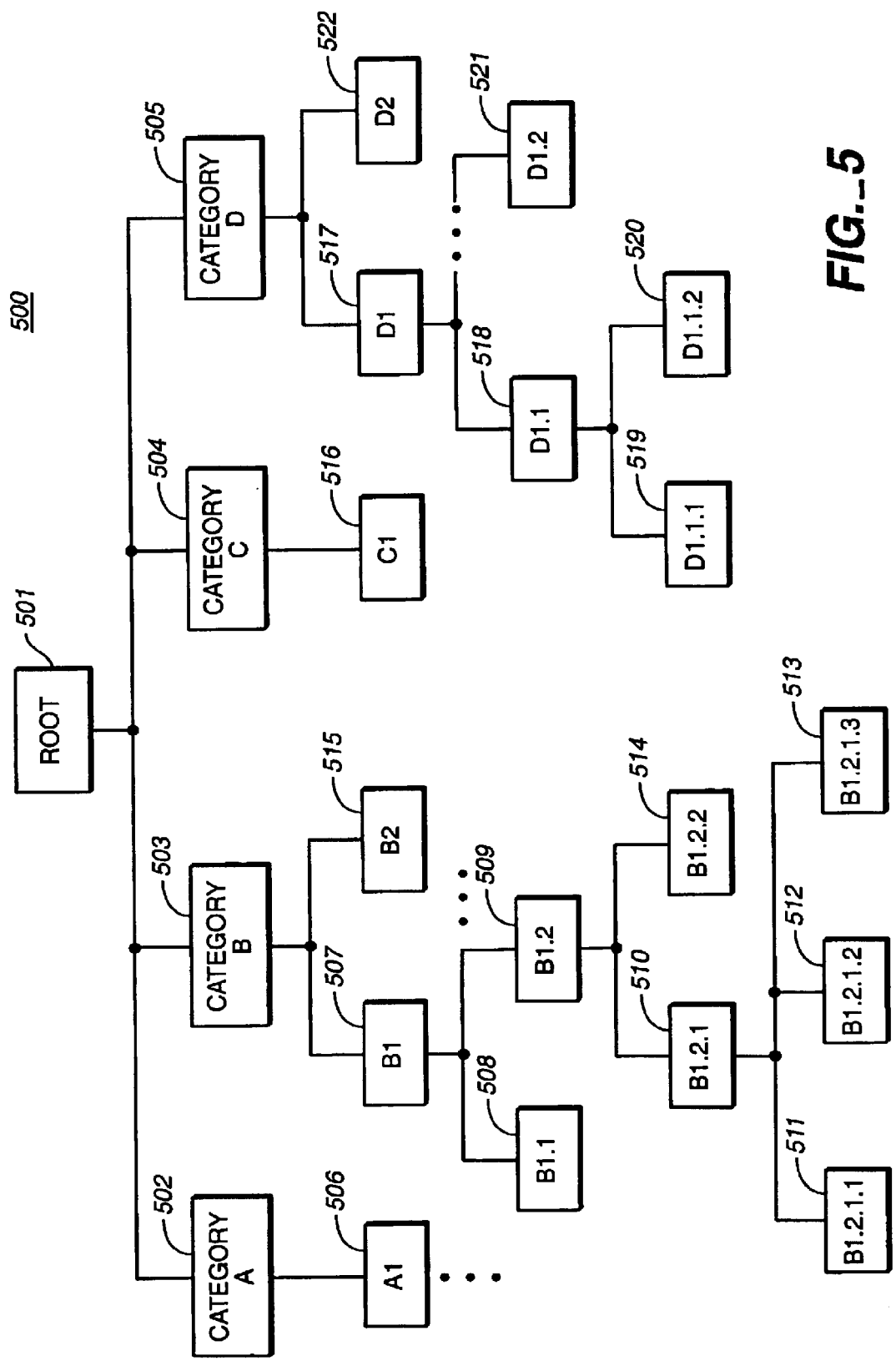
FIG._5

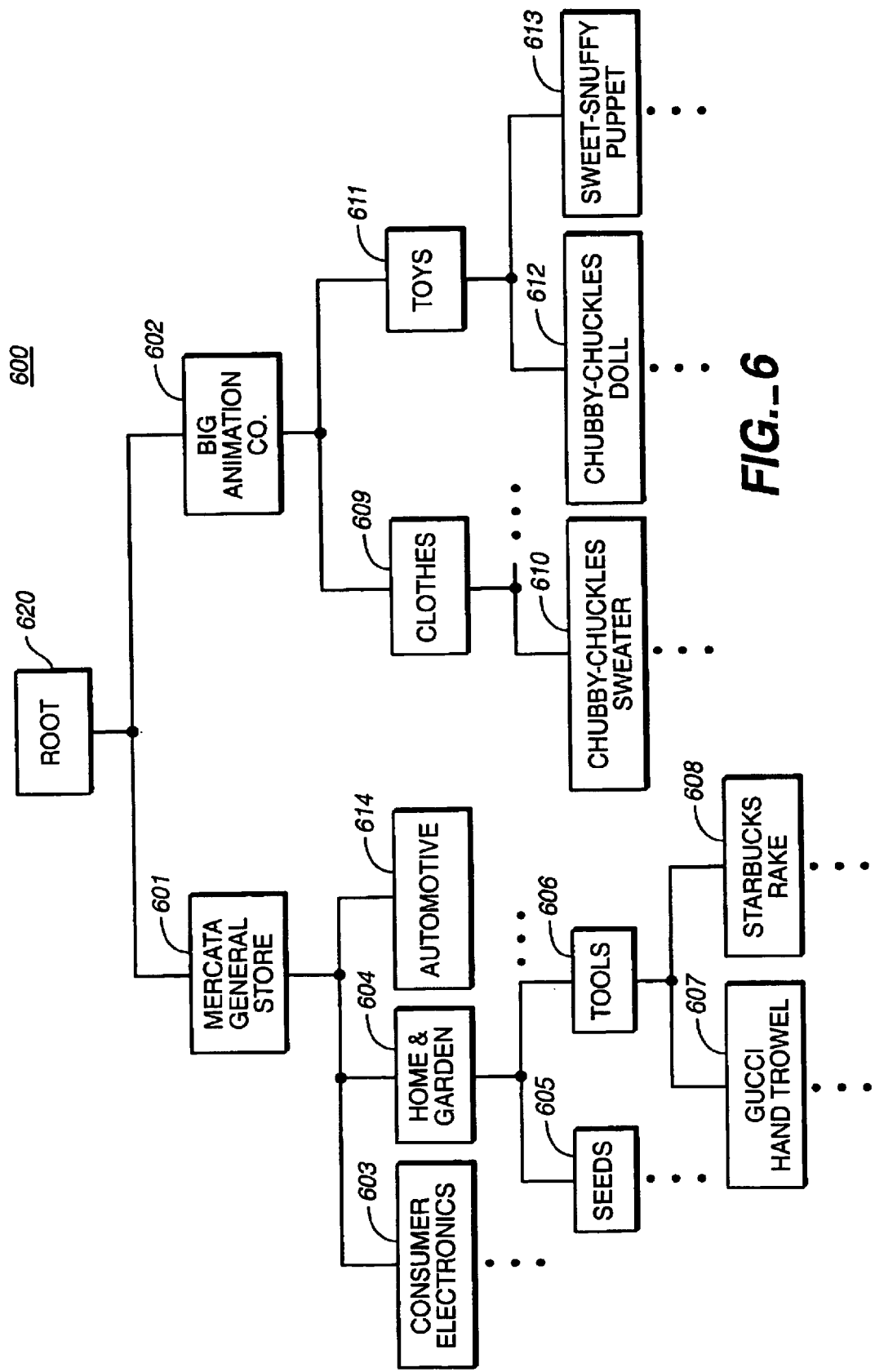
FIG._6

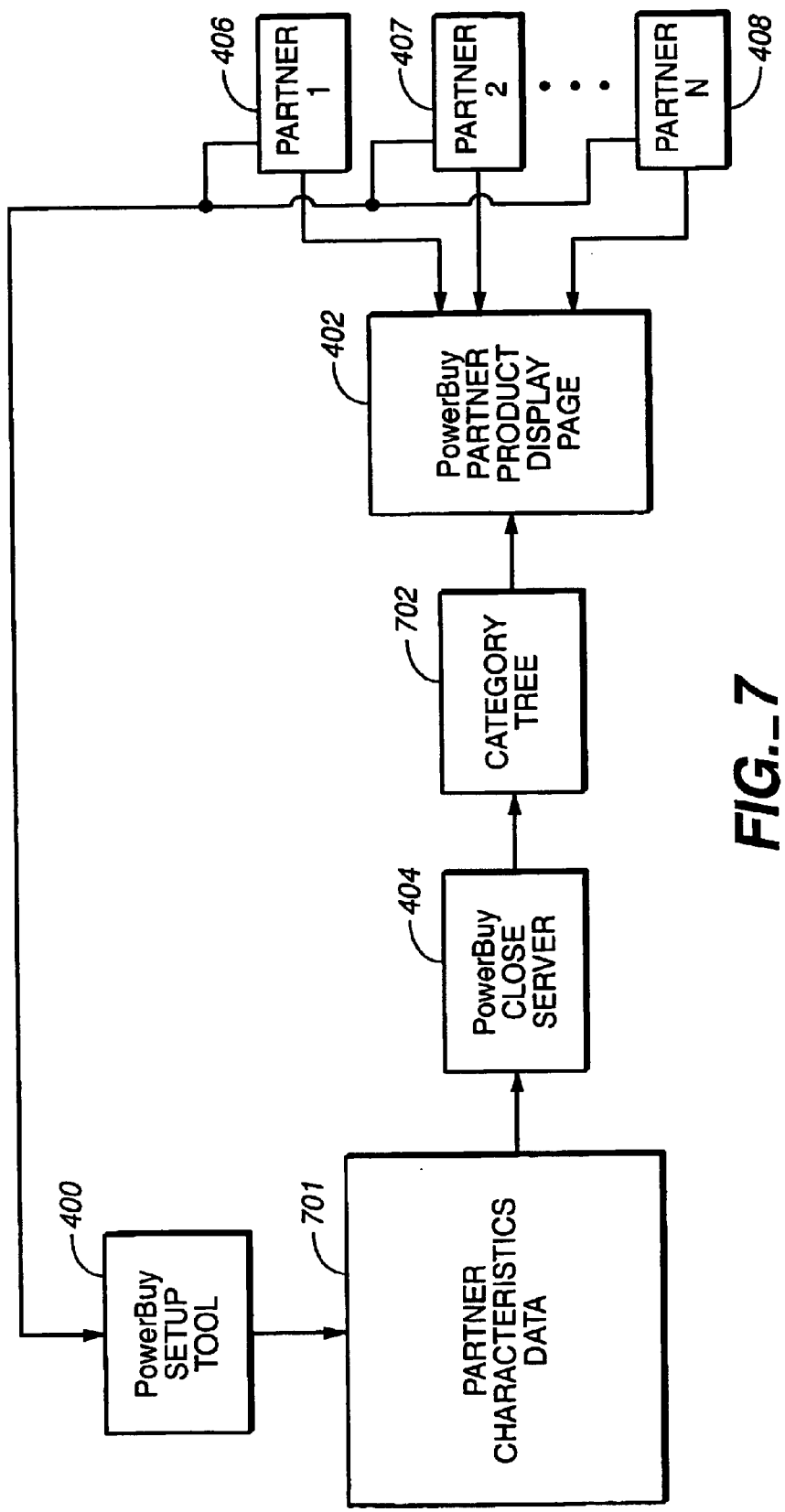
FIG._7

800

| NAME 801 | ADDRESS 802 |
|---|---|
| GOODS FOR SALE 803 | MAX. QUANTITY 804 |

| DESCRIPTION OF GOODS 805 ||

| INITIAL PRICE 806 | MINIMUM PRICE 807 |
| MIN. SALE QUANTITY 808 | ORDER QUANTITY LIMIT 809 |
| OFFER REJECT THRESHOLD 810 | PRICING SCHEME 811 |

| COST CURVE 812 | IGNORE SCHEME 813 | WINDOW PRICE 814 |
|---|---|---|

| BONUS PROGRAM - SELLER 815 | BONUS PROGRAM - BUYER 816 |
|---|---|
| PRODUCT DELIVERY INFORMATION 817 | ABSTRACT FOR PARTNER SITES 818 |

| SELLER SECURITY / CERTIFICATION DATA 819 ||

FIG._8

| | |
|---|---|
| TROOP 36 - BELLEVUE _901_ | TROOP36@MSN.COM _902_ |
| COOKIES _903_ | 200 BOXES _904_ |
| THIN MINT GIRL SCOUT COOKIES - PLEASE HELP OUR TROOP AND FIGHT MUSCULAR DYSTROPHY, TOO! WE DONATE $1 TO MS FOR EACH BOX SOLD. _905_ ||
| $5.00 _906_ | $3.00 _907_ |
| NONE _908_ | NONE _909_ |
| $3.00 _910_ | PowerBuy AUTOMATIC ( SHOW ME )—_911a_ _911_ |
| PowerBuy AUTOMATIC ( SHOW ME )—_912a_ _912_ | PowerBuy AUTOMATIC ( SHOW ME )—_913a_ _913_ · PowerBuy ( SHOW ME )—_914a_ _914_ |
| MERCATA BONUS BUCKS _915_ | NONE _916_ |
| SHIPPED VIA UPS AT 50¢ / BOX _917_ | KING COUNTY; SNOHOMISH CO.; GIRL SCOUTS; CHARITY; YOUTH; FOOD; _918_ |
| WELLS FARGO BANK; MS. BONNIE JONES _919_ ||

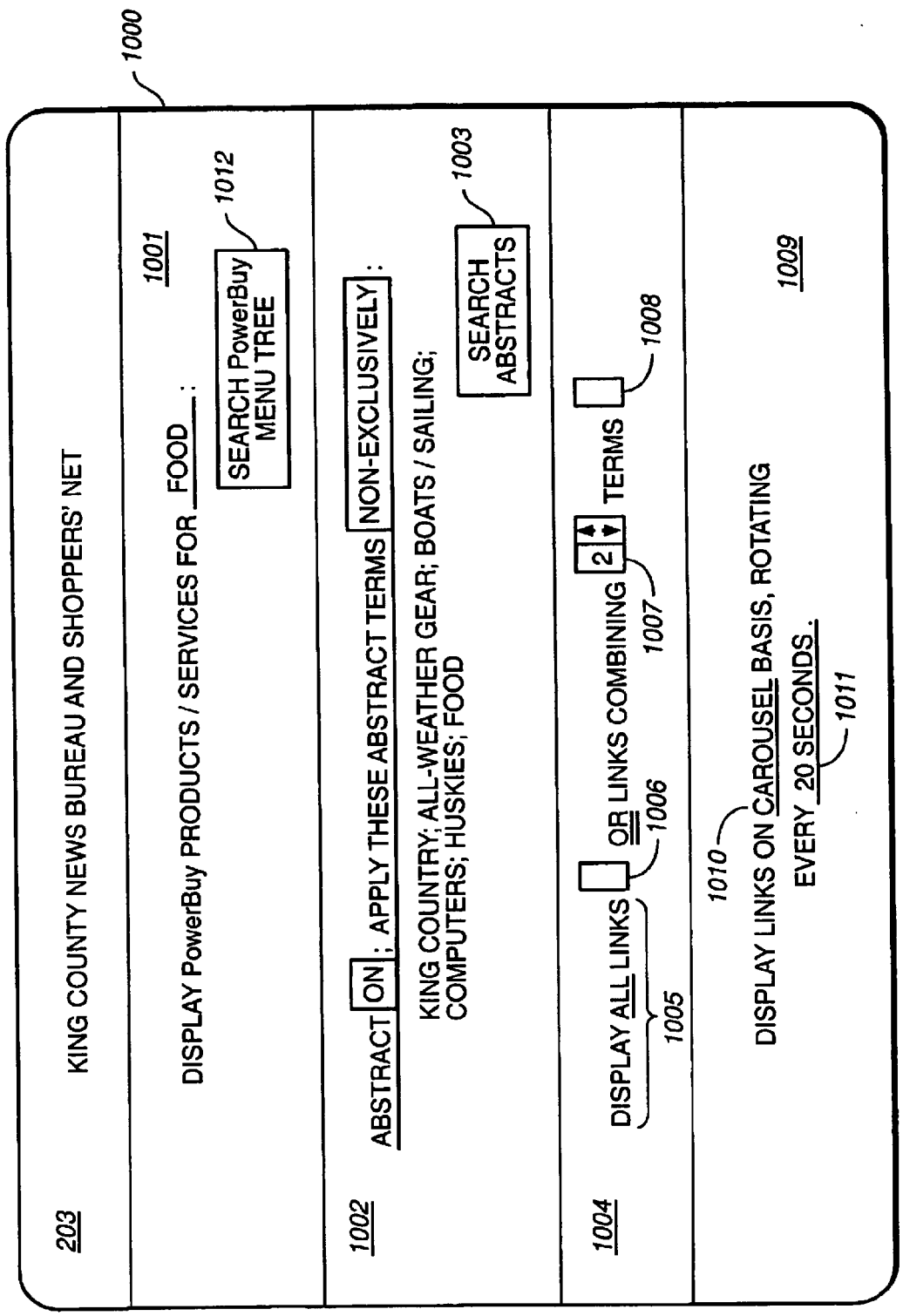
FIG._10

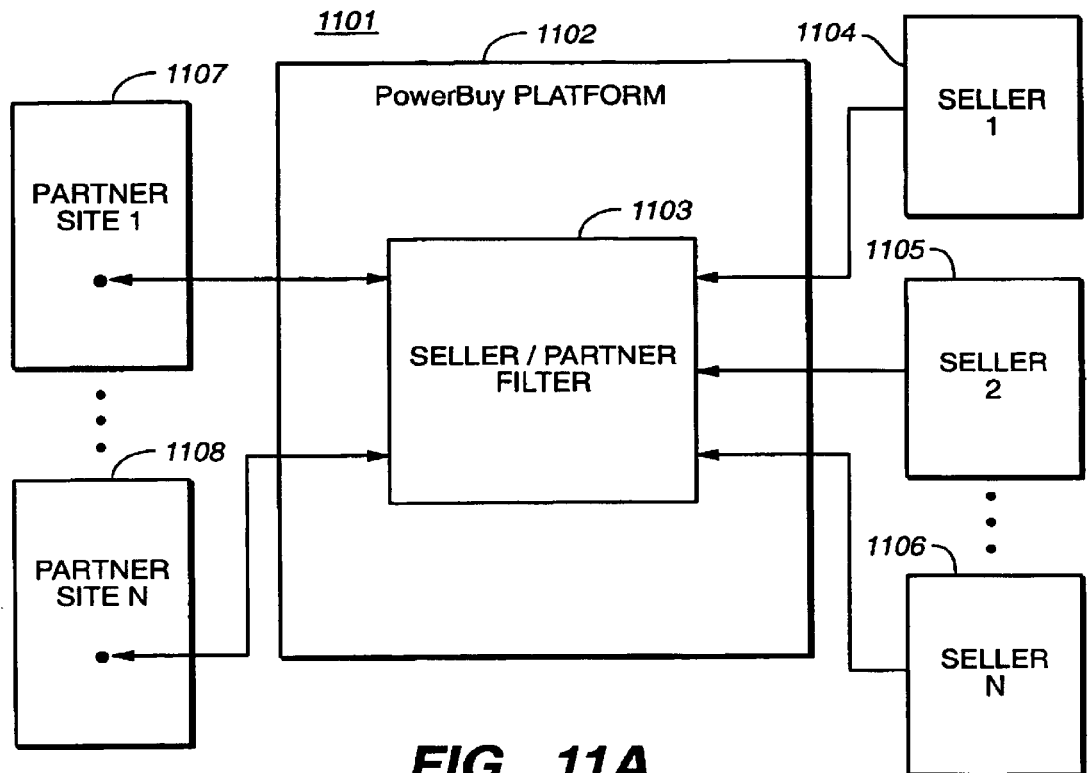
FIG._11A
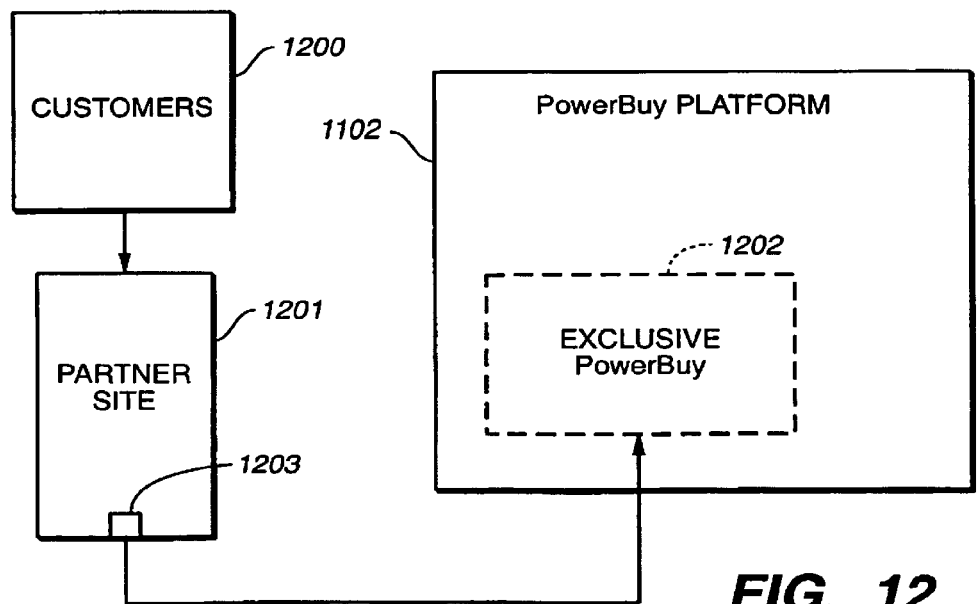
FIG._12

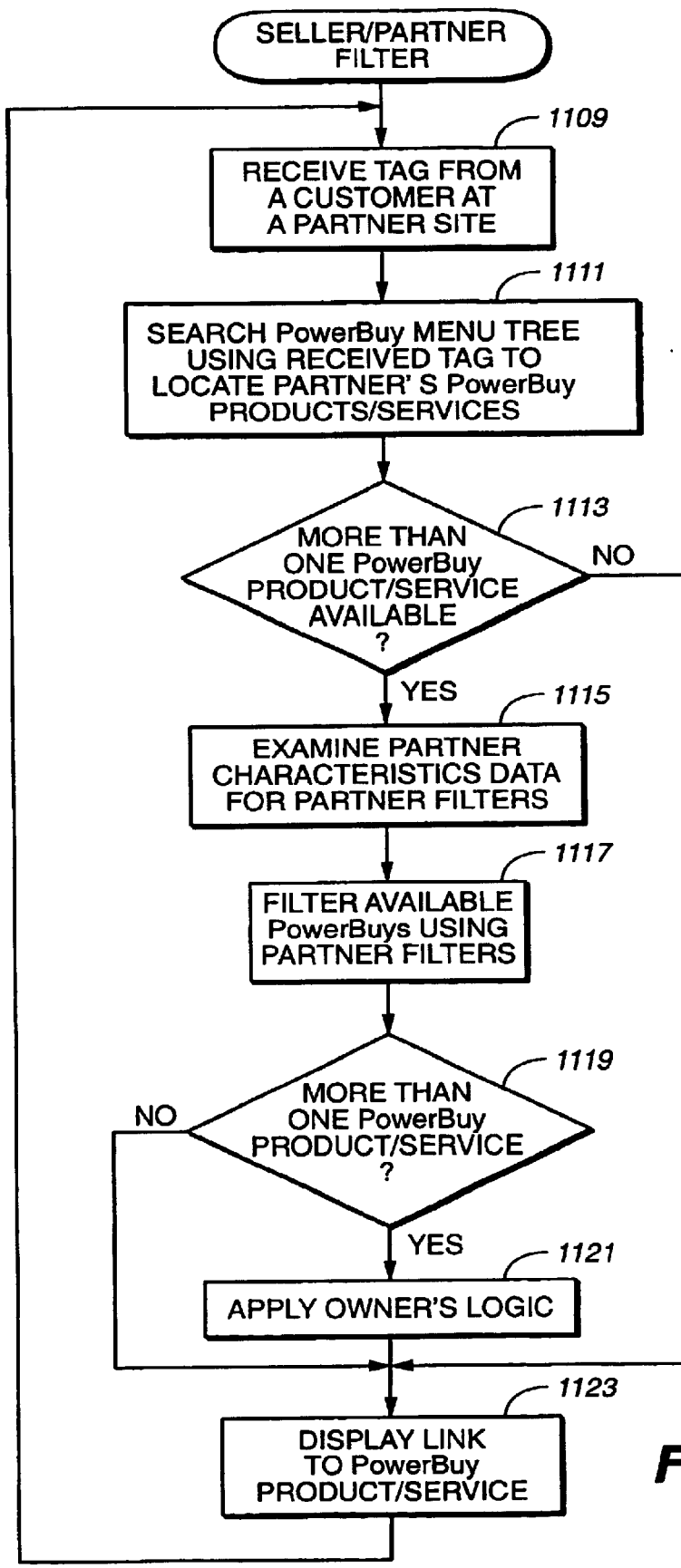
FIG._11B

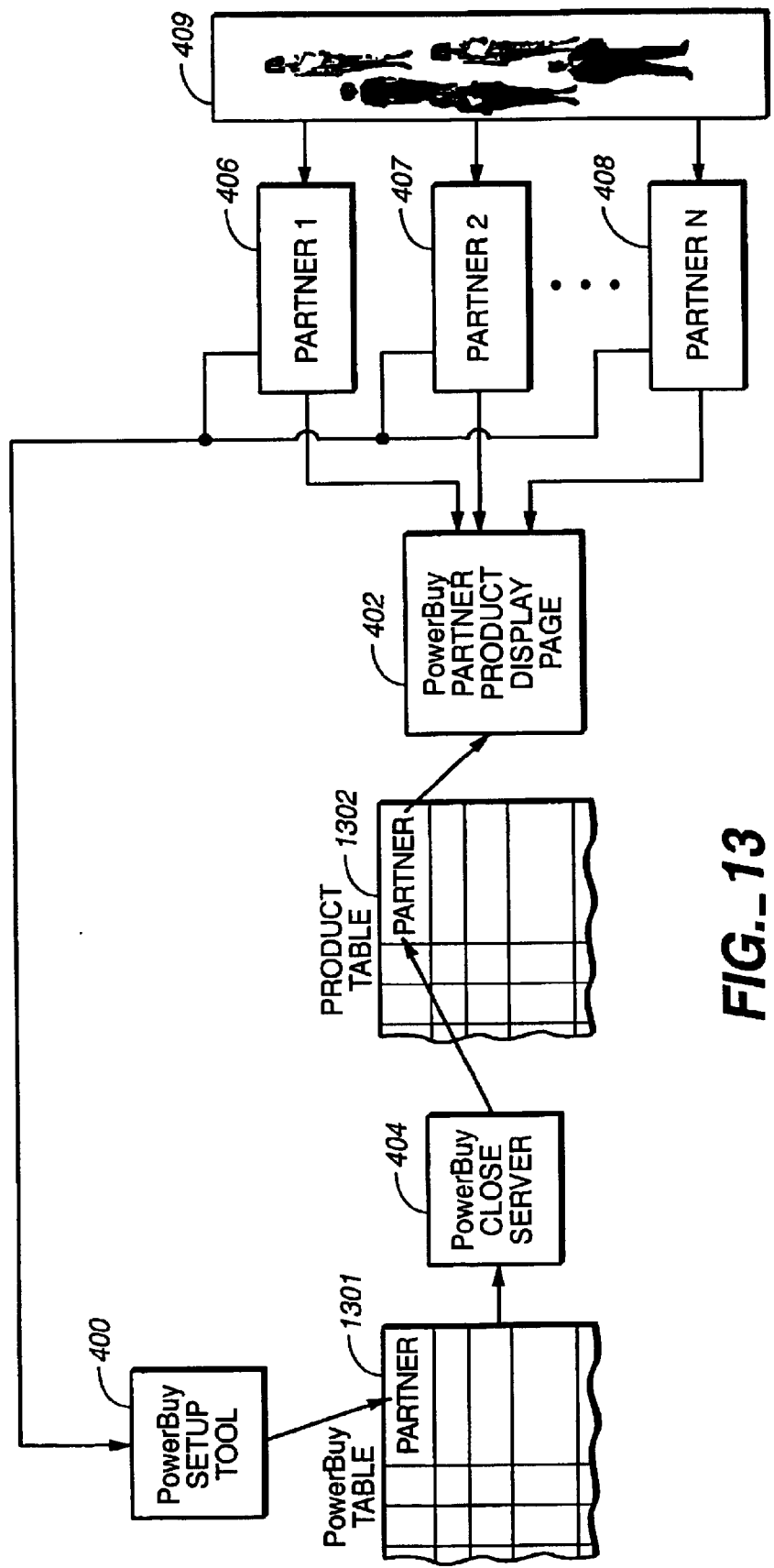
FIG._13

SYSTEM AND METHOD FOR EXTENSION OF GROUP BUYING THROUGHOUT THE INTERNET

This application claims the benefit of prov. application No. 60/142,471 filed on Jul. 6, 1999.

1. Field of Invention

The present invention relates to the expansion of group buying over electronic networks such as the Internet through creation of a platform whereby each individual group purchasing opportunity can be extended to any or all web sites on the Internet. More particularly, it relates to a platform to extend e-commerce applications such as on-line buying groups of the type described and claimed in a related pending, commonly owned application filed Mar. 15, 1999 in the names of Tom Van Horn, Niklas Gustafsson and Dale Woodford, entitled "Demand Aggregation Through Online Buying Groups," U.S. application Ser. No. 09/270,219, the disclosure of which is incorporated herein by this reference. In one form, this invention refers to a technique whereby the on-line buying groups technology can be imbedded in other parties' Web sites and managed remotely by a company, such as the owner of this application, hereinafter referred to as "Owner." In another form, the invention further relates to a method of permitting third party web site owners to create, manage, and share aggregation on their own online group buying opportunities within the context of this platform.

2. Background of the Invention

This invention provides a method and apparatus to achieve an unprecedented aggregation of purchasing power (a "super aggregation") by allowing each location or presence on an electronic network such as the Internet to select for display from its location, channel or web site any combination of the Owner's limited-time, product-specific group buying opportunities (hereinafter referred to as "PowerBuys") then appearing in the Owner's menu of current and upcoming PowerBuys. The Owner's platform preferably displays the PowerBuy menu as a configurable product tree, although other display paradigms may be used. Such third party display may be on either an exclusive or a shared aggregation basis. The result is the super aggregation of a unique set of partner locations/web sites that will concurrently offer, or sponsor, each one of the Owner's PowerBuys, and/or certain third-party PowerBuys.

In one embodiment, the invention also provides a method and apparatus that permits certain retailer, supplier or other third parties to create, manage and share aggregation, if desired, on PowerBuys featuring their own products or services. This is accomplished, in part, through such third parties' direct use of the Owner's PowerBuy set up and management tools described in the above referenced commonly assigned application, as well as a related pending, commonly owned application filed on Mar. 31, 1999 in the names of Richard V. Halbert, Niklas Gustafsson and John M. Thrun, entitled "Dynamic Market Equilibrium Management System, Process and Article of Manufacture," U.S. application Ser. No. 09/281,859, the disclosure of which is incorporated herein by this reference.

The Owner's PowerBuy offerings are already available to those visiting the Owner's web site. Some visitors may already arrive at the Owner's site from links appearing on third-party web sites, such as links that direct traffic to the site in a general way, e.g., the home page or the first page of all current PowerBuys. These existing links do not direct visitors to specific PowerBuys selected on the basis of the originating link. Further, the sender may not presently tailor its traffic exposure to a defined set of PowerBuys most likely to be of interest to its customers. While general links generate some level of participation in the Owner's PowerBuys, they do not deliberately funnel traffic to the Owner's PowerBuys on an item-by-item basis, nor do general links promote the most efficient or logical aggregation of demand for each individual PowerBuy. Consequently, the methods in place do not fully harness the aggregation potential of the Owner's group buying method over the Internet.

Furthermore, no sales channel presently exists through which a supplier, manufacturer, or retailer of goods and services can readily turn to create directly a potentially global market for a given product or service across a vast number of web sites on the Internet. While suppliers of products and services can achieve large volume sales through the Owner's demand aggregation (i.e., PowerBuy) invention, all such sales are now possible for such third parties only indirectly through the Owner, functioning as an Internet retailer. A key aspect of this invention permits suppliers, distributors, retailers, and others to create and control their own PowerBuys in either an exclusive or shared aggregation format. In this implementation, the Owner's site functions as a true platform for such third party sales. As such, the Owner likely will be compensated by some combination of licensing revenue (for the use of its PowerBuy set up and management tools), and a transaction fee based on these third party managed sales, or a revenue/margin sharing arrangement.

3. Benefits of the Invention

This invention makes the online demand aggregation invention more effective by expanding its presence on an item-by-item and/or product-category basis concurrently to all web communities having an interest in the given item or product category. Consequently, the invention potentially leverages all traffic over the Internet to enable unprecedented aggregation of demand, or a super demand aggregation. In addition, PowerBuy selection on an item-by-item and/or category basis permits the super aggregation to occur in a highly efficient and targeted manner. Participating web sites can include everything from major portal sites having generalized traffic, to niche community sites centered on particular hobbies or other commonalities of interest, as well as Internet retailer sites. General traffic sites might select a broad array of PowerBuys, while the niche sites likely would select only PowerBuys featuring items of specific interest to their community.

Specifically, a major portal might select an array of popular consumer electronic and sports equipment PowerBuys with relatively wide appeal, while a community site focusing on hiking and fishing might select PowerBuys featuring specific items of camping, hiking and fishing equipment. Sites catering exclusively to women might select items such as gifts, kitchen electronics and sporting equipment geared toward women and the like. An Internet retailer might choose to focus solely on PowerBuys featuring items they offer for resale.

In addition, product manufacturers, service providers, and distributors can broaden their role from simply the product or service supplier to a direct reseller of those items though appropriate links and revenue sharing arrangements on PowerBuy sales of their own merchandise and, where appropriate, merchandise or services supplied by others.

A relatively small seller of goods may use the expanded PowerBuy network to offer goods and services to a wider consumer market and a more focused consumer market. For example, a seller may expand PowerBuy offerings to more general Internet locations near the seller's geographical location while also providing the offerings worldwide through Internet locations logically related to the seller's goods/services.

The result to the purchaser of the super aggregation enabled by this invention is appreciably greater purchasing power, as well as a strengthened sense of community through an enhanced ability to connect with similarly situated buyers. Connections among similarly situated buyers may be enhanced by access to group communication media, such as message boards and chat facilities, which allow purchasers to share ideas about products and accessories.

Participating partner sites benefit by offering unique, valuable content to their site visitors that can be tailored to suit such visitor's needs and interests. Further, the invention gives participating suppliers and Internet retailers a stronger means to target and accumulate demand throughout the Internet for products and services on an item-by-item basis.

In addition, the embodiments of the invention that permit third parties such as suppliers, distributors and Internet retailers to create and control their own PowerBuys will offer, among other things, the ability for such third parties to achieve unprecedented inventory leveling capabilities, directly make real-time yield management decisions, test price sensitivity on new products, etc.—all with the benefit of the true market data made possible by the above referenced commonly assigned inventions.

SUMMARY OF THE INVENTION

1. Definitions

PowerBuy—a business method in which buyers wishing to purchase a particular product or service, or groups of products and services, within a given time frame join forces in a buying group ("co-op") formed across an electronic network specifically to accomplish the desired purchase. The co-op enables individual buyers to leverage their combined purchasing power to achieve an economic bargain superior to that attainable by any one buyer acting alone. This superior bargain most often will be reflected in terms of a lower price. For example, as more buyers join the co-op, the desired item's price typically declines. At the end of the purchase period, all buyers purchase the item at a final (low) price even if some buyers have submitted binding offers at higher prices. The definition provided here does not supersede the definitions provided in the two applications previously incorporated by reference.

Partner Site—any third-party owned or operated location, such as a web site, within an electronic network, such as the Internet, that has been configured to display one or more PowerBuys at their network location or web site. The universe of partner sites potentially could encompass an entire network such as the Internet. However, it is expected that certain network locations or web sites would be barred from participation due to their distasteful or inappropriate content.

Owner—the party owning, or operating, the platform hosting PowerBuys and/or facilitating PowerBuy displays on Partner sites. For example, the Owner may be the owner of the invention described herein and the related inventions cross-referenced herein.

Owner's Main Site—a web site on which the PowerBuy platform or hub resides. For purposes of at least one embodiment of the invention, this site is an Owner's site on which the PowerBuy method of sales is being practiced in accordance with the commonly assigned inventions referred to above. A skilled artisan will recognize that the PowerBuy platform may only provide a virtual presence, with a substantial portion of the actual computing power driving the PowerBuy sales method located elsewhere. In addition, embodiments of the invention are not limited to a single owner's main site.

Display—to show a PowerBuy item on a Partner site by way of a link to pages on the Owner's main site. A page is a specific portion of the totality of the Owner's main site and does not necessarily refer to any particular method of displaying the page to a viewer/customer.

Featured Item—a product or service, or groups of products and services, offered for sale in a PowerBuy sales method.

PowerBuy Menu Tree—a catalogue maintained by the Owner listing all current and upcoming PowerBuys and/or products/services from which Partner sites may select for display from their respective network location or web site. In a preferred embodiment of the invention, the PowerBuy menu tree is organized as a tree structure having selectable categories/products. By selecting one location on the PowerBuy menu tree, a partner selects that location and any locations below it.

Seller—a manufacturer, retailer, or other party offering products/services for sale to customers via the PowerBuy sales method.

Customer—a person who participates in a PowerBuy sales method by either accessing the PowerBuy from the Owner's main site or from a Partner site.

Product Category—a category, product, or combined category and product selectable from the PowerBuy tree structure. The Product Category controls which PowerBuys each customer shall have be able to access. For purposes of this invention, the location or link from which each individual customer arrives at the Owner's main site will be a key determinant in determining the Product Category.

Partner Parameters—a field within the set up code for each PowerBuy that controls which PowerBuys each visitor may access, according to an alternative embodiment of the invention. For purposes of this invention, the location or link from which each individual customer arrives at the Owner's main site will be a key determinant in determining the Product Category.

Abstract terms—as a supplement to selecting PowerBuys exclusively on the basis of a particular product/service or category, a partner site may also select PowerBuys on the basis of terms descriptive of the product/services offered. The abstract terms become increasingly crucial to the operation of the PowerBuy sales method as the number of products/services offered grows increasingly larger.

Other terms used in this application that are defined in the above referenced related applications have the meanings used in those applications.

2. Summary Description

Each partner site must select at least one product or product category from the PowerBuy menu tree in order to permit a targeted aggregation of a unique set of partner sites that concurrently displays each featured item offered in a PowerBuy, according to an embodiment of the invention. The partner site may also select product categories from the PowerBuy menu tree for display on subcommunities within its network location or web site. For example, this may be achieved by displaying a list of all current and upcoming PowerBuys on password protected pages within the Owner's site and/or on other site locations. The partner site could then communicate its choices by "checking off" each desired item.

In order to permit access in a manner consistent with partner sites' selections, the Owner will examine the portions of the PowerBuy menu tree associated with each PowerBuy to determine the set of partner sites having selections relevant to the PowerBuy. The PowerBuy menu tree controls which items are accessible and which are hidden for each particular visitor based on how such visitor came to the Owner's site (i.e., whether the visitor's session originated from a link from a particular partner site, versus any number of general links or direct hits to the Owner's main site). The PowerBuy management and set up tools, which have been modified to permit the described personalization necessary for this invention, are more fully described in the applications for the commonly assigned inventions referred to above.

In the case of exclusive PowerBuys, the partner's abbreviated name, or another appropriate identifier, would be the only set value placed within the PowerBuy menu tree for a relevant portion of the PowerBuy menu tree so that those PowerBuys are shown only to visitors linking directly from that partner site. PowerBuys so designated as exclusive must also be hidden from the product category tree within the Owner's main site so they will not be displayed to the Owner's other customers (e.g., those coming from general links, search engines, or by typing in the URL of the Owner's main site), where such a restriction is appropriate. In the case of shared aggregation PowerBuys, the value set within the partner parameter would include a string of partner site code names (i.e., all partners choosing such item) such that visitors originating from all such sources, as well as those arriving through the Owner's main site, would have joint and simultaneous access to the PowerBuy item. This method is generally preferable as it permits the fullest aggregation of demand.

Each partner site is then given a reference marker, such as a URL, for its link(s) to the Owner's main site through which its visitors will have access to all such partner-selected PowerBuys when visiting the Owner's site through such a link. Such visitors may also have click-through access to other portions of the Owner's main site (such as pages displaying other nonexclusive PowerBuys on such site) depending upon the specific page layout and design appearing on such visitor's initial access pages.

The partner may supply images and any URLs necessary and appropriate to link back to its own site from the selected PowerBuy pages that are viewed by visitors utilizing its links. In the shared aggregation scenario, visitors from a particular site would be shown only the link back to the originating site. All other partner site links would be hidden from that visitor.

In an alternative embodiment, a "partner parameter" field can be associated with each PowerBuy set up code so as to permit access in a manner consistent with partner sites' selections. The Owner examines the portions of the partner parameter within the PowerBuy set up code for each PowerBuy to look for all the relevant abbreviated partner code names assigned to that PowerBuy. The partner parameter field within the PowerBuy set up code controls which items are accessible and which are hidden for each particular visitor based on how such visitor came to the Owner's site (i.e., whether the visitor's session originated from a link from a particular partner site, versus any number of general links or direct hits to the Owner's main site).

BRIEF DESCRIPTION OF THE DRAWINGS

FIG. 1 is a simplified diagrammatic representation of a model showing how the invention expands aggregation through multiple avenues of traffic flow to the Owner's PowerBuys.

FIG. 2 is a corresponding simplified diagrammatic representation of the aggregation of a unique set of partner sites for each PowerBuy item.

FIG. 3 is a screen shot showing exclusive PowerBuys made available only to one partner site, according to an embodiment of the invention.

FIG. 4 is a simplified block diagram representing the technical schema underlying an embodiment of the invention.

FIG. 5 shows an exemplary tree structure 500 that may be used to retain PowerBuy product/service data, such as for use in a PowerBuy menu tree, according to an embodiment of the invention.

FIG. 6 illustrates another exemplary tree structure 600 that may be used to categorize product/service data available for PowerBuys, according to an embodiment of the invention.

FIG. 7 further illustrates a partner's PowerBuy product/service selections using the PowerBuy setup tool 400, according to an embodiment of the invention.

FIG. 8 shows an exemplary seller's screen 800 that may be used to describe a product/service for a PowerBuy, according to an embodiment of the invention.

FIG. 9 shows an exemplary seller's screen 900 as completed by a particular seller, a Girl Scout troop from Bellevue, Wash., for the sale of a specific lot of goods, Girl Scout thin mint cookies, according to an embodiment of the invention.

FIG. 10 illustrates an exemplary partner screen 1000 that could be used by a partner to select which PowerBuys to display, according to an embodiment of the invention.

FIG. 11A illustrates a multi-seller, multi-partner system 1101, according to an embodiment of the invention.

FIG. 11B is a flowchart showing the seller/partner filter's processing of partner tags arriving at the PowerBuy platform 1102 from customers at the partner sites, according to an embodiment of the invention.

FIG. 12 illustrates the PowerBuy platform 1102 hosting an exclusive PowerBuy, according to an embodiment of the invention.

FIG. 13 shows the data flow that occurs when PowerBuys are selected by an operator of a third party site for use in connection with that site, according to an alternative embodiment of the invention.

DETAILED DESCRIPTION OF THE INVENTION

FIGS. 1–12 of the drawings show preferred forms of a system and process for implementing the invention.

As shown in FIG. 1, an embodiment of the invention combines for a given PowerBuy 107 an Owner's main site (i.e., Mercata 100) and its customers (i.e., customers 104) with traffic coming from partner sites 103 and their respective customers 105. Of course, an overlap 106 may be expected between the customers 104 and the customers 105. Nevertheless, the invention may achieve a super aggregation of demand for the PowerBuy 107 beyond that provided by the customers 104 alone. In addition, a number of sellers 101, 102 may increase due to the attraction of the super demand aggregation provided by the invention. The customers 105 may arise from an unlimited combination of partner web sites, including major portals, broad and niche community sites, manufacturer web sites, Internet retailer sites and the like. Communications among the customers 104, 105 may be enhanced by access to a group communication medium 108 which allows the customers 104, 105 to share ideas about products and accessories offered on the Owner's main site 100. The group communication medium 108 also facilitates communications within groupings of customers 104, 105. The group communication medium 108 may be one or more group communication mediums, such as message boards and chat facilities.

Traffic from the partner sites 103 can be channeled in a manner to efficiently aggregate demand on a PowerBuy-by-PowerBuy basis with the Owner's main site 100 as shown in FIG. 2. Accordingly, partners 201–207 may combine with the Owner's main site 100 to super aggregate demand for the PowerBuy 107. Of course, each of the partners 201–207 will typically have indicated in some manner either their specific interest in the product/service of the PowerBuy 107 or their general interest in a product/service category that includes the PowerBuy 107. In some embodiments of the invention, the partners 201–207 may indicate their interest in the product/service of the PowerBuy 107 by expressing interest in more general, or abstract, terms that describe the product/service. Such abstract terms may not necessarily represent a specific product/service or product/service category.

While an ideal PowerBuy scenario calls for pooling partner site traffic, and therefore pooling purchasing power from all interested sources (e.g., customers of the partners 201–207), the Owner's main site may permit exclusive PowerBuys on partner sites, whereby all purchases will come from that site's traffic, rather than shared aggregation shown in FIG. 2. FIG. 3 depicts an exemplary screen shot 300 that would be served up to visitors having access to an exclusive PowerBuy.

The screen shot 300 includes exclusivity indicators 301, 302 and the partner identifier 207, as well as an Owner's identifier 303. Of course, one skilled in the art will recognize that providing an exclusive PowerBuy to a given partner does not necessarily require logos identifying the Owner, the Partner, or even exclusivity. On the other hand, such features may render an exclusive scenario more attractive to either the partner and/or the Owner.

A representative screen shot for nonexclusive PowerBuys could be quite similar to the screen shot 300 albeit without the references to exclusivity 301, 302, according to an embodiment of the invention. Moreover, in a non-exclusive scenario, a customer's links back to an originating partner site would be tailored to the point of origin for each visitor viewing such page. A skilled artisan will recognize the possibilities for other variations between complete exclusivity and complete non-exclusivity, including some form of limited aggregation whereby a product manufacturer or retailer could offer its merchandise to all partner sites except for direct competitors or vendors deemed unsuitable or inconsistent with the manufacturer or retailer's own business purposes.

The screen shot 300 also includes a group communications display 304 which allows customers to share ideas about the products offered on the screen shot 300. The group communications display 304 shown in FIG. 3 has the format of a message board in which customers may post messages about the products. As a skilled artisan will recognize, other group communications media may be used, such as a chat facility.

FIG. 4 provides a simplified block diagram representing the technical schema underlying an embodiment of the invention. As shown in FIG. 4, a PowerBuy set up tool 400 that creates PowerBuys may also help define which particular PowerBuys a partner site's visitor/customers may access. The PowerBuy set up tool 400 may operate in conjunction with other PowerBuy set up tools described in the commonly assigned applications previously incorporated by reference.

Partners 406–408 may access the PowerBuy set up tool 400 to specify which product(s)/service(s) they wish displayed (or displayable) to their customers/visitors 409. As previously stated, the partners 406–408 may examine the Powerbuy menu tree to select specific products/services or the partners 406–408 may select product/services categories. Selecting a product/service category renders all products in the category suitable for display. In addition, the partners 406–408 may tailor their selections through the use of abstract product/service terms, in one embodiment of the invention. It is anticipated that the partners' selection process will be ongoing as PowerBuys are continuously beginning and ending on the Owner's main site. In addition, the partners 406–408 may change their product/service selections frequently.

A PowerBuy close server 404 may start and stop Power-Buys. When running a PowerBuy, the PowerBuy close server 404 accesses a data repository 403 containing PowerBuy data, such as the data associated with the PowerBuy menu tree. A graphical user interface treatments 405 provides descriptions regarding the appearance of PowerBuys on both the Owner's main site and on partner sites. A rules engine 401 determines which partner sites may display links to which presently active PowerBuys by accessing the PowerBuy menu tree. Accordingly, the customers 409 visiting partner sites 406–408 may receive the appropriate links to PowerBuy product display pages 402a–402c.

On some occasions, multiple PowerBuys may be suitable for display to a customer, but the partner site (or the customer) may be configured for display of only a single PowerBuy at a time. In such instances, a display selector 410 determines which particular PowerBuy(s) are actually displayed to a customer linked from a partner site. FIG. 4 shows the display selector 410 as contained within the rules engine 401; however, a skilled artisan will recognize that the display selector 410 need not necessarily be contained within the rules engine 410.

Exclusive PowerBuy items will not be generally available from the Owner's PowerBuy menu when partner sites make their PowerBuy selections. Of course, the PowerBuy setup tools may permit a range of exclusivity. In situations where a partner site (typically a product supplier or retailer) wishes to offer PowerBuys on its own merchandise, such a partner may license and utilize the PowerBuy set up and management tools described in the commonly assigned inventions referenced above. This embodiment of the invention would permit such third parties to control which products will be featured items, the form of the price curve on which the product's sales price will be determined, and the extent of exclusivity desired with respect to other's access to its PowerBuy items. However, all such decisions may be bounded by parameter limits set by the Owner to ensure appropriate levels of consistency and customer satisfaction. Further details on the administration of this embodiment of the invention are available in the second commonly owned application referenced above.

FIG. 5 shows an exemplary tree structure 500 that may be used to retain PowerBuy product/service data, such as for use in a PowerBuy menu tree, according to an embodiment of the invention.

The tree structure 500 may represent any number of PowerBuy categories/products. In a typical embodiment, each particular node represents a category, a product, or both. For example, a Category B 503 has two child nodes 507 and 515. The node 507 itself has two child nodes 508 and 509. The node 509 has two child nodes 510 and 514. The node 510 has three child nodes 511–513.

An operator of the Owner's main site may modify the tree structure 500 to add new nodes to the tree structure 500, remove old nodes from the tree structure 500, and/or reorganize the tree structure 500. The operator may be a human or a computerized support system. In addition, in some instances partners may be allowed to modify the tree structure 500 using the PowerBuy setup tools. As a skilled artisan will recognize, the PowerBuy setup tools may include safety protocols that would prevent a partner (or the owner) from making harmful modifications to the tree structure 500. The tree structure 500 will typically include a single root node 501, although one skilled in the art could easily develop a rootless tree structure and/or a multi-root tree structure.

Partners use the tree structure 500 to define the PowerBuy products/services to display to customers visiting their partner sites. A partner may select a specific product, such as that represented by the node 511, an intermediate node such as the node 510, a category node 503, or the root node 501. The partner's site will display PowerBuys associated with any selected node in the tree structure 500 and all the node's depending from it. For example, by selecting the node 510, a partner's site may display PowerBuys pertaining to the nodes 510–513. The display selector 410 determines which particular PowerBuy(s) are actually displayed to a customer linked from a partner site when more than one PowerBuy could be displayed to a customer configured to view only one display at a time.

The partner's selection of a particular category is a dynamic selection, with the actual PowerBuy products/services displayed to customers depending upon the status of the tree structure at the customer's access instant. For example, if the Owner, or a seller, later adds or removes products/services at or below the child 510, then the PowerBuys displayable to the partner's site will be correspondingly updated. This mechanism provides greater flexibility to partners than selecting a static category or static product for which no PowerBuys may exist on the Owner's main site at a later time period, such as when a customer actually links to the Owner's main site.

Of course, a partner may select more than one portion of the tree structure 500 to display PowerBuy products/services. For example, a partner could select the node 502, the node 510, and the node 516.

The owner may store the tree structure 500 in a data repository, such as the data repository 403 shown in FIG. 4. As a skilled artisan will recognize, a database represents but one suitable data repository.

FIG. 6 illustrates another exemplary tree structure 600 that may be used to categorize product/service data available for PowerBuys, according to an embodiment of the invention. The tree structure 600 closely resembles the tree structure 500 but with specific PowerBuy product/category entries.

In the tree structure 600, a root node 620 comprises two child nodes 601, 602. The node 601 pertains to the Owner's set of products/services (i.e., "the Mercata General Store"), and the node 602 represents an exclusive set of products for a particular seller, "Big Animation Co."

The Owner's sub-tree, that portion of the tree structure 600 at and below the Mercata General Store 601 comprises three categories 603, 604, and 614. The Home & Garden node 604 comprises two sub-categories, Seeds 605 and Tools 606. The Tools subcategory 606 comprises two specific products a Gucci Hand Trowel 607 and a Starbucks Rake 608.

The exclusive product/service sub-tree, that portion of the tree structure 600 at and below the Big Animation Co. 602 comprises two categories, Clothes 609 and Toys 611. The Clothes category 609 comprises a specific product, a Chubby Chuckles Sweater 610, while the Toys category 611 comprises two specific products, a Chubby Chuckles Doll 612 and a Sweet-Snuffy Puppet 613.

As discussed above, the Big Animation Co. sub-tree 602 may be made available on an exclusive basis, e.g., accessible only from the Big Animation Co. web site. In this mode, a customer on the owner's main site would not be allowed to view the products/services on the sub-tree 602 or participate in PowerBuys associated with the sub-tree 602 without first accessing the Big Animation Co.'s web site. Alternatively, the sub-tree 602 may be configured in a non-exclusive or in a semi-exclusive manner. In the non-exclusive configuration, customer could access the sub-tree 602 from any location where the customer could also access the sub-tree 601. In the semi-exclusive configuration, a customer could access the sub-tree 602 from the owner's web site and from the Big Animation Co.'s web site but from no other location. An ordinarily skilled artisan could likewise develop a range of additional non-exclusive configuration options.

The tree structure 600 may be updated periodically by the Owner and by sellers. For example, Big Animation Co. could add to the Toys category 611 a Chubby Chuckles Tractor and a Chubby Chuckles Whistle and remove the Sweet-Snuffy Puppet 613. Accordingly, a partner site that had previously selected the Toys category 611 would no longer display PowerBuys for the Sweet-Snuffy Puppet 613 but would now display PowerBuys for the Chubby Chuckles Tractor and the Chubby Chuckles Whistle as well as the Chubby Chuckles Doll 612.

FIG. 7 further illustrates a partner's PowerBuy product/service selections using the PowerBuy setup tool 400, according to an embodiment of the invention. A partner, such as the partners 406–408, may access the PowerBuy setup tool 400, which has been designed to aid in the selection of appropriate products/services for the partner's site. For example, the partner 406 may select one or more specific products/services, and/or one or more product/service categories, and/or one or more abstract terms that could be associated with a particular product/service. Regardless of how the partner 406 selects products/services of interest, the PowerBuy setup tool 400 stores the partner's selections in a partner characteristics data set 701.

The partner characteristics data set 701 may contain other pertinent data regarding the partner and the partner's site. For example, the PowerBuy setup tool 400 may also acquire from the partner 406 identification data for retention in the partner characteristics data set 701. A partner's first use of the PowerBuy setup tool 400 may likely result in the input of considerably more data to the partner characteristics data set 701 than the partner's subsequent uses of the PowerBuy setup tool 701.

The PowerBuy close server 404 may access the partner characteristics data set 701 to determine which PowerBuy products/services to display to customers/visitors entering the Owner's main site via a link from a partner site, such as from the partners 406–408. Once the PowerBuy close server 404 has accessed the partner characteristics data set 701 for a customer/visitor entering the Owner's site, the PowerBuy close server 404 may access a PowerBuy menu tree 702 to determine which products/services presently being offered in PowerBuys may be accessed by the visitor/customer. The PowerBuy close server 404 may then display at least one selected product/service to the customer/visitor using the PowerBuy Partner Product Display Page 402. Of course, multiple customers may enter the Owner's main site from multiple partner sites at any given time. Accordingly, multiple PowerBuy Partner Product Display Pages 402 may be used in any given time interval.

FIG. 8 shows an exemplary seller's screen 800 that may be used to describe a product/service for a PowerBuy, according to an embodiment of the invention. As previously discussed, the invention enables a super demand aggregation for the sale of products. In addition, the invention allows a plethora of sellers to provide numerous products/services for sale via PowerBuys. Accordingly, the seller's screen 800 could be used by sophisticated manufacturers and retailers for the sale of large quantities of goods, as well as by smaller scale sellers, such as clubs, artisans, and charities.

The seller's screen 800 includes a name field 801, an address field 802, a goods for sale field 803, a maximum quantity field 804, and a description of goods field 805. The name field 801 allows the seller to enter his/her business name. The address field 802 allows the seller to enter his/her address, e.g., an e-mail address and/or a mailing address. The goods for sale field 803 allows the seller to enter a name for the goods being sold, and the maximum quantity field 804 allows the seller to enter the amount of goods being sold, e.g., 64 boots. The description of goods field 805 allows the seller to describe the goods in greater detail, e.g., "Edmund Hillary hiking boots; rated AAA by the Am. Hikers Assoc., also known as 'Good to Go Boots.'" The description of goods field 805 may include a link to an HTML page or a digital photograph.

The seller's screen 800 may include an initial price field 806, a minimum price field 807, a minimum sale quantity 808, an order quantity limit 809, an offer reject threshold 810, and a pricing scheme 811. The initial price field 806 represents the PowerBuy starting price. The minimum price field 807 represents the lowest price for which a good may be sold. The order quantity limit 809 represents the maximum number of goods which may be sold to a single customer. The offer reject threshold 810 represents the highest price for which an offer will be considered "reasonable." The pricing scheme 811 defines whether price curve is represented in line segments or step-wise.

The seller's screen 800 may include a cost curve 812, an ignore scheme 813, a window price 814, a seller's bonus program 815, a buyer's bonus program 816, and product delivery information 817. The cost curve 812 defines whether the cost curve is in line segments or step-wise. The ignore scheme 813 defines whether the ignore curve is line segments or step-wise. The window price 814 defines the height of the price window and is used to encourage customers to notify their friends of the PowerBuy. The seller's bonus program 815 and the buyer's bonus program 816 may be part of a loyalty management program; e.g., Mercata bucks that may be used for subsequent PowerBuys. The product delivery information 817 may be used to specify how purchased products are shipped and corresponding pricing information.

The seller's screen 800 may include an abstract for partner sites 818 and a seller security/certification data field 819. The abstract for partner sites 818 allows the seller to enter abstract terms that may be recognized by the PowerBuy system in order to link the seller's products/services to partner sites interested in hosting PowerBuys for products/services represented by the abstract terms. For example, a seller might use the abstract terms "hiking; boots." One partner site may be setup to host PowerBuys related to "hiking" and another partner site may be setup to host PowerBuys related to "boots." Accordingly, the seller will have super-aggregated demand to include two partner sites, in addition to the owner's site. While "boots" might represent a product/service category in the PowerBuy menu tree, more abstract terms such as "hiking" might not be specifically represented in the PowerBuy menu tree, although products/services might well be describable by the term. The seller security/certification data field 819 allows a seller to provide information related to the seller's financial responsibility.

One skilled in the art will recognize that the seller's screen 800 may include a different number of fields than shown in FIG. 8. In addition, an ordinary artisan will recognize that a streamlined screen may be provided to large-scale sellers who frequently provide products/services for PowerBuys.

FIG. 9 shows an exemplary seller's screen 900 as completed by a particular seller, a Girl Scout troop from Bellevue, Wash., for the sale of a specific lot of goods, Girl Scout thin mint cookies, according to an embodiment of the invention.

The completed seller's screen 900 includes a name field 901, an address field 902, a goods for sale field 903, a maximum quantity field 904, and a description of goods field 905. The name field 901 provides the seller's name, "Troop 36—Bellevue." The address field 902 includes the seller's e-mail address, "troop36@msn.com." The goods for sale field 903 lists the item for sale as "cookies." The maximum quantity field 904 lists 200 boxes as being offered for sale. The description of goods field 905 allows the scouts to describe their cookies in greater detail, including providing an offer to donate some of their profits to charity.

The seller's screen 900 may include an initial price field 906, a minimum price field 907, a minimum sale quantity 908, an order quantity limit 909, an offer reject threshold 910, and a pricing scheme 911. The initial price field 906 indicates that the PowerBuy starting price will be $5.00. The minimum price field 907 states that the lowest price for a box of cookies will be $3.00. The order quantity limit 909 indicates that any number of cookie boxes may be sold to a single customer. The offer reject threshold 910 indicates that any offer at or above $3.00 will be considered "reasonable."

The pricing scheme 911 states that the price curve is defined as "PowerBuy automatic." As previously indicated in this application and related applications, the price curve may be defined in line segments or step-wise. To expand PowerBuys to larger groups of sellers, certain features may be selected in an "automatic" mode so that sellers are not required to understand the intricacies of micro-economics or the pricing tool. In the automatic mode, the pricing tool will render all items selected as "automatic" to be consistent with all other related selections. The pricing tool may include a sophisticated automatic selection mechanism that makes appropriate selections based on the specific type of goods offered, for example, or the pricing tool may include lesser sophistication, such as simply defining the "automatic" mode as being either "line segments" or "step-wise" for all selections. In any configuration, the automatic mode frees the seller from having to understand precisely how the PowerBuy will be conducted. The seller may also actuate a "show me" button 911a that illustrates precisely how the automatically selected feature will operate and provide the seller with greater information with which to make an informed choice.

The seller's screen 900 may include a cost curve 912, an ignore scheme 913, a window price 914, a seller's bonus program 915, a buyer's bonus program 916, and product delivery information 917. The cost curve 912 typically defines whether the cost curve is line segment or step-wise. As shown here, the cost curve 912 may be selected in an "automatic" mode that operates similarly to the "automatic" mode described in pricing curve 911. Likewise, the ignore scheme 913 and the window price 914 have also been established to operate in an automatic mode. Each automatic mode selection may include a corresponding "show me" button, e.g., "show me" buttons 911a–914a.

The sellers have indicated that their participation earns them points in a bonus program 915 while buyers do not automatically earn points in a bonus program 916. The product delivery information field 917 indicates that products will be shipped via UPS a cost of 50 cents per box.

An abstract for traffic sites 919 field indicates that the seller's have entered the system recognized terms of "King County; Snohomish County; Girl Scouts; Charity; Youth, and Food." Accordingly, a partner site automatically linked to host PowerBuys for one or more of these abstract terms could be configured to provide a link to the scouts' thin mint cookie PowerBuy. Accordingly, the scouts should attain a super-aggregated demand for their cookie sales efforts. In the event that a particular partner does not operate in an abstract mode, then the partner will only display the scouts' PowerBuy when the partner has selected a category/product in the PowerBuy menu tree that contains the product "cookies."

A seller security/certification data field 919 indicates that the sellers have shown their financial responsibility by providing the name of their bank and a contact person at the bank.

One skilled in the art will recognize that the seller's screen 900 may include a different number of fields than shown in FIG. 9. In addition, an ordinary artisan will recognize that a streamlined screen may be provided to large-scale sellers who frequently provide items for PowerBuys.

FIG. 10 illustrates an exemplary partner screen 1000 that could be used by a partner to select which PowerBuys to display, according to an embodiment of the invention. The screen 1000 may include the partner's name, such as the King County News Bureau and Shoppers' Net 203.

The screen 1000 contains a display PowerBuy products/services field 1001 which allows the partner to specify a precise product/service. As shown in FIG. 10, the partner has selected to display the product category "food." In addition, if the partner actuates a Search PowerBuy Menu Tree button 1012, then the partner may search all the products/categories in the PowerBuy menu tree and may select additional products/services or categories.

The partner may also select PowerBuys by using an abstract terms field 1002. The partner need not use the abstract terms field 1002, and the partner may select whether the abstract terms will be used either exclusively or non-exclusively with the products/services field 1001. As shown in FIG. 10, the partner has turned on the abstract terms field 1002 and indicated that it will be used nonexclusively with the products/services field 1001. In the abstract terms field 1002, the partner has selected "King County; All-weather gear; Boats/sailing; Computers; Huskies, and Food" as abstract terms. The screen 1000 may also contain a search abstracts button 1003 whose actuation will produce a list of selectable abstract terms. In some embodiments, the abstracts button 1003 may also indicate how many products/services are presently associated with the abstract term in the PowerBuy menu tree. One skilled in the art can easily develop a variety of alternative schemes, some based upon the volume of products/services available for PowerBuys.

A display links field 1004 allows the partner to determine whether all links will be displayed for abstract terms 1005 by selecting a box 1006 or whether links will only be displayed for some selected number of common abstract terms 1007 by a selecting box 1008. For example, if a partner selected box 1006, then the partner would display PowerBuys for all products/services located by a search of the abstract terms 1002. On the other hand, if the partner selected the box 1008, and indicated two abstract terms, then the partner would display PowerBuys for all products/services having two or more of the abstract terms listed in the abstract terms 1002. Referring to the partner sites field 919 of FIG. 9 and the abstract terms 1002, if the partner indicated that two abstract terms 1007 were necessary, then the Girl Scouts' thin mint cookies would be available via a PowerBuy from the partner site 203. On the other hand, if the abstract terms 1007 required more than two similar terms, then partner site 203 would not display a PowerBuy of the Girl Scouts' thin mint cookies. Of course, the partner has additionally selected the product/service "food," which may represent a category containing the product "cookies," in which case, the scouts' PowerBuy would be displayed on the partner site 203.

The partner may also decide how the site displays PowerBuy products/services by making a selection in a field 1010, such as selecting a "carousel" display mode in which displayed products/services rotate according a partner-selectable time field 1011, e.g., every 20 seconds. For example, once the partner has submitted this selection, then the rules engine 401 and the display selector 410 would have further guidance in determining which particular PowerBuy to display at a given instance for customers arriving from the partner's site. Of course, one skilled in the art can easily imagine other display schemes besides a carousel display mode, such as a weighted display mode where products/services are displayed for differing time periods on some particular basis, such as having a greater number of matching abstract terms than another displayable product/service. Other applicable schemes could include a "random" display scheme or a "shuffle" display scheme.

FIG. 11A illustrates a multi-seller, multi-partner system 1101, according to an embodiment of the invention. The system 1101 comprises a PowerBuy platform 1102, multiple sellers 1104–1106, and multiple partners 1107–1108. A seller/traffic filter 1103 associated with the PowerBuy platform 1102 includes rules for determining which partner sites receive which particular PowerBuy product/service at any given instance. For example, using the thin mint cookie PowerBuy shown in FIG. 9 and the partner site 203 having the characteristics shown in FIG. 10, the seller/traffic filter 1103 would determine when to display the thin mint cookie PowerBuy on the partner site 203. A skilled artisan can easily tell that the seller/traffic filter 1103 would perform a high volume of calculations in many multiple seller/multiple partner environments. For example, assume seller groups collectively place 12,000 products into the PowerBuy platform 1102 having connections to 1,000 partner sites. Assume further that each partner site operates in either a carousel, random, or shuffle mode with updates/changes several times per minute. Accordingly, the seller/traffic filter 1103 will be required to provide at least one new display/link every few seconds, depending upon customer volume. Knowing the required throughput of the seller/traffic filter 1103, a skilled artisan should be able to identify an appropriate calculation engine to drive the seller/traffic filter's operations. Of course, the seller/traffic filter 1103 could combine features of the rules engine 401 and the display selector 410.

FIG. 1A illustrates sellers inputting PowerBuy product/service data into the PowerBuy platform 1102 via the seller/partner filter 1103. FIG. 11B is a flowchart showing the seller/partner filter's processing of partner tags arriving at the PowerBuy platform 1102 from customers at the partner sites, according to an embodiment of the invention.

The seller/partner filter 1103 receives a tag from a customer at a partner site, e.g. the partner site 1 1107 (step 1109). The seller/partner filter 1103 searches the PowerBuy menu tree using the received tag to locate the respective partner's PowerBuy products/services, e.g. the products, services and categories previously registered by the partner (step 1111).

The seller/partner filter 1103 determines if more than one PowerBuy product/service is available for display to the customer (step 1113). For example, more than one product or service may be available when the partner has registered a product category having multiple products and more than one of those products are currently offered in PowerBuys. If the seller/partner filter 1103 determines that only a single product/service is presently offered in a PowerBuy, then the seller/partner filter 1103 displays to the customer a link to the selected PowerBuy product/service (step 1123).

If the seller/partner filter 1103 determines that multiple products/services are available for display to the customer (step 1113), then the seller/partner filter 1103 examines the partner characteristics data to locate any filtering information provided by the partner hosting the partner site from which the customer's tag originated (step 1115). The seller/partner filter 1103 filters the available PowerBuy products/services using the located partner filter (step 1117). For example, as previously discussed, a partner may indicate that PowerBuy products/services will be displayed on the basis of a carousel arrangement. In such a situation, the seller/partner filter 1103 would determine which of the products/services presently being offered in PowerBuys and previously selected by the partner as a displayable product/service is presently marked for carousel display.

Applying the partner's filter may not necessarily result in a single PowerBuy product/service. Accordingly, the seller/partner filter 1103 determines whether more than one PowerBuy product/service is still available for display (step 1119). If the seller/partner filter 1103 determines that only a single PowerBuy product/service is available for display after filtering (step 1119), then the seller/partner filter 1103 displays to the customer the appropriate link to the PowerBuy product/service (step 1123).

If the seller/partner filter 1103 determines that more than one PowerBuy product/service is still available for display after filtering (step 1119), then the seller/partner filter 1103 applies logic from the PowerBuy platform 1102 to reduce the PowerBuy product/service choices down to a single PowerBuy product/service (step 1121). For example, the PowerBuy platform 1102 may have embedded rules for resolving multiple product/service choices down to a single choice. The seller/partner filter 1103 then displays a link to the PowerBuy product/service to the customer (step 1123).

As previously indicated, the seller/partner filter 1103 will receive numerous tags from customers visiting partner sites. Accordingly, the seller/partner filter 1103 may process customer tags in an essentially endless loop. Of course, as one skilled in the art will recognize, the PowerBuy platform 1102, and/or the seller/partner filter 1103, will to contain an ability to terminate processing of the customer tags when necessary, such as a shut down of the PowerBuy platform 1102 for maintenance.

A skilled artisan will recognize that some partner sites may allow display of multiple PowerBuy links. In such circumstances, the seller/partner filter 1103 will not need to select a single PowerBuy product/service but will instead determine which of the partner's previously selected products/services are presently active in PowerBuys and display all pertinent links to the customer.

FIG. 12 illustrates the PowerBuy platform 1102 hosting an exclusive PowerBuy, according to an embodiment of the invention. As shown in FIG. 3, the PowerBuy platform may be used to host exclusive PowerBuys for particular manufacturers, merchants, or other sellers. In such arrangements, the PowerBuy platform 1102 essentially partitions a portion of its site off for an exclusive PowerBuy 1202. The Big Animation Co. category 602 provides an exemplary exclusive PowerBuy 1202.

In a completely exclusive PowerBuy, customers 1200 access a Partner Site 1201 where they can access a link 1203 to the exclusive PowerBuy 1202 hosted on the PowerBuy platform 1102. For example, the Partner Site 1201 may represent an entity who does not have the sophistication, or computing power, to host a PowerBuy without resort to the facilities provided by the PowerBuy platform 1102. In addition, the Owner of the PowerBuy platform 1102 may decline to license the PowerBuy technology to the Partner Site 1201. In the alternative, the Owner can license the PowerBuy technology to the Partner Site 1201 which can then host its own PowerBuys without necessity for using the Power Buy Platform 1102.

FIG. 13 shows a representative data flow that occurs when PowerBuys are selected by an operator of a partner site for use in connection with that site, according to an alternative embodiment of the invention. The data flow shown in FIG. 13 is applicable to both non-exclusive and exclusive PowerBuys. The data flow shown is applicable to the embodiment of the invention in which administration of the PowerBuy is carried out by the Owner.

A partner uses the PowerBuy setup tool 400 to indicate in a PowerBuy table 1301 which particular product(s) the partner wants displayed to customers who link to the Owner's main site from the partner's site. When the PowerBuy close server 404 begins a PowerBuy, the PowerBuy close server 404 accesses a product table 1302 to determine which partners may display the PowerBuy. Accordingly, the PowerBuy Partner Product Display Page 402 will display the PowerBuy to partners 406–408 provided the partner is identified in the Product Table 1302.

Embodiments of the invention may further include a help system, including a wizard that directs a seller through the steps of completing any or all of the PowerBuy screens or configurable parameters.

The Owner's main site and its related functions may be written for operation with any computer operating system and for operation in any computing environment. In addition, the PowerBuy system may be designed using CORBA, ACTIVEX® controls, and/or Java applets. According to one embodiment of the invention, Java applets may provide a plug-in PowerBuy production system for use with another application on both a single computer and in a networked embodiment. Java is a useful language for programming applications for the World Wide Web since users access the web from many different types of computers.

The PowerBuy screens may be displayed using any application user interface techniques but will preferably utilize the "what-you-see-is-what-you-get" ("WYSIWYG") display paradigm. One skilled in the art may easily recognize numerous alternate approaches to providing a user interface to receive the information needed to support a PowerBuy.

Under embodiments of the invention, a remote customer computing system having browsing software may participate in the PowerBuy system via Hypertext Markup Language ("HTML") documents, Dynamic Hypertext Mark-Up Language ("DHTML") documents, Extensible Mark-Up Language ("XML") documents, and/or other similar formats over an electronic network, such as the World Wide Web. A remote computing system associated with the PowerBuy production system may further utilize protocols such as SNMP, TCP, and UDP/IP in order to send instructions and otherwise communicate with various other PowerBuy components. The PowerBuy system may operate with protocols and languages in addition to those specifically disclosed herein. Similarly, the PowerBuy system may be developed using an object-oriented programming methodology or using any other programming methodology that results in a computing system having equivalent functionality.

The invention has been discussed in terms of computer programs but is equally applicable for systems utilizing hardware that performs similar functions, such as application specific integrated circuits ("ASICs").

An ordinary artisan should require no additional explanation in developing the methods and systems described herein but may nevertheless find some possibly helpful guidance in the preparation of these methods and systems by examining standard reference works in the relevant art.

All U.S. patents and applications are incorporated herein by reference as if set forth in their entirety.

The invention has been discussed in terms of goods/services offered for sale by a PowerBuy business method. Of course, other embodiments of the invention are application to the sales of goods/services using other business methods, including but not limited to the sale of goods by auction.

These and other changes can be made to the invention in light of the above detailed description. In general, in the following claims, the terms used should not be construed to limit the invention to the specific embodiments disclosed in the specification and the claims, but should be construed to include all electronic commerce systems that operate under the claims set forth hereinbelow. Accordingly, the invention is not limited by the disclosure, but instead its scope is to be determined entirely by the following claims.

What is claimed is:

1. A system for designating among a plurality of group buying offers which offers to display on a website, the system comprising:
a product/service characteristics repository configured to store descriptions of product/service offers from a plurality of different and non-affiliated partners, the descriptions comprising designations made by a plurality of different and non-affiliated partners of which of the group buying offers to make available to users of a partner's own website;
a network buying cooperative website configured to display group buying offers to a user of a partner site who accesses the cooperative site from the partner website, wherein the offers that are displayed to the user depend on the partner website from which the cooperative website is accessed; and
a rules engine configured to access the product/service characteristics repository and select, based on the partner site from which a user accesses the cooperative site and any designations made by the partner and stored in the repository, which of a plurality of group buying offers to display to the user.

2. The system of claim 1, further comprising:
a display selector configured to select one network buying cooperative product/service to display to a user from among a plurality of group buying offers.

3. The system of claim 1 further comprising:
a setup tool configured to allow a partner to remotely access the product/service characteristics repository a set of network buying cooperative products/services for display to users accessing the network buying cooperative's website from a link on the partner's site.

4. The system of claim 1, further comprising:
a setup tool configured to allow a partner to remotely access the product/service characteristics repository and add network buying cooperative product/service data to the repository.

5. The system of claim 1, wherein the network buying cooperative's website is a World Wide Web site.

6. The system of claim 1, wherein the product/service repository is further configured to organize descriptions of offers provided by a plurality of different and non-affiliated partners in a tree structure.

7. The system of claim 1 wherein the descriptions of product/service offers comprises a set of abstract terms from a partner related to product/service offerings and wherein the rules engine locates a set of products/services matching the set of abstract terms and displays at least one product/service from the set of products/services to the user.

8. The system of claim 1 wherein the product/service data comprises a display scheme and wherein the rules engine is configured to use the product/service data to determine the at least one network buying cooperative product/service suitable for display to the user.

9. The system of claim 8 wherein the display scheme is one of a carousel display, a shuffle display, and a random display.

10. A method for designating among a plurality of group buying offers which offers to display on a website, the method comprising:
providing a product/service characteristics repository configured to store descriptions of product/service offers from a plurality of different and non-affiliated partners, the descriptions comprising designations from a partner of which of the group buying offers to make available to users of the partner's own website;
supplying a link to a network buying cooperative website to the partner based on the designations made by the partner through which a user of the partner website can access the cooperative website; and
selecting, based on the partner site from which a user accesses the cooperative site and any designations made by the partner and stored in the repository which of a plurality of group buying offers to display to the user.

11. The method of claim 10, further comprising:
displaying one network buying cooperative product/service to the user from among a plurality of group buying offers.

12. The method of claim 10, further comprising:
providing a setup tool that allows a partner to remotely access the product/service characteristics repository and select a set of network buying cooperative products/services for display to the user accessing the network buying cooperative's website from the partner's site.

13. The method of claim 10, further comprising:
providing a setup tool configured to allow a partner to remotely access the product/service characteristics repository and add network buying cooperative products/services to the repository.

14. The method of claim 10, wherein the network buying cooperative's website is a World Wide Web site.

15. The method of claim 10, further comprising organizing the product/service repository in a tree structure configured to receive descriptions provided by different and non-affiliated partners.

16. The method of claim 10, the designations from the partner further comprising abstract data used to select at least one group buying offer to display to the user.

17. The computer-readable medium of claim 10, further comprising:
displaying one network buying cooperative product/service to the user from among a plurality of group buying offers.

18. The method of claim 10 wherein the designations from a partner are in the form of abstract terms.

19. The method of claim 10 wherein the product/service characteristics repository is further configured to store display schemes provided by a plurality of different and non-affiliated partners.

20. The method of claim 19 wherein the display schemes provided by a plurality of different and non-affiliated partners are a carousel display, a shuffle display, and a random display.

21. A system for filtering network buying cooperative products/services for selection and display to customers linked to a network buying cooperative site from a partner site, comprising:
a partner identification data receiver that has been configured to receive partner identification data for the partner site;
a product-services/category receiver that has been configured to receive product/service identification data and category data for the partner site, wherein the category data pertains to network buying cooperative product/service categories and wherein received product/service identification data and received category data determine a set of network buying cooperative products/services suitable for selection and display to customers linked from the partner site; and
a terms receiver that has been configured to receive abstract terms from a partner related to the network buying cooperative products/services from the partner site and use the received abstract terms to select a set of network buying cooperative products/services suitable for selection and display to the customers.

22. The system of claim 21, further comprising:
an exclusivity receiver configured to receive instructions from the partner indicating whether the products-services/category receiver should be disabled.

23. The system of claim 21, further comprising:
a display receiver that has been configured to receive network buying cooperative product/service display instructions from a partner regarding the selection of network buying cooperative products/services to display to the customers.

24. The system of claim 23 wherein the display receiver has been configured to receive display instructions having a type of carousel display, shuffle display, or random display.

25. A system for selecting from a plurality of products/services which products/services to display on a website, the system comprising:
a product/service characteristics repository configured to store descriptions of products/services from a plurality of different and non-affiliated partners, the descriptions comprising designations from the partner of which products/services to make available to users of a partner's own website;
a product/service display site configured to display products/services to a user of a partner site who accesses the product/service display from the partner website, wherein the offers that are displayed to the user depend on the partner website from which the cooperative website is accessed; and
a rules engine configured to access the product/service characteristics repository and select, based on the partner site from which a user accesses the product/service display and any designations made by the partner and stored in the repository, which of a plurality of products/services to display to the user.

26. The system of claim 25, further comprising:
a display selector configured to select one product/service to display to a user from among a plurality of products/services.

27. The system of claim 25, further comprising:
a setup tool configured to allow a partner to remotely access the product/service characteristics repository and select a set of products/services for display to customers accessing the product/service display site from the partner's site.

28. The system of claim 25, further comprising:
a setup tool configured to aid sellers in adding products/services to the product/service characteristics repository.

29. The system of claim 25, further comprising:
a group communication medium configured to allow the user to communicate with other users on the partner site.

30. The system of claim 29 wherein the group communication medium is at least one of a message board or a chat facility.

31. A method of selecting from a plurality of products/services which products/services to display on a website, the method comprising:
providing a product/service characteristics repository configured to store descriptions of products/services from a plurality of different and non-affiliated partners, the descriptions comprising designations from a partner of which products/services offers to make available to users of the partner's own website;
supplying a link to a product/service display site to the partner based on the designations made by the partner through which a user of the partner website can access the product/service display site; and
selecting, based on the partner site from which a user accesses the cooperative site and any designations made by the partner and stored in the repository which of a plurality of products/services to display to the user.

32. The method of claim 31, further comprising:
displaying one product/service to the user from among a plurality of products/services.

33. The method of claim 31, further comprising:
providing a setup tool that allows a partner to remotely access the product/service characteristics repository and select a set of products/services for display to users accessing the product/service display site from the partner's site.

34. The method of claim 31, further comprising:
providing a setup tool configured to allow a partner to remotely access the product/service characteristics repository and add products/services to the repository.

35. The method of claim 31, wherein the product/service display site is a World Wide Web site.

36. A method for displaying products/services to a customer of a plurality of customers linked to a display site from a partner site of a plurality of partner sites, comprising:
receiving a link from the customer of the plurality of customers at the partner site of the plurality of partner sites;
examining a data repository to determine an exclusive product/services set previously selected for customer viewing at the partner site using partner site exclusivity data provided by the partner;
identifying products/services in the exclusive product/services set that are presently offered for sale and satisfying the partner site exclusivity data; and selecting one product/service of the identified product/services for display to the customer.

37. A system for designating among a plurality of group buying offers which offers to display on a website, the system comprising:
a product/service characteristics repository configured to store descriptions of product/service offers from a plurality of different and non-affiliated partners, the descriptions comprising designations made by a plurality of different and non-affiliated partners of which of the group buying offers to make available to users of a partner's own website, wherein the plurality of group buying offers includes at least one group buying offer that is exclusively available to users associated with a single specific partner;
a network buying cooperative website configured to display group buying offers to a user of a partner site who accesses the cooperative site from the partner website, wherein the offers that are displayed to the user depend on the partner website from which the cooperative website is accessed; and
a rules engine configured to access the product/service characteristics repository and select, based on the partner site from which a user accesses the cooperative website and any designations made by the partner and stored in the repository, which of a plurality of group buying offers to display to the user, wherein at least one group buying offer is available for display exclusively to users accessing the cooperative site from the partner's site.

38. A method of designating among a plurality of group buying offers which offers to display on a website, the method comprising:
providing a product/service characteristics repository configured to store descriptions of product/service offers from a plurality of different and non-affiliated partners, the descriptions comprising designations from a partner of which of the group buying offers to make available to users of the partner's own website, wherein the plurality of group buying offers includes at least one group buying offer that is exclusively available to users of the partner's own website;
supplying a link to a network buying cooperative website to the partner based on the designations made by the partner through which a user of the partner website can access the cooperative website;
selecting, based on the partner site from which a user accesses the cooperative site and any designations made by the partner and stored in the repository which of a plurality of group buying offers to display to the user; and
displaying the at least one of a plurality of group buying offers designated for display only to users linking to the network buying cooperative's website from the partner site.

39. A computer-readable medium having computer-executable instructions for performing steps of selecting from a plurality of group buying offers which offers to display on a website, the medium comprising:
providing a product/service characteristics repository configured to store descriptions of product/service offers from a plurality of different and non-affiliated partners, the description's comprising designations from a partner of which of the group buying offers to make available to users of the partner's own website;
supplying a link to a network buying cooperative website to the partner based on the designations made by the partner through which a user of the partner website can access the cooperative website; and
selecting, based on the partner site from which a user accesses the cooperative site and any designations made by the partner and stored in the repository which of a plurality of group buying offers to display to the user.

40. A system for adding product/service offers to a network buying cooperative's site configured to select products/services for customers visiting a partner site, comprising:
a seller identification data receiver that has been configured to receive seller identification data for the seller of the offered product/services;
a sale-product/service receiver that has been configured to receive product/services identification data for the offered product/services;
a maximum quantity receiver that has been configured to receive maximum sale quantity data for the offered product/services;
an initial price receiver that has been configured to receive an initial price for the offered product/services; and
a terms receiver that has been configured to receive abstract terms from the partner related to the offered product/services, wherein the abstract terms are used by the cooperative site to select product/services offers to display to a customer visiting the partner site.

* * * * *

UNITED STATES PATENT AND TRADEMARK OFFICE
CERTIFICATE OF CORRECTION

| | |
|---|---|
| PATENT NO. | : 6,934,690 B1 |
| APPLICATION NO. | : 09/409237 |
| DATED | : August 23, 2006 |
| INVENTOR(S) | : Tom Van Horn et al. |

It is certified that error appears in the above-identified patent and that said Letters Patent is hereby corrected as shown below:

Replace claims 1-40, column 17, line 55 to column 22, line 63, as follows:

1. A system for designating among a plurality of group buying offers which offers to display on a website, the system comprising:
a product/service characteristics repository configured to store descriptions of product/ service group buying offers from a plurality of different and non-affiliated partners, the descriptions comprising designations made by a plurality of different and non-affiliated partners of which of the group buying offers to make available to users of a partner website;
a network buying cooperative website configured to display group buying offers to a user of a partner website who accesses the cooperative website from the partner website, wherein the group buying offers that are displayed to the user depend on the partner website from which the cooperative website is accessed; and
a rules engine configured to access the product/service characteristics repository and select, based on the partner website from which a user accesses the cooperative website and any designations made by the partner and stored in the repository, which of a plurality of group buying offers to display to the user.

2. The system of claim 1, further comprising:
a display selector configured to select one group buying offer to display to a user from among a plurality of group buying offers.

3. The system of claim 1, further comprising:
a setup tool configured to allow a partner to remotely access the product/service characteristics repository and select a set of products/services for display to users accessing the cooperative website from a link on the partner website.

4. The system of claim 1, further comprising:
a setup tool configured to allow a partner- to remotely access the product/service characteristics repository and add product/service data to the repository.

5. The system of claim 1, wherein the network buying cooperative website is a World Wide Website.

UNITED STATES PATENT AND TRADEMARK OFFICE
CERTIFICATE OF CORRECTION

PATENT NO. : 6,934,690 B1
APPLICATION NO. : 09/409237
DATED : August 23, 2006
INVENTOR(S) : Tom Van Horn et al.

It is certified that error appears in the above-identified patent and that said Letters Patent is hereby corrected as shown below:

6. The system of claim 1, wherein the product/service repository is further configured to organize descriptions of offers provided by a plurality of different and nonaffiliated partners in a tree structure.

7. The system of claim 1, wherein the descriptions of product/service offers comprise a set of abstract terms related to products/services and wherein the rules engine locates a set of products/services matching the set of abstract terms and displays at least one product/service from the set of products/services to the user.

8. The system of claim 1 wherein a product/service group buying offer description comprise a display scheme and wherein the rules engine is configured to use the group buying offer description to determine at least one group buying offer suitable for display to a user.

9. The system of claim 8, wherein the display scheme is one of a carousel display, a shuffle display, and a random display.

10. A method for designating among a plurality of group buying offers which offers to display on a website, the method comprising:
providing a product/service characteristics repository configured to store descriptions of product/service group buying offers from a plurality of different and non-affiliated partners, the descriptions comprising designations from a partner of which of the group buying offers to make available to users of a partner website;
supplying a link to a network buying cooperative website to the partner based on the designations made by the partner through which a user of the partner website can access the cooperative website; and
selecting based on the partner website from which a user accesses the cooperative website and any designations made by the partner and stored in the repository which of a plurality of group buying offers to display to the user.

11. The method of claim 10, further comprising:
displaying a group buying offer to the user from among a plurality of group buying offers.

UNITED STATES PATENT AND TRADEMARK OFFICE
CERTIFICATE OF CORRECTION

PATENT NO. : 6,934,690 B1
APPLICATION NO. : 09/409237
DATED : August 23, 2006
INVENTOR(S) : Tom Van Horn et al.

It is certified that error appears in the above-identified patent and that said Letters Patent is hereby corrected as shown below:

12. The method of claim 10, further comprising:
providing a setup tool that allows a partner to remotely access the product/service characteristics repository and select a set of network products/services for display to the user accessing the cooperative website from the partner website.

13. The method of claim 10, further comprising:
providing a setup tool configured to allow a partner to remotely access the product/service characteristics repository and add network buying cooperative product/service group buying offers to the repository.

14. The method of claim 10, wherein the network buying cooperative website is a World Wide Web site.

15. The method of claim 10, further comprising organizing the product/service repository in a tree structure configured to receive descriptions provided by different and non-affiliated partners.

16. The method of claim 10, the designations from the partner further comprising abstract data adapted to be used to select at least one group buying offer to display to the user.

17. The method of claim 10, further comprising:
displaying a group buying offer to the user from among a plurality of group buying offers.

18. The method of claim 10, wherein the designations from the partner are in the form of abstract terms.

19. The method of claim 10, wherein the product/service characteristics repository is further configured to store display schemes provided by a plurality of different and non-affiliated partners.

UNITED STATES PATENT AND TRADEMARK OFFICE
CERTIFICATE OF CORRECTION

| | | |
|---|---|---|
| PATENT NO. | : 6,934,690 B1 | |
| APPLICATION NO. | : 09/409237 | |
| DATED | : August 23, 2006 | |
| INVENTOR(S) | : Tom Van Horn et al. | |

It is certified that error appears in the above-identified patent and that said Letters Patent is hereby corrected as shown below:

20. The method of claim 19, wherein the display schemes provided by a plurality of different and non-affiliated partners include a carousel display, a shuffle display, or a random display.

21. A system for filtering network buying cooperative products/services for selection and displaying products/services to customers linked to a network buying cooperative website from a partner website, comprising:
a partner identification data receiver configured to receive identification data for a partner for the partner website, wherein the partner is any of a plurality of different and nonaffiliated partners;
a product/service category receiver configured to receive product/service identification data and category data for the partner website, wherein the partner is any of a plurality of different and nonaffiliated partners, and wherein the product/service identification data and category data is adapted for use in determining a set of network buying cooperative products/services suitable for selection and display to customers linked from the partner website; and
a terms receiver configured to receive abstract terms related to network buying cooperative products/services from the partner website and use the received abstract terms to select a set of network buying cooperative products/services suitable for selection and display to the customers.

22. The system of claim 21, further comprising:
an exclusivity receiver configured to receive instructions from a partner indicating whether the product/service category receiver should be disabled.

23. The system of claim 21, further comprising:
a display receiver configured to receive instructions from a partner regarding the selection of network buying cooperative products/services to display to the customers.

24. The system of claim 23, wherein the display receiver has been configured to receive instructions for one of a carousel display, shuffle display, or random display.

UNITED STATES PATENT AND TRADEMARK OFFICE
CERTIFICATE OF CORRECTION

| | |
|---|---|
| PATENT NO. | : 6,934,690 B1 |
| APPLICATION NO. | : 09/409237 |
| DATED | : August 23, 2006 |
| INVENTOR(S) | : Tom Van Horn et al. |

It is certified that error appears in the above-identified patent and that said Letters Patent is hereby corrected as shown below:

25. A system for selecting from a plurality of products/services which products/services to display to a user, the system comprising:
a product/service characteristics repository configured to store descriptions of products/services from a plurality of different and non-affiliated partners, the descriptions comprising designations from a partner of which products/services to make available to users of a partner website;
a product/service display website configured to display products/services to a user of the partner website who accesses the product/service display website from the partner website, wherein the offers displayed to the user depend on the partner website from which the product/service display website is accessed; and
a rules engine configured to access the product/service characteristics repository and select, based on the partner website from which a user accesses the product/service display website and any designations made by the partner and stored in the repository, which of a plurality of products/services to display to the user.

26. The system of claim 25, further comprising:
a display selector configured to select a product/service to display to a user from among a plurality of products/services.

27. The system of claim 25, further comprising:
a setup tool configured to allow a partner to remotely access the product/service characteristics repository and select a set of products/services for display to customers accessing the product/service display website from the partner website.

28. The system of claim 25, further comprising:
a setup tool configured to aid sellers in adding product/service characteristics to the product/service characteristics repository.

29. The system of claim 25, further comprising:
a group communication medium configured to allow a user to communicate with other users on the partner website.

30. The system of claim 29, wherein the group communication medium is at least one of a message board or a chat facility.

UNITED STATES PATENT AND TRADEMARK OFFICE
CERTIFICATE OF CORRECTION

| | |
|---|---|
| PATENT NO. | : 6,934,690 B1 |
| APPLICATION NO. | : 09/409237 |
| DATED | : August 23, 2006 |
| INVENTOR(S) | : Tom Van Horn et al. |

It is certified that error appears in the above-identified patent and that said Letters Patent is hereby corrected as shown below:

31. A method of selecting from a plurality of products/services which products/services to display on a product/service display website, the method comprising:
providing a product/service characteristics repository configured to store descriptions of products/services from a plurality of different and non-affiliated partners, the descriptions comprising designations from a partner of which products/services offers to make available to users of a partner website;
supplying a link to a product/service display website to the partner based on designations made by the partner through which a user of the partner website can access the product/service display website; and
selecting based on the partner website from which a user accesses the and any designations made by the partner and stored in the repository which of a plurality of products/services to display to the user.

32. The method of claim 31, further comprising displaying one product/service to the user from among a plurality of products/services.

33. The method of claim 31, further comprising:
providing a setup tool that allows a partner to remotely access the product/service characteristics repository and select a set of products/services for display to users accessing the product/service display website from the partner website.

34. The method of claim 31, further comprising:
providing a setup tool configured to allow a partner to remotely access the product/service characteristics repository and add product/service characteristics to the repository.

35. The method of claim 31, wherein the product/service display website is a World Wide Web site.

UNITED STATES PATENT AND TRADEMARK OFFICE
CERTIFICATE OF CORRECTION

PATENT NO. : 6,934,690 B1
APPLICATION NO. : 09/409237
DATED : August 23, 2006
INVENTOR(S) : Tom Van Horn et al.

It is certified that error appears in the above-identified patent and that said Letters Patent is hereby corrected as shown below:

36. A system for designating among a plurality of group buying offers which offers to display on a website, the system comprising:
a product/service characteristics repository configured to store descriptions of product/service group buying offers from a plurality of different and non-affiliated partners, the descriptions comprising designations made by a plurality of different and non-affiliated partners of which of the group buying offers to make available to users of a partner website, wherein the plurality of group buying offers includes at least one group buying offer that is exclusively available to users associated with a single specific partner;
a network buying cooperative website configured to display group buying offers to a user of a partner website who accesses the cooperative website from the partner website, wherein the group buying offers displayed to the user depend on the partner website from which the cooperative website is accessed; and
a rules engine configured to access the product/service characteristics repository and select, based on the partner website from which a user accesses the cooperative website and any designations made by the partner and stored in the repository, which of a plurality of group buying offers to display to the user, wherein at least one group buying offer is available for display exclusively to users accessing the cooperative website from the partner website.

37. A method of designating among a plurality of group buying offers which offers to display on a website, the method comprising:
providing a product/service characteristics repository configured to store descriptions of product/service group buying offers from a plurality of different and non-affiliated partners, the descriptions comprising designations from a partner of which of the group buying offers to make available to users of a partner website, wherein the plurality of group buying offers includes at least one group buying offer exclusively available to users of the partner website;
supplying a link to a network buying cooperative website to the partner based on the designations made by the partner through which a user of the partner website can access the cooperative website;
selecting based on the partner website from which a user accesses the cooperative website and any designations made by the partner and stored in the repository which of a plurality of group buying offers to display to the user; and
displaying the at least one group buying offer exclusively available to users of the partner website.

UNITED STATES PATENT AND TRADEMARK OFFICE
CERTIFICATE OF CORRECTION

| | | |
|---|---|---|
| PATENT NO. | : 6,934,690 B1 | |
| APPLICATION NO. | : 09/409237 | |
| DATED | : August 23, 2006 | |
| INVENTOR(S) | : Tom Van Horn et al. | |

It is certified that error appears in the above-identified patent and that said Letters Patent is hereby corrected as shown below:

38. A computer-readable medium having computer-executable instructions for performing the steps of selecting from a plurality of group buying offers which offers to display on a website, the medium comprising:
providing a product/service characteristics repository configured to store descriptions of product/service offers from a plurality of different and non-affiliated partners, the descriptions comprising designations from a partner of which of the group buying offers to make available to users of a partner own website;
supplying a link to a group buying cooperative website to the partner based on the designations made by the partner through which a user of the partner website can access the cooperative website; and
selecting, based on the partner website from which a user accesses the cooperative website and any designations made by the partner and stored in the repository which of a plurality of group buying offers to display to the user.

39. A system for adding product/service offers to a network buying cooperative website configured to select products/services for customers visiting a partner website, comprising:
a seller identification data receiver configured to receive seller identification data for a seller of offered products/services;
a product/service data receiver configured to receive products/services identification data for offered products/services;
a maximum quantity receiver configured to receive maximum sale quantity data for offered products/services;
an initial price receiver configured to receive an initial price for an offered products/services; and
a terms receiver configured to receive abstract terms related to offered product/services from a partner, wherein the partner is any of a plurality of different nonaffiliated partners, and wherein the abstract terms are adapted for use by the cooperative website to select product/service offers to display to a customer visiting the partner website.

UNITED STATES PATENT AND TRADEMARK OFFICE
CERTIFICATE OF CORRECTION

PATENT NO. : 6,934,690 B1  
APPLICATION NO. : 09/409237  
DATED : August 23, 2006  
INVENTOR(S) : Tom Van Horn et al.

It is certified that error appears in the above-identified patent and that said Letters Patent is hereby corrected as shown below:

40. A method for displaying products/services to a customer of a plurality of customers linked to a display website from a partner website of a plurality of partner websites, comprising:
receiving a link from the customer of the plurality of customers at the partner website of the plurality of partner sites wherein the partner is one of a plurality of different and nonaffiliated partners;
examining a data repository to determine an exclusive product/services set previously selected for customer viewing at the partner website using partner website exclusivity data provided by the partner;
identifying products/services in the exclusive product/service set that are presently offered for sale; and selecting one product/service of the identified product/services for display to the customer consistent with the exclusivity data provided by the partner.

Signed and Sealed this

Fourth Day of September, 2007

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 6,934,690 B1 | |
| APPLICATION NO. | : 09/409237 | |
| DATED | : August 23, 2005 | |
| INVENTOR(S) | : Tom Van Horn et al. | |

It is certified that error appears in the above-identified patent and that said Letters Patent is hereby corrected as shown below:

Replace claims 1-40, column 17, line 55 to column 22, line 63, as follows:

1. A system for designating among a plurality of group buying offers which offers to display on a website, the system comprising:
a product/service characteristics repository configured to store descriptions of product/service group buying offers from a plurality of different and non-affiliated partners, the descriptions comprising designations made by a plurality of different and non-affiliated partners of which of the group buying offers to make available to users of a partner website;
a network buying cooperative website configured to display group buying offers to a user of a partner website who accesses the cooperative website from the partner website, wherein the group buying offers that are displayed to the user depend on the partner website from which the cooperative website is accessed; and
a rules engine configured to access the product/service characteristics repository and select, based on the partner website from which a user accesses the cooperative website and any designations made by the partner and stored in the repository, which of a plurality of group buying offers to display to the user.

2. The system of claim 1, further comprising:
a display selector configured to select one group buying offer to display to a user from among a plurality of group buying offers.

3. The system of claim 1, further comprising:
a setup tool configured to allow a partner to remotely access the product/service characteristics repository and select a set of products/services for display to users accessing the cooperative website from a link on the partner website.

4. The system of claim 1, further comprising:
a setup tool configured to allow a partner- to remotely access the product/service characteristics repository and add product/service data to the repository.

5. The system of claim 1, wherein the network buying cooperative website is a World Wide Website.

UNITED STATES PATENT AND TRADEMARK OFFICE
CERTIFICATE OF CORRECTION

PATENT NO. : 6,934,690 B1
APPLICATION NO. : 09/409237
DATED : August 23, 2005
INVENTOR(S) : Tom Van Horn et al.

It is certified that error appears in the above-identified patent and that said Letters Patent is hereby corrected as shown below:

6. The system of claim 1, wherein the product/service repository is further configured to organize descriptions of offers provided by a plurality of different and nonaffiliated partners in a tree structure.

7. The system of claim 1, wherein the descriptions of product/service offers comprise a set of abstract terms related to products/services and wherein the rules engine locates a set of products/services matching the set of abstract terms and displays at least one product/service from the set of products/services to the user.

8. The system of claim 1 wherein a product/service group buying offer description comprise a display scheme and wherein the rules engine is configured to use the group buying offer description to determine at least one group buying offer suitable for display to a user.

9. The system of claim 8, wherein the display scheme is one of a carousel display, a shuffle display, and a random display.

10. A method for designating among a plurality of group buying offers which offers to display on a website, the method comprising:
providing a product/service characteristics repository configured to store descriptions of product/service group buying offers from a plurality of different and non-affiliated partners, the descriptions comprising designations from a partner of which of the group buying offers to make available to users of a partner website;
supplying a link to a network buying cooperative website to the partner based on the designations made by the partner through which a user of the partner website can access the cooperative website; and
selecting based on the partner website from which a user accesses the cooperative website and any designations made by the partner and stored in the repository which of a plurality of group buying offers to display to the user.

11. The method of claim 10, further comprising:
displaying a group buying offer to the user from among a plurality of group buying offers.

UNITED STATES PATENT AND TRADEMARK OFFICE
CERTIFICATE OF CORRECTION

| | | |
|---|---|---|
| PATENT NO. | : 6,934,690 B1 | |
| APPLICATION NO. | : 09/409237 | |
| DATED | : August 23, 2005 | |
| INVENTOR(S) | : Tom Van Horn et al. | |

It is certified that error appears in the above-identified patent and that said Letters Patent is hereby corrected as shown below:

12. The method of claim 10, further comprising:
providing a setup tool that allows a partner to remotely access the product/service characteristics repository and select a set of network products/services for display to the user accessing the cooperative website from the partner website.

13. The method of claim 10, further comprising:
providing a setup tool configured to allow a partner to remotely access the product/service characteristics repository and add network buying cooperative product/service group buying offers to the repository.

14. The method of claim 10, wherein the network buying cooperative website is a World Wide Web site.

15. The method of claim 10, further comprising organizing the product/service repository in a tree structure configured to receive descriptions provided by different and non-affiliated partners.

16. The method of claim 10, the designations from the partner further comprising abstract data adapted to be used to select at least one group buying offer to display to the user.

17. The method of claim 10, further comprising:
displaying a group buying offer to the user from among a plurality of group buying offers.

18. The method of claim 10, wherein the designations from the partner are in the form of abstract terms.

19. The method of claim 10, wherein the product/service characteristics repository is further configured to store display schemes provided by a plurality of different and non-affiliated partners.

UNITED STATES PATENT AND TRADEMARK OFFICE
CERTIFICATE OF CORRECTION

| | |
|---|---|
| PATENT NO. | : 6,934,690 B1 |
| APPLICATION NO. | : 09/409237 |
| DATED | : August 23, 2005 |
| INVENTOR(S) | : Tom Van Horn et al. |

It is certified that error appears in the above-identified patent and that said Letters Patent is hereby corrected as shown below:

20. The method of claim 19, wherein the display schemes provided by a plurality of different and non-affiliated partners include a carousel display, a shuffle display, or a random display.

21. A system for filtering network buying cooperative products/services for selection and displaying products/services to customers linked to a network buying cooperative website from a partner website, comprising:
a partner identification data receiver configured to receive identification data for a partner for the partner website, wherein the partner is any of a plurality of different and nonaffiliated partners;
a product/service category receiver configured to receive product/service identification data and category data for the partner website, wherein the partner is any of a plurality of different and nonaffiliated partners, and wherein the product/service identification data and category data is adapted for use in determining a set of network buying cooperative products/services suitable for selection and display to customers linked from the partner website; and
a terms receiver configured to receive abstract terms related to network buying cooperative products/services from the partner website and use the received abstract terms to select a set of network buying cooperative products/services suitable for selection and display to the customers.

22. The system of claim 21, further comprising:
an exclusivity receiver configured to receive instructions from a partner indicating whether the product/service category receiver should be disabled.

23. The system of claim 21, further comprising:
a display receiver configured to receive instructions from a partner regarding the selection of network buying cooperative products/services to display to the customers.

24. The system of claim 23, wherein the display receiver has been configured to receive instructions for one of a carousel display, shuffle display, or random display.

UNITED STATES PATENT AND TRADEMARK OFFICE
CERTIFICATE OF CORRECTION

| | | |
|---|---|---|
| PATENT NO. | : 6,934,690 B1 | |
| APPLICATION NO. | : 09/409237 | |
| DATED | : August 23, 2005 | |
| INVENTOR(S) | : Tom Van Horn et al. | |

It is certified that error appears in the above-identified patent and that said Letters Patent is hereby corrected as shown below:

25. A system for selecting from a plurality of products/services which products/services to display to a user, the system comprising:
a product/service characteristics repository configured to store descriptions of products/services from a plurality of different and non-affiliated partners, the descriptions comprising designations from a partner of which products/services to make available to users of a partner website;
a product/service display website configured to display products/services to a user of the partner website who accesses the product/service display website from the partner website, wherein the offers displayed to the user depend on the partner website from which the product/service display website is accessed; and
a rules engine configured to access the product/service characteristics repository and select, based on the partner website from which a user accesses the product/service display website and any designations made by the partner and stored in the repository, which of a plurality of products/services to display to the user.

26. The system of claim 25, further comprising:
a display selector configured to select a product/service to display to a user from among a plurality of products/services.

27. The system of claim 25, further comprising:
a setup tool configured to allow a partner to remotely access the product/service characteristics repository and select a set of products/services for display to customers accessing the product/service display website from the partner website.

28. The system of claim 25, further comprising:
a setup tool configured to aid sellers in adding product/service characteristics to the product/service characteristics repository.

29. The system of claim 25, further comprising:
a group communication medium configured to allow a user to communicate with other users on the partner website.

30. The system of claim 29, wherein the group communication medium is at least one of a message board or a chat facility.

UNITED STATES PATENT AND TRADEMARK OFFICE
CERTIFICATE OF CORRECTION

| | |
|---|---|
| PATENT NO. | : 6,934,690 B1 |
| APPLICATION NO. | : 09/409237 |
| DATED | : August 23, 2005 |
| INVENTOR(S) | : Tom Van Horn et al. |

It is certified that error appears in the above-identified patent and that said Letters Patent is hereby corrected as shown below:

31.    A method of selecting from a plurality of products/services which products/services to display on a product/service display website, the method comprising:
providing a product/service characteristics repository configured to store descriptions of products/services from a plurality of different and non-affiliated partners, the descriptions comprising designations from a partner of which products/services offers to make available to users of a partner website;
supplying a link to a product/service display website to the partner based on designations made by the partner through which a user of the partner website can access the product/service display website; and
selecting based on the partner website from which a user accesses the and any designations made by the partner and stored in the repository which of a plurality of products/services to display to the user.

32.    The method of claim 31, further comprising displaying one product/service to the user from among a plurality of products/services.

33.    The method of claim 31, further comprising:
providing a setup tool that allows a partner to remotely access the product/service characteristics repository and select a set of products/services for display to users accessing the product/service display website from the partner website.

34.    The method of claim 31, further comprising:
providing a setup tool configured to allow a partner to remotely access the product/service characteristics repository and add product/service characteristics to the repository.

35.    The method of claim 31, wherein the product/service display website is a World Wide Web site.

UNITED STATES PATENT AND TRADEMARK OFFICE
CERTIFICATE OF CORRECTION

| | | |
|---|---|---|
| PATENT NO. | : 6,934,690 B1 | |
| APPLICATION NO. | : 09/409237 | |
| DATED | : August 23, 2005 | |
| INVENTOR(S) | : Tom Van Horn et al. | |

It is certified that error appears in the above-identified patent and that said Letters Patent is hereby corrected as shown below:

36. A system for designating among a plurality of group buying offers which offers to display on a website, the system comprising:

a product/service characteristics repository configured to store descriptions of product/service group buying offers from a plurality of different and non-affiliated partners, the descriptions comprising designations made by a plurality of different and non-affiliated partners of which of the group buying offers to make available to users of a partner website, wherein the plurality of group buying offers includes at least one group buying offer that is exclusively available to users associated with a single specific partner;

a network buying cooperative website configured to display group buying offers to a user of a partner website who accesses the cooperative website from the partner website, wherein the group buying offers displayed to the user depend on the partner website from which the cooperative website is accessed; and a rules engine configured to access the product/service characteristics repository and select, based on the partner website from which a user accesses the cooperative website and any designations made by the partner and stored in the repository, which of a plurality of group buying offers to display to the user, wherein at least one group buying offer is available for display exclusively to users accessing the cooperative website from the partner website.

37. A method of designating among a plurality of group buying offers which offers to display on a website, the method comprising:

providing a product/service characteristics repository configured to store descriptions of product/service group buying offers from a plurality of different and non-affiliated partners, the descriptions comprising designations from a partner of which of the group buying offers to make available to users of a partner website, wherein the plurality of group buying offers includes at least one group buying offer exclusively available to users of the partner website;

supplying a link to a network buying cooperative website to the partner based on the designations made by the partner through which a user of the partner website can access the cooperative website;

selecting based on the partner website from which a user accesses the cooperative website and any designations made by the partner and stored in the repository which of a plurality of group buying offers to display to the user; and displaying the at least one group buying offer exclusively available to users of the partner website.

UNITED STATES PATENT AND TRADEMARK OFFICE
CERTIFICATE OF CORRECTION

| | | |
|---|---|---|
| PATENT NO. | : 6,934,690 B1 | |
| APPLICATION NO. | : 09/409237 | |
| DATED | : August 23, 2005 | |
| INVENTOR(S) | : Tom Van Horn et al. | |

It is certified that error appears in the above-identified patent and that said Letters Patent is hereby corrected as shown below:

38.   A computer-readable medium having computer-executable instructions for performing the steps of selecting from a plurality of group buying offers which offers to display on a website, the medium comprising:
providing a product/service characteristics repository configured to store descriptions of product/service offers from a plurality of different and non-affiliated partners, the descriptions comprising designations from a partner of which of the group buying offers to make available to users of a partner own website;
supplying a link to a group buying cooperative website to the partner based on the designations made by the partner through which a user of the partner website can access the cooperative website; and
selecting, based on the partner website from which a user accesses the cooperative website and any designations made by the partner and stored in the repository which of a plurality of group buying offers to display to the user.

39.   A system for adding product/service offers to a network buying cooperative website configured to select products/services for customers visiting a partner website, comprising:
a seller identification data receiver configured to receive seller identification data for a seller of offered products/services;
a product/service data receiver configured to receive products/services identification data for offered products/services;
a maximum quantity receiver configured to receive maximum sale quantity data for offered products/services;
an initial price receiver configured to receive an initial price for an offered products/services; and
a terms receiver configured to receive abstract terms related to offered product/services from a partner, wherein the partner is any of a plurality of different nonaffiliated partners, and wherein the abstract terms are adapted for use by the cooperative website to select product/service offers to display to a customer visiting the partner website.

UNITED STATES PATENT AND TRADEMARK OFFICE
CERTIFICATE OF CORRECTION

| | |
|---|---|
| PATENT NO. | : 6,934,690 B1 |
| APPLICATION NO. | : 09/409237 |
| DATED | : August 23, 2005 |
| INVENTOR(S) | : Tom Van Horn et al. |

It is certified that error appears in the above-identified patent and that said Letters Patent is hereby corrected as shown below:

40. A method for displaying products/services to a customer of a plurality of customers linked to a display website from a partner website of a plurality of partner websites, comprising:
receiving a link from the customer of the plurality of customers at the partner website of the plurality of partner sites wherein the partner is one of a plurality of different and nonaffiliated partners;
examining a data repository to determine an exclusive product/services set previously selected for customer viewing at the partner website using partner website exclusivity data provided by the partner;
identifying products/services in the exclusive product/service set that are presently offered for sale; and selecting one product/service of the identified product/services for display to the customer consistent with the exclusivity data provided by the partner.

This certificate supersedes Certificate of Correction issued September 4, 2007.

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 6,934,690 B1
APPLICATION NO. : 09/409237
DATED : August 23, 2005
INVENTOR(S) : Tom Van Horn et al.

It is certified that error appears in the above-identified patent and that said Letters Patent is hereby corrected as shown below:

Delete the title page and substitute therefore the attached title page.

Delete specification and claims, Columns 1-18 and substitute therefore the attached specification and claims, Columns 1-22.

This certificate supersedes the Certificates of Correction issued September 4, 2007 and November 27, 2007.

Signed and Sealed this
Twenty-seventh Day of September, 2011

David J. Kappos
*Director of the United States Patent and Trademark Office*

(12) United States Patent
Van Horn et al.

(10) Patent No.: US 6,934,690 B1
(45) Date of Patent: Aug. 23, 2005

(54) SYSTEM AND METHOD FOR EXTENSION OF GROUP BUYING THROUGHOUT THE INTERNET

(75) Inventors: Tom Van Horn, Bellevue, WA (US); Jon C. Engman, Redmond, WA (US); Richard V. Halbert, Redmond, WA (US); Niklas Gustafsson, Bellevue, WA (US); Dale A. Woodford, Redmond, WA (US); Jerome P. Pache, Seattle, WA (US); Greg C. Dean, Redmond, WA (US)

(73) Assignee: Vulcan Portals, Inc., Seattle, WA (US)

( * ) Notice: Subject to any disclaimer, the term of this patent is extended or adjusted under 35 U.S.C. 154(b) by 0 days.

(21) Appl. No.: 09/409,237

(22) Filed: Sep. 30, 1999

Related U.S. Application Data

(60) Provisional application No. 60/142,471, filed on Jul. 6, 1999.

(51) Int. Cl.$^7$ ................................................. G06F 17/60
(52) U.S. Cl. ........................................... 705/26; 705/27
(58) Field of Search ........................................ 705/26, 27

(56) References Cited

U.S. PATENT DOCUMENTS

| | | | |
|---|---|---|---|
| 3,581,072 | A | 5/1971 | Nymeyer |
| 4,567,359 | A | 1/1986 | Lockwood |
| 4,789,928 | A | 12/1988 | Fujisaki |
| 4,949,248 | A | 8/1990 | Caro |
| 5,148,365 | A | 9/1992 | Dembo |
| 5,255,184 | A | 10/1993 | Hornick et al. |
| 5,270,921 | A | 12/1993 | Hornick |
| 5,377,095 | A | 12/1994 | Maeda et al. |
| 5,576,951 | A | 11/1996 | Lockwood |
| 5,640,569 | A | 6/1997 | Miller et al. |
| 5,712,985 | A | 1/1998 | Lee et al. |
| 5,724,521 | A | 3/1998 | Dedrick |

(Continued)

FOREIGN PATENT DOCUMENTS

| | | |
|---|---|---|
| WO | WO 00/30004 | 5/2000 |
| WO | WO 00/30005 | 5/2000 |
| WO | WO 00/34841 | 6/2000 |
| WO | WO 00/34842 | 6/2000 |
| WO | WO 00/34843 | 6/2000 |
| WO | WO 00/34886 | 6/2000 |
| WO | WO 00/43928 | 7/2000 |
| WO | WO 00/43929 | 7/2000 |
| WO | WO 00/43938 | 7/2000 |
| WO | WO 00/45318 | 8/2000 |

OTHER PUBLICATIONS

US 6,000,826, 12/1999, Parunak et al. (withdrawn)
Bailey et al; "An Exploratory Study of the Emerging Role of Electronic Intermediaries," International Journal of Electronic Commerce, vol. 1, n3, p. 7-20, Spring 1997.*

(Continued)

*Primary Examiner*—Jeffrey A. Smith
*Assistant Examiner*—Franz Thompson
(74) *Attorney, Agent, or Firm*—Fenwick & West LLP

(57) ABSTRACT

A method and system are provided that enable partner sites to join in the sale of products/services via a PowerBuy business method. A seller registers a list of products/services to be displayed on partner sites. Customers/visitors who access partner sites may link to one or more PowerBuys conducted on an owner's main site. Accordingly, the method and system enable a super demand aggregation for products/services offered for sale by the PowerBuy business method. The invention provides a partner menu tree that allows partners to pre-select products/categories for display to customers linking to the PowerBuy from their partner site. Sellers may provide particular products, services, categories, and abstract terms to help partners select which products/services to display for customers from among all the PowerBuy products/services. The invention has applicability to sales paradigms other than the PowerBuy business method.

40 Claims, 13 Drawing Sheets

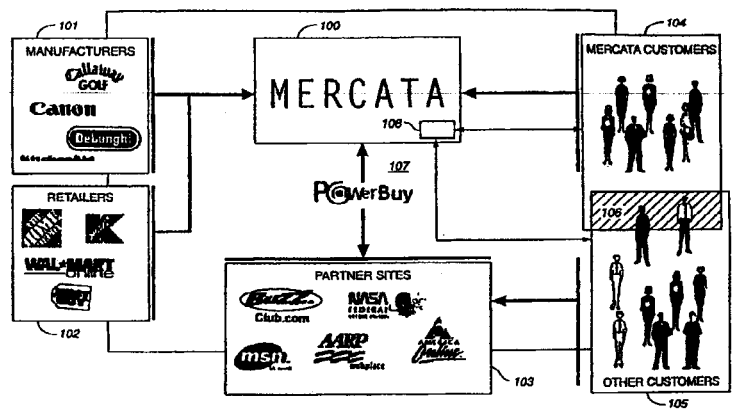

U.S. PATENT DOCUMENTS

| Number | | Date | Inventor | |
|---|---|---|---|---|
| 5,727,165 | A | 3/1998 | Ordish et al. | |
| 5,729,700 | A | 3/1998 | Melnikoff | |
| 5,745,882 | A | 4/1998 | Bixler et al. | |
| 5,758,327 | A | 5/1998 | Gardner et al. | |
| 5,758,328 | A | 5/1998 | Giovannoli | |
| 5,765,143 | A | 6/1998 | Sheldon et al. | |
| 5,794,207 | A | 8/1998 | Walker et al. | |
| 5,794,219 | A | 8/1998 | Brown | |
| 5,797,127 | A | 8/1998 | Walker et al. | |
| 5,799,284 | A | 8/1998 | Bourquin | |
| 5,806,047 | A | 9/1998 | Hackel et al. | |
| 5,809,144 | A | 9/1998 | Sirbu et al. | |
| 5,818,914 | A | 10/1998 | Fujisaki | |
| 5,826,244 | A | 10/1998 | Huberman | |
| 5,832,459 | A | 11/1998 | Cameron et al. | |
| 5,835,896 | A | 11/1998 | Fisher et al. | |
| 5,842,178 | A | 11/1998 | Giovannoli | |
| 5,845,265 | A | 12/1998 | Woolston | |
| 5,845,266 | A | 12/1998 | Lupien et al. | |
| 5,890,137 | A | 3/1999 | Koreeda | |
| 5,890,138 | A | 3/1999 | Godin et al. | |
| 5,895,454 | A | 4/1999 | Harrington | |
| 5,897,639 | A | 4/1999 | Greef et al. | |
| 5,913,210 | A | 6/1999 | Call | |
| 5,915,209 | A | 6/1999 | Lawrence | |
| 5,933,811 | A | * 8/1999 | Angles et al. | 705/27 |
| 5,950,176 | A | 9/1999 | Keiser et al. | |
| 5,956,709 | A | 9/1999 | Xue | |
| 5,970,475 | A | * 10/1999 | Barnes et al. | 705/26 |
| 5,983,199 | A | 11/1999 | Kaneko | |
| 5,991,740 | A | * 11/1999 | Messer | 705/27 |
| 6,014,644 | A | 1/2000 | Erickson | |
| 6,021,398 | A | 2/2000 | Ausubel | |
| 6,026,383 | A | 2/2000 | Ausubel | |
| 6,035,288 | A | 3/2000 | Solomon | |
| 6,041,308 | A | 3/2000 | Walker et al. | |
| 6,055,504 | A | 4/2000 | Chou et al. | |
| 6,067,528 | A | 5/2000 | Breed et al. | |
| 6,076,070 | A | 6/2000 | Stack | |
| 6,078,897 | A | 6/2000 | Rubin et al. | |
| 6,081,789 | A | 6/2000 | Purcell | |
| 6,085,169 | A | 7/2000 | Walker et al. | |
| 6,101,484 | A | 8/2000 | Halbert et al. | |
| 6,112,189 | A | 8/2000 | Rickard et al. | |
| 6,119,101 | A | 9/2000 | Peckover | |
| 6,141,653 | A | 10/2000 | Conklin et al. | |
| 6,141,666 | A | * 10/2000 | Tobin | 705/27 |
| 6,260,024 | B1 | * 7/2001 | Shkedy | 705/26 |
| 6,269,343 | B1 | 7/2001 | Pallakoff | |
| 6,332,129 | B1 | 12/2001 | Walker et al. | |
| 6,418,415 | B1 | * 7/2002 | Walker et al. | 705/26 |
| 6,473,740 | B2 | * 10/2002 | Cockrill et al. | 705/27 |
| 6,584,451 | B1 | * 6/2003 | Shoham et al. | 705/26 |
| 6,604,089 | B1 | * 8/2003 | Van Horn et al. | 705/26 |
| 6,631,356 | B1 | * 10/2003 | Van Horn et al. | 705/26 |

OTHER PUBLICATIONS

Negromante, Nicholas, "Psst! Transactions," Forbes, 80th Issue, Jul. 7, 1997.*

U.S. Appl. No. 60/097,933, filed Sep. 1998, Pallakoff, Matthew.*

U.S. Appl. No. 60/097,932, filed Sep. 1998, Pallakoff, Matthew.*

Search Report (Ref.: COOL01-10024).

Online Document: Cooperative Educational Service Agency 5 "Cooperative Buying," http://www.cesa5.k12.us/buying htm, Printed Sep. 20, 1999.

Online Document: :Cooperative Purchasing, http://www.cynric.org/OCM/administration/management/services.coop.html, Printed Sep. 20, 1999.

Online Document from Franklin Regional Counsel of Governments, :Cooperative Bidding and Purchasing—Western Massachusetts, http://www.frcog.org/purch.html, Printed Sep. 20, 1999.

Dialog, The Gale Group Newsletter, "New Twist to Online Shopping: Service Hopes to Break Customer Apathy," Internet Week, 1(7), May 22, 1995.

Dialog, The Gale Group Newsletter, "In Year 2020, Auctions and Agents to Rule Web," Newsbytes, Mar. 23, 1998.

Dialog, "New Tricks in Pet Supplies," by Minkoff, J., Discount Merchandiser, 34 (12) 70–72, 1994.

Online Document from Software Patent Institute Database of Software Technology, http://m.spi.org/, Record 1: "Management Data Processing," Serial No. acmr6512.0039, Printed Sep. 20, 1999.

Online Document from Software Patent Institute Database of Software Technology, http://m.spi.org/, Record 2: "Management Science," Serial No. ACMGCL89.1066, Printed Sep. 20, 1999.

Online Document from Software Patent Institute Database of Software Technology, http://m.spi.org/, Record 17: "Distribution Resource Planning," Serial No. HPAPPS.2620, Printed Sep. 20, 1999.

Online Document from IBM Intellectual Property Network, http://www.patents.ibm.com/, Titled: Personalized Optimized Decision/Transactions Program, Jan. 1995, Reprinted Nov. 24, 1999.

Online Document from Agorics, Inc., http://www.agorics.com/, Sections: "A Survey of Auctions," "English Auction," "A Dutch Auction," "The First Price Auction," "The Vickrey Auction," "The Double Auction," "Auction Offshoots," "Auction Strategies," "Auction Histories," "Government Securities—Auctioned Off," "Collusion in Auctions," "Auction Bibliography," Dated 1996, Reprinted Oct. 25, 1999.

Online Document from Forbes.com, http://www.forbes.com, Forbes Global, Computer Science Section of Dec. 28, 1998, "Coming Soon–Cyber Co–ops" by Karlgaard, Printed Nov. 16, 1999.

Management and Specialist Team, LetsBuyIt.com, http://www.euroferret.com, Jan. 15, 1999; Online Document, http://www.alumni.se/e–commerce/default.htm, Jan. 15, 1999, Printed Nov. 19, 1999.

Online Document from Bid.com, http://www.bid.com/dutch, Printed Sep. 3, 1999.

Online Document from Bullnet Online Auctions, http://www.bullnet.co.uk/auctions/info.htm, Printed Sep. 3, 1999.

Online Document from Who's Who for The Commerce Standard, http://www.gii.com/standard/who/index.html. Printed Nov. 19, 1999.

Online Document from Klik–Klok Online Dutch Auction, http://www.klik–klok.com/how.htm, Printed Sep. 3, 1999.

Online Document, ComputerSweden, "Icon–grundare satsar närmare halv miljard på e–handel," http://nyheter.idg.se, Jan. 23, 1999 (w/English translation).

Online Document from Artiklar från AffärsData ("Resumé"), http://www.ad.se, Feb. 25, 1999 (w/English translation).

Online Document from ComputerSweden, "Kjell Spångberg . . . ," http://nyheter,idg.se, Mar. 3, 1999 (with English translation).

Online Document from Accompany: About Team, http://www.accompany.com/about_press_faq.asp, Printed Mar. 3, 1999.
Online Document from Accompany: About US, http://www.accompany.com/about_press_0.asp, Printed Mar. 3, 1999.
Online Document from Accompany: About Team, http://www.accompany.com/about_team.asp, Printed Mar. 3, 1999.
Online Document from Accompany: About Team Advisors, http://www.accompany.com/ablut_team_advisors.asp, Printed Mar. 3, 1999.
Online Document from Accompany: About Team, http://www.accompany.com/about_press_analyst.asp, Printed Mar. 3, 1999.
Online Document from Accompany: About Team Advisors, http://www.accompany.com/about_teampartners.asp, Printed Mar. 3, 1999.
Online Document from Accompany: Contact, http://www.accompany.com/about_contact.asp, Printed Mar. 3, 1999.
Online Document from Ask Reggie Domain Search, Accompany.com Domain contacts, http://www.askreggie.com, Printed Mar. 3, 1999.
Online Document from Accompany: About US, http://www.accompany.com/about_press_background.asp, Printed Mar. 3, 1999.
Online Document from ZDNN, http://www.zdnet.com/stories/news, Printed Mar. 3, 1999.
NewsAlert, "Accompany, Inc. to Revolutionize Commerce; Buys Come Together for Best Value," http://www.accompany.com, Printed Mar. 3, 1999.
Online Document from Yahoo, "Web startup pushes volume shopping," http://dailynews.yahoo.com, Printed Mar. 4, 1999.
Online Document from Dagens Industri, "Rush into Net-shopping," http://www.di.se/Scripts/, Document dated Mar. 12, 1999, Printed Jan. 19, 2000 (with English Translation).
Online Document, "US–IL–Chicago–Cargo Revenue Management Analyst," "US–IL–Chicago—Revenue Manager," "US–IN–Indianapolis—Yield Analyst," "US–CA–San Jose—Financial Analyst," http://jobsearch.monster.com, Printed Mar. 24, 1999.
Online Document from hotjobs.com, "Filenet Corporation," http://www.hotjobs.com, Printed Mar. 24, 1999.
Online Document from The Revenue Management Home Page, "Revenue Management Defined," wysiwyg://212/http://www.geocities.com/WallStreet/Floor/4921/, Printed Mar. 18, 1999.
Online Document from The Revenue Management Home Page, "Articles on Revenue Management," wysiwyg://212/http://www.geocities.com/WallStreet/Floor/4921/articles.htm, Printed Mar. 18, 1999.
Online Document from The Revenue Management Home Page, "Companies Practicing Revenue Management," wysiwyg://212/http://www.geocities.com/WallStreet/Floor/4921/rmcomps.htm, Printed Mar. 18, 1999.
Online Document from Revenue Management Systems, Inc., "What is Revenue Management?" http://www.revenuemanagement.com/whatisrm.htm, Printed Mar. 19, 1999.
Online Document from profitoptim.com, "Definition of Revenue Management," http://www.profitoptim.com/papersdirectory.rmdaybrief/sld063.htm, Printed Mar. 19, 1999.

Online Document from profitoptim.com, "What is Revenue Management (cont.)?" http://www.profitoptim.com/papers-directory/resexpo97/sld006.htm, Printed Mar. 19, 1999.
Online Document from American Way, "How Airline Pricing Works," http://www.aa.com/away/Vantage/Vantage-may98.htm, Printed Mar. 18, 1999.
Online Document from Airline Discount, http://faculty.darden.edu/pfeiferp/airline.htm, Printed Mar. 18, 1999.
Online Document from The Innovation Network, "1994 Innovation Collection," http://198.49.220.47/texis/si/sc/i...e/+KoeMUi3WwBme+ItOXOwww/full.html, Printed Mar. 19, 1999.
Online Article by W. Lieberman of Veritec Solutions, Inc., "Yield Management: System or Program?" http://www.veritecsolutions.com, Site visited on Mar. 19, 1999.
Online Article by W. Lieberman of Veritec Solutions, Inc., "Making Yield Management Work for You: Ten Steps to Enhanced Revenues," http://www.veritecsolutions.com, Site visited on Mar. 19, 1999.
Online Article by W. Lieberman of Veritec Solutions, Inc., "Debunking the Myths of Yield Management" http://www.veritecsolutions.com, Site visited on Mar. 19, 1999.
Online Document from StoreSearch Internet Shopping Guide, http://www.storesearch.com/, Site visited on Aug. 31, 1999.
Online Document from Netscape Netcenter, http://hsop.netscape.com/auctions/main.adp, Site visited on Aug. 31, 1999.
Online Document from Yahoo! Auctions, http://auctions.yahoo.com/, Site visited on Aug. 31, 1999.
Online Document from Lycos: Sales & Specials, http://www.lycos.com/Shopping/sales_and _specoals/, Sited visited on Aug. 31, 1999.
Hutchinson, "E–Commerce: Building a Model," Communications Week, pp. 57–60, Mar. 17, 1997.
M2 Communications, "Icentral Inc: Web Retailers Band Together to Build Traffic and Sales," M2 Presswire, Feb. 25, 1997.
Berryman et al., "Electronic commerce: Three Emerging Strategies," McKinsey Quarterly, No. 1, pp. 152–159, 1998.
"BuyItOnline Revolutionizes Internet Retailing for Small Business Merchants," Business Wire, Sep. 8, 1998.
Abstract, World Reporter, Dagens Industri, "Expected success for internet shopping," WL 5900897, Mar. 12, 1999.
U.S. Appl. No. 60/119,220 Filing Receipt and Specification, "A method and apparatus for creating and managing groups for increasing buying power on the World Wide Web," Feb. 8, 1999.
Article from Sportfack, "Letsbuyit.com Kommer," Feb. 12, 1999 (with English Translation).
IBM Technical Disclosure Bulletin, "Multi–Product Delivery System Optimization Procedure," 38(4):502–503, Apr. 1995.
Kroll et al., "World Weary Web," Forbes, Dec. 28, 1998, pp. 98–100.
Pant et al., "Business on the Web: Strategies and Economics," Fifth International WWW Conference, May 6–10, 1996, Paris, France.
Rockoff et al., "Design of an Internet–based System for Remote Dutch Auctions," *Internet Research: Electronic Networking Applications and Policy*, 5(4):10–16, 1995.
Stang et al., "Scans" Section, *Wired*, Sep. 1995, pp. 51, 54, 56 and 58.

Woolley, "Price War!," *Forbes*, Dec. 14, 1998, pp. 182 and 184.

An Exploratory Study of the Emerging Role of Electronic Intermediaries, by Joseph B. Bailey and Yannis Bakos, International Journal of Electronic Commerce, vol. 1, No. 3, Spring 1997, pp. 7–20. (Document submitted includes Abstract and pages numbered 1–14).

Internet World (Mecklemedia), Cliff Figallo, "Hosting Web Communities," Building Relationships, Increasing Customer Loyalty, and Maintaining a Competitive Edge. Published by John Wiley & Sons, Inc, Copyright 1998.

Online document from Savvio.com, "Savvio.com: Our Story," wysiwyg://8/http://www.savvio.com/about/aboutUS.jsp, Printed Sep. 28, 2000.

"Retail Federation Group Buying Set," HDF–The Weekly Home Furnishings Newspaper, v0, n0, p. 9, 26, Dec. 1994.

"Frontier Rings Up a Sale with National Retail Federation," PR Newswire, p119NYM057, Jan. 19, 1998.

"Retail Federation Group Buying Set," HFD–The Weekly Furnishings Newspaper, v68,n52, p. 9(1), Dec. 26, 1994.

"Mosher views ARA as survival kit for small specialty stores," Daily News Record, v24, n22, p. 4(1), 2, Feb. 1994.

"KMART" Targets GE as EDI Provider Signals GE's Re-Commitment to EDI, EDI News, v11, n21, Oct. 13, 1997.

"National Federation Selects GE Information Services for EDI Service Partnership," PR Newswire, p1006DCM009, Oct. 6, 1997.

Mielczarski, W; Michalik, G.; Widjaja, M.; "Bidding strategies in electricity markets," PIC Proceedings of the 21* 1999 IEEE International Conference, p. 71–76, May 16–21, 1999, Cat. #99CH36351, 1999.

Press Release from MobShop, formerly known as Accompany, Inc., obtained from the Internet at http://www.mobshop.com/press_release?release=20 on Apr. 2000, which explains that Accompany, Inc. received Notice of Allowance from the U.S. Patent & Trademark Office.

Press Release from iCoop, Inc. obtained from the Internet at http://www.icoop.com/press_pressrelease2.htm on Apr. 10, 2000, which explains that iCoop, Inc. has filed two patent applications and has provisional patent applications which were filed on Jan. 22, 1999.

Press Release from beMANY! obtained from the Internet at http://www.bemany.com/press02112000_bemany.html on Apr. 10, 2000, which explains that beMANY! has a "patent pending process".

Press Release from the company BazaarE.com obtained from the Internet at http://www.bazzare.com/pr_03111999.cfm?CFID=62916& CFTOKEN=75630214 on Apr. 10, 2000, which explains that BazaarE.com has a "patent-pending platform".

* cited by examiner

SYSTEM AND METHOD FOR EXTENSION OF GROUP BUYING THROUGHOUT THE INTERNET

This application claims the benefit of prov. application 60/142,471 filed on Jul. 6, 1999.

Field Of The Invention

The present invention relates to the expansion of group buying over electronic networks such as the Internet through creation of a platform whereby each individual group purchasing opportunity can be extended to any or all web sites on the Internet. More particularly, it relates to a platform to extend e-commerce applications such as on-line buying groups of the type described and claimed in a related pending, commonly owned application filed Mar. 15, 1999 in the names of Tom Van Horn, Niklas Gustafsson and Dale Woodford, entitled "Demand Aggregation Through Online Buying Groups," U.S. application Ser. No. 09/270,219, the disclosure of which is incorporated herein by this reference. In one form, this invention refers to a technique whereby the on-line buying groups technology can be imbedded in other parties' Web sites and managed remotely by a company, such as the owner of this application, hereinafter referred to as "Owner." In another form, the invention further relates to a method of permitting third party web site owners to create, manage, and share aggregation on their own online group buying opportunities within the context of this platform.

Background Of The Invention

This invention provides a method and apparatus to achieve an unprecedented aggregation of purchasing power (a "super aggregation") by allowing each location or presence on an electronic network such as the Internet to select for display from its location, channel or web site any combination of the Owner's limited-time, product-specific group buying opportunities (hereinafter referred to as "PowerBuys") then appearing in the Owner's menu of current and upcoming PowerBuys. The Owner's platform preferably displays the PowerBuy menu as a configurable product tree, although other display paradigms may be used. Such third party display may be on either an exclusive or a shared aggregation basis. The result is the super aggregation of a unique set of partner locations/web sites that will concurrently offer, or sponsor, each one of the Owner's PowerBuys, and/or certain third-party PowerBuys.

In one embodiment, the invention also provides a method and apparatus that permits certain retailer, supplier or other third parties to create, manage and share aggregation, if desired, on PowerBuys featuring their own products or services. This is accomplished, in part, through such third parties' direct use of the Owner's PowerBuy set up and management tools described in the above referenced commonly assigned application, as well as a related pending, commonly owned application filed on Mar. 31, 1999 in the names of Richard V. Halbert, Niklas Gustafsson and John M. Thrun, entitled "Dynamic Market Equilibrium Management System, Process and Article of Manufacture," U.S. application Ser. No. 09/281,859, the disclosure of which is incorporated herein by this reference.

The Owner's PowerBuy offerings are already available to those visiting the Owner's web site. Some visitors may already arrive at the Owner's site from links appearing on third-party web sites, such as links that direct traffic to the site in a general way, e.g., the home page or the first page of all current PowerBuys. These existing links do not direct visitors to specific PowerBuys selected on the basis of the originating link. Further, the sender may not presently tailor its traffic exposure to a defined set of PowerBuys most likely to be of interest to its customers. While general links generate some level of participation in the Owner's PowerBuys, they do not deliberately funnel traffic to the Owner's PowerBuys on an item-by-item basis, nor do general links promote the most efficient or logical aggregation of demand for each individual PowerBuy. Consequently, the methods in place do not fully harness the aggregation potential of the Owner's group buying method over the Internet.

Furthermore, no sales channel presently exists through which a supplier, manufacturer, or retailer of goods and services can readily turn to create directly a potentially global market for a given product or service across a vast number of web sites on the Internet. While suppliers of products and services can achieve large volume sales through the Owner's demand aggregation (i.e., PowerBuy) invention, all such sales are now possible for such third parties only indirectly through the Owner, functioning as an Internet retailer. A key aspect of this invention permits suppliers, distributors, retailers, and others to create and control their own Power-Buys in either an exclusive or shared aggregation format. In this implementation, the Owner's site functions as a true platform for such third party sales. As such, the Owner likely will be compensated by some combination of licensing revenue (for the use of its PowerBuy set up and management tools), and a transaction fee based on these third party managed sales, or a revenue/margin sharing arrangement.

Benefits Of The Invention

This invention makes the online demand aggregation invention more effective by expanding its presence on an item-by-item and/or product-category basis concurrently to all web communities having an interest in the given item or product category. Consequently, the invention potentially leverages all traffic over the Internet to enable unprecedented aggregation of demand, or a super demand aggregation. In addition, PowerBuy selection on an item-by-item and/or category basis permits the super aggregation to occur in a highly efficient and targeted manner. Participating web sites can include everything from major portal sites having generalized traffic, to niche community sites centered on particular hobbies or other commonalities of interest, as well as Internet retailer sites. General traffic sites might select a broad array of PowerBuys, while the niche sites likely would select only PowerBuys featuring items of specific interest to their community.

Specifically, a major portal might select an array of popular consumer electronic and sports equipment PowerBuys with relatively wide appeal, while a community site focusing on hiking and fishing might select PowerBuys featuring specific items of camping, hiking and fishing equipment. Sites catering exclusively to women might select items such as gifts, kitchen electronics and sporting equipment geared toward women and the like. An Internet retailer might choose to focus solely on PowerBuys featuring items they offer for resale.

In addition, product manufacturers, service providers, and distributors can broaden their role from simply the product or service supplier to a direct reseller of those items though appropriate links and revenue sharing arrangements on PowerBuy sales of their own merchandise and, where appropriate, merchandise or services supplied by others.

A relatively small seller of goods may use the expanded PowerBuy network to offer goods and services to a wider consumer market and a more focused consumer market. For example, a seller may expand PowerBuy offerings to more general Internet locations near the seller's geographical location while also providing the offerings worldwide through Internet locations logically related to the seller's goods/services.

The result to the purchaser of the super aggregation enabled by this invention is appreciably greater purchasing power, as well as a strengthened sense of community through an enhanced ability to connect with similarly situated buyers. Connections among similarly situated buyers may be enhanced by access to group communication media, such as message boards and chat facilities, which allow purchasers to share ideas about products and accessories.

Participating partner sites benefit by offering unique, valuable content to their site visitors that can be tailored to suit such visitor's needs and interests. Further, the invention gives participating suppliers and Internet retailers a stronger means to target and accumulate demand throughout the Internet for products and services on an item-by-item basis.

In addition, the embodiments of the invention that permit third parties such as suppliers, distributors and Internet retailers to create and control their own PowerBuys will offer, among other things, the ability for such third parties to achieve unprecedented inventory leveling capabilities, directly make real-time yield management decisions, test price sensitivity on new products, etc.—all with the benefit of the true market data made possible by the above referenced commonly assigned inventions.

SUMMARY OF THE INVENTION

1. Definitions

PowerBuy—a business method in which buyers wishing to purchase a particular product or service, or groups of products and services, within a given time frame join forces in a buying group ("co-op") formed across an electronic network specifically to accomplish the desired purchase. The co-op enables individual buyers to leverage their combined purchasing power to achieve an economic bargain superior to that attainable by any one buyer acting alone. This superior bargain most often will be reflected in terms of a lower price. For example, as more buyers join the co-op, the desired item's price typically declines. At the end of the purchase period, all buyers purchase the item at a final (low) price even if some buyers have submitted binding offers at higher prices. The definition provided here does not supersede the definitions provided in the two applications previously incorporated by reference.

Partner Site—any third-party owned or operated location, such as a web site, within an electronic network, such as the Internet, that has been configured to display one or more PowerBuys at their network location or web site. The universe of partner sites potentially could encompass an entire network such as the Internet. However, it is expected that certain network locations or web sites would be barred from participation due to their distasteful or inappropriate content.

Owner—the party owning, or operating, the platform hosting PowerBuys and/or facilitating PowerBuy displays on Partner sites. For example, the Owner may be the owner of the invention described herein and the related inventions cross-referenced herein.

Owner's Main Site—a web site on which the PowerBuy platform or hub resides. For purposes of at least one embodiment of the invention, this site is an Owner's site on which the PowerBuy method of sales is being practiced in accordance with the commonly assigned inventions referred to above. A skilled artisan will recognize that the PowerBuy platform may only provide a virtual presence, with a substantial portion of the actual computing power driving the PowerBuy sales method located elsewhere. In addition, embodiments of the invention are not limited to a single owner's main site.

Display—to show a PowerBuy item on a Partner site by way of a link to pages on the Owner's main site. A page is a specific portion of the totality of the Owner's main site and does not necessarily refer to any particular method of displaying the page to a viewer/customer.

Featured Item—a product or service, or groups of products and services, offered for sale in a PowerBuy sales method.

PowerBuy Menu Tree—a catalogue maintained by the Owner listing all current and upcoming PowerBuys and/or products/services from which Partner sites may select for display from their respective network location or web site. In a preferred embodiment of the invention, the PowerBuy menu tree is organized as a tree structure having selectable categories/products. By selecting one location on the PowerBuy menu tree, a partner selects that location and any locations below it.

Seller—a manufacturer, retailer, or other party offering products/services for sale to customers via the PowerBuy sales method.

Customer—a person who participates in a PowerBuy sales method by either accessing the PowerBuy from the Owner's main site or from a Partner site.

Product Category—a category, product, or combined category and product selectable from the PowerBuy tree structure. The Product Category controls which PowerBuys each customer shall have be able to access. For purposes of this invention, the location or link from which each individual customer arrives at the Owner's main site will be a key determinant in determining the Product Category.

Partner Parameters—a field within the set up code for each PowerBuy that controls which PowerBuys each visitor may access, according to an alternative embodiment of the invention. For purposes of this invention, the location or link from which each individual customer arrives at the Owner's main site will be a key determinant in determining the Product Category.

Abstract terms—as a supplement to selecting PowerBuys exclusively on the basis of a particular product/service or category, a partner site may also select PowerBuys on the basis of terms descriptive of the product/services offered. The abstract terms become increasingly crucial to the operation of the PowerBuy sales method as the number of products/services offered grows increasingly larger.

Other terms used in this application that are defined in the above referenced related applications have the meanings used in those applications.

2. Summary Description

Each partner site must select at least one product or product category from the PowerBuy menu tree in order to permit a targeted aggregation of a unique set of partner sites that concurrently displays each featured item offered in a PowerBuy, according to an embodiment of the invention. The partner site may also select product categories from the PowerBuy menu tree for display on sub-communities within its network location or web site. For example, this may be achieved by displaying a list of all current and upcoming PowerBuys on password protected pages within the Owner's site and/or on other site locations. The partner site could then communicate its choices by "checking off" each desired item.

In order to permit access in a manner consistent with partner sites' selections, the Owner will examine the portions of the PowerBuy menu tree associated with each PowerBuy to determine the set of partner sites having selections relevant to the PowerBuy. The PowerBuy menu tree controls which items are accessible and which are hidden for each particular visitor based on how such visitor came to the Owner's site (i.e., whether the visitor's session originated from a link from a particular partner site, versus any number of general links or direct hits to the Owner's main site). The PowerBuy management and set up tools, which have been modified to permit the described personalization necessary for this invention, are more fully described in the applications for the commonly assigned inventions referred to above.

In the case of exclusive PowerBuys, the partner's abbreviated name, or another appropriate identifier, would be the only set value placed within the PowerBuy menu tree for a relevant portion of the PowerBuy menu tree so that those PowerBuys are shown only to visitors linking directly from that partner site. PowerBuys so designated as exclusive must also be hidden from the product category tree within the Owner's main site so they will not be displayed to the Owner's other customers (e.g., those coming from general links, search engines, or by typing in the URL of the Owner's main site), where such a restriction is appropriate. In the case of shared aggregation PowerBuys, the value set within the partner parameter would include a string of partner site code names (i.e., all partners choosing such item) such that visitors originating from all such sources, as well as those arriving through the Owner's main site, would have joint and simultaneous access to the PowerBuy item. This method is generally preferable as it permits the fullest aggregation of demand.

Each partner site is then given a reference marker, such as a URL, for its link(s) to the Owner's main site through which its visitors will have access to all such partner-selected PowerBuys when visiting the Owner's site through such a link. Such visitors may also have click-through access to other portions of the Owner's main site (such as pages displaying other nonexclusive PowerBuys on such site) depending upon the specific page layout and design appearing on such visitor's initial access pages.

The partner may supply images and any URLs necessary and appropriate to link back to its own site from the selected PowerBuy pages that are viewed by visitors utilizing its links. In the shared aggregation scenario, visitors from a particular site would be shown only the link back to the originating site. All other partner site links would be hidden from that visitor.

In an alternative embodiment, a "partner parameter" field can be associated with each PowerBuy set up code so as to permit access in a manner consistent with partner sites' selections. The Owner examines the portions of the partner parameter within the PowerBuy set up code for each PowerBuy to look for all the relevant abbreviated partner code names assigned to that PowerBuy. The partner parameter field within the PowerBuy set up code controls which items are accessible and which are hidden for each particular visitor based on how such visitor came to the Owner's site (i.e., whether the visitor's session originated from a link from a particular partner site, versus any number of general links or direct hits to the Owner's main site).

BRIEF DESCRIPTION OF THE DRAWINGS

FIG. 1 is a simplified diagrammatic representation of a model showing how the invention expands aggregation through multiple avenues of traffic flow to the Owner's PowerBuys.

FIG. 2 is a corresponding simplified diagrammatic representation of the aggregation of a unique set of partner sites for each PowerBuy item.

FIG. 3 is a screen shot showing exclusive PowerBuys made available only to one partner site, according to an embodiment of the invention.

FIG. 4 is a simplified block diagram representing the technical schema underlying an embodiment of the invention.

FIG. 5 shows an exemplary tree structure 500 that may be used to retain PowerBuy product/service data, such as for use in a PowerBuy menu tree, according to an embodiment of the invention.

FIG. 6 illustrates another exemplary tree structure 600 that may be used to categorize product/service data available for PowerBuys, according to an embodiment of the invention.

FIG. 7 further illustrates a partner's PowerBuy product/service selections using the PowerBuy setup tool 400, according to an embodiment of the invention.

FIG. 8 shows an exemplary seller's screen 800 that may be used to describe a product/service for a PowerBuy, according to an embodiment of the invention.

FIG. 9 shows an exemplary seller's screen 900 as completed by a particular seller, a Girl Scout troop from Bellevue, Wash., for the sale of a specific lot of goods, Girl Scout thin mint cookies, according to an embodiment of the invention.

FIG. 10 illustrates an exemplary partner screen 1000 that could be used by a partner to select which PowerBuys to display, according to an embodiment of the invention.

FIG. 11A illustrates a multi-seller, multi-partner system 1101, according to an embodiment of the invention.

FIG. 11B is a flowchart showing the seller/partner filter's processing of partner tags arriving at the PowerBuy platform 1102 from customers at the partner sites, according to an embodiment of the invention.

FIG. 12 illustrates the PowerBuy platform 1102 hosting an exclusive PowerBuy, according to an embodiment of the invention.

FIG. 13 shows the data flow that occurs when PowerBuys are selected by an operator of a third party site for use in connection with that site, according to an alternative embodiment of the invention.

DETAILED DESCRIPTION OF THE INVENTION

FIGS. 1-12 of the drawings show preferred forms of a system and process for implementing the invention.

As shown in FIG. 1, an embodiment of the invention combines for a given PowerBuy 107 an Owner's main site (i.e., Mercata 100) and its customers (i.e., customers 104) with traffic coming from partner sites 103 and their respective customers 105. Of course, an overlap 106 may be expected between the customers 104 and the customers 105. Nevertheless, the invention may achieve a super aggregation of demand for the PowerBuy 107 beyond that provided by the customers 104 alone. In addition, a number of sellers 101, 102 may increase due to the attraction of the super demand aggregation provided by the invention. The customers 105 may arise from an unlimited combination of partner web sites, including major portals, broad and niche community sites, manufacturer web sites, Internet retailer sites and the like. Communications among the customers 104, 105 may be enhanced by access to a group communication medium 108 which allows the customers 104, 105 to share ideas about products and accessories offered on the Owner's main site 100. The group communication medium 108 also facilitates communications within groupings of customers 104, 105. The group communication medium 108 may be one or more group communication mediums, such as message boards and chat facilities.

Traffic from the partner sites 103 can be channeled in a manner to efficiently aggregate demand on a PowerBuy-by-PowerBuy basis with the Owner's main site 100 as shown in FIG. 2. Accordingly, partners 201-207 may combine with the Owner's main site 100 to super aggregate demand for the PowerBuy 107. Of course, each of the partners 201-207 will typically have indicated in some manner either their specific interest in the product/service of the PowerBuy 107 or their general interest in a product/service category that includes the PowerBuy 107. In some embodiments of the invention, the partners 201-207 may indicate their interest in the product/service of the PowerBuy 107 by expressing interest in more general, or abstract, terms that describe the product/service. Such abstract terms may not necessarily represent a specific product/service or product/service category.

While an ideal PowerBuy scenario calls for pooling partner site traffic, and therefore pooling purchasing power from all interested sources (e.g., customers of the partners 201-207), the Owner's main site may permit exclusive PowerBuys on partner sites, whereby all purchases will come from that site's traffic, rather than shared aggregation shown in FIG. 2. FIG. 3 depicts an exemplary screen shot 300 that would be served up to visitors having access to an exclusive PowerBuy.

The screen shot 300 includes exclusivity indicators 301, 302 and the partner identifier 207, as well as an Owner's identifier 303. Of course, one skilled in the art will recognize that providing an exclusive PowerBuy to a given partner does not necessarily require logos identifying the Owner, the Partner, or even exclusivity. On the other hand, such features may render an exclusive scenario more attractive to either the partner and/or the Owner.

A representative screen shot for nonexclusive PowerBuys could be quite similar to the screen shot 300 albeit without the references to exclusivity 301, 302, according to an embodiment of the invention. Moreover, in a non-exclusive scenario, a customer's links back to an originating partner site would be tailored to the point of origin for each visitor viewing such page. A skilled artisan will recognize the possibilities for other variations between complete exclusivity and complete non-exclusivity, including some form of limited aggregation whereby a product manufacturer or retailer could offer its merchandise to all partner sites except for direct competitors or vendors deemed unsuitable or inconsistent with the manufacturer or retailer's own business purposes.

The screen shot 300 also includes a group communications display 304 which allows customers to share ideas about the products offered on the screen shot 300. The group communications display 304 shown in FIG. 3 has the format of a message board in which customers may post messages about the products. As a skilled artisan will recognize, other group communications media may be used, such as a chat facility.

FIG. 4 provides a simplified block diagram representing the technical schema underlying an embodiment of the invention. As shown in FIG. 4, a PowerBuy set up tool 400 that creates PowerBuys may also help define which particular PowerBuys a partner site's visitor/customers may access. The PowerBuy set up tool 400 may operate in conjunction with other PowerBuy set up tools described in the commonly assigned applications previously incorporated by reference.

Partners 406-408 may access the PowerBuy set up tool 400 to specify which product(s)/service(s) they wish displayed (or displayable) to their customers/visitors 409. As previously stated, the partners 406-408 may examine the Powerbuy menu tree to select specific products/services or the partners 406-408 may select product/services categories. Selecting a product/service category renders all products in the category suitable for display. In addition, the partners 406-408 may tailor their selections through the use of abstract product/service terms, in one embodiment of the invention. It is anticipated that the partners' selection process will be ongoing as PowerBuys are continuously beginning and ending on the Owner's main site. In addition, the partners 406-408 may change their product/service selections frequently.

A PowerBuy close server 404 may start and stop PowerBuys. When running a PowerBuy, the PowerBuy close server 404 accesses a data repository 403 containing PowerBuy data, such as the data associated with the PowerBuy menu tree. A graphical user interface treatments 405 provides descriptions regarding the appearance of PowerBuys on both the Owner's main site and on partner sites. A rules engine 401 determines which partner sites may display links to which presently active PowerBuys by accessing the PowerBuy menu tree. Accordingly, the customers 409 visiting partner sites 406-408 may receive the appropriate links to PowerBuy product display pages 402a-402c.

On some occasions, multiple PowerBuys may be suitable for display to a customer, but the partner site (or the customer) may be configured for display of only a single PowerBuy at a time. In such instances, a display selector 410 determines which particular PowerBuy(s) are actually displayed to a customer linked from a partner site. FIG. 4 shows the display selector 410 as contained within the rules engine 401; however, a skilled artisan will recognize that the display selector 410 need not necessarily be contained within the rules engine 410.

Exclusive PowerBuy items will not be generally available from the Owner's PowerBuy menu when partner sites make their PowerBuy selections. Of course, the PowerBuy setup tools may permit a range of exclusivity. In situations where a partner site (typically a product supplier or retailer) wishes to offer PowerBuys on its own merchandise, such a partner may license and utilize the PowerBuy set up and management tools described in the commonly assigned inventions referenced above. This embodiment of the invention would permit such third parties to control which products will be featured items, the form of the price curve on which the product's sales price will be determined, and the extent of exclusivity desired with respect to other's access to its PowerBuy items. However, all such decisions may be bounded by parameter limits set by the Owner to ensure appropriate levels of consistency and customer satisfaction. Further details on the administration of this embodiment of the invention are available in the second commonly owned application referenced above.

FIG. 5 shows an exemplary tree structure 500 that may be used to retain PowerBuy product/service data, such as for use in a PowerBuy menu tree, according to an embodiment of the invention.

The tree structure 500 may represent any number of PowerBuy categories/products. In a typical embodiment, each particular node represents a category, a product, or both. For example, a Category B 503 has two child nodes 507 and 515. The node 507 itself has two child nodes 508 and 509. The node 509 has two child nodes 510 and 514. The node 510 has three child nodes 511-513.

An operator of the Owner's main site may modify the tree structure 500 to add new nodes to the tree structure 500, remove old nodes from the tree structure 500, and/or reorganize the tree structure 500. The operator may be a human or a computerized support system. In addition, in some instances partners may be allowed to modify the tree structure 500 using the PowerBuy setup tools. As a skilled artisan will recognize, the PowerBuy setup tools may include safety protocols that would prevent a partner (or the owner) from making harmful modifications to the tree structure 500. The tree structure 500 will typically include a single root node 501, although one skilled in the art could easily develop a rootless tree structure and/or a multi-root tree structure.

Partners use the tree structure 500 to define the PowerBuy products/services to display to customers visiting their partner sites. A partner may select a specific product, such as that represented by the node 511, an intermediate node such as the node 510, a category node 503, or the root node 501. The partner's site will display PowerBuys associated with any selected node in the tree structure 500 and all the node's depending from it. For example, by selecting the node 510, a partner's site may display PowerBuys pertaining to the nodes 510-513. The display selector 410 determines which particular PowerBuy(s) are actually displayed to a customer linked from a partner site when more than one PowerBuy could be displayed to a customer configured to view only one display at a time.

The partner's selection of a particular category is a dynamic selection, with the actual PowerBuy products/services displayed to customers depending upon the status of the tree structure at the customer's access instant. For example, if the Owner, or a seller, later adds or removes products/services at or below the child 510, then the PowerBuys displayable to the partner's site will be correspondingly updated. This mechanism provides greater flexibility to partners than selecting a static category or static product for which no PowerBuys may exist on the Owner's main site at a later time period, such as when a customer actually links to the Owner's main site.

Of course, a partner may select more than one portion of the tree structure 500 to display PowerBuy products/services. For example, a partner could select the node 502, the node 510, and the node 516.

The owner may store the tree structure 500 in a data repository, such as the data repository 403 shown in FIG. 4. As a skilled artisan will recognize, a database represents but one suitable data repository.

FIG. 6 illustrates another exemplary tree structure 600 that may be used to categorize product/service data available for PowerBuys, according to an embodiment of the invention. The tree structure 600 closely resembles the tree structure 500 but with specific PowerBuy product/category entries.

In the tree structure 600, a root node 620 comprises two child nodes 601, 602. The node 601 pertains to the Owner's set of products/services (i.e., "the Mercata General Store"), and the node 602 represents an exclusive set of products for a particular seller, "Big Animation Co."

The Owner's sub-tree, that portion of the tree structure 600 at and below the Mercata General Store 601 comprises three categories 603, 604, and 614. The Home & Garden node 604 comprises two sub-categories, Seeds 605 and Tools 606. The Tools subcategory 606 comprises two specific products a Gucci Hand Trowel 607 and a Starbucks Rake 608.

The exclusive product/service sub-tree, that portion of the tree structure 600 at and below the Big Animation Co. 602 comprises two categories, Clothes 609 and Toys 611. The Clothes category 609 comprises a specific product, a Chubby Chuckles Sweater 610, while the Toys category 611 comprises two specific products, a Chubby Chuckles Doll 612 and a Sweet-Snuffy Puppet 613.

As discussed above, the Big Animation Co. sub-tree 602 may be made available on an exclusive basis, e.g., accessible only from the Big Animation Co. web site. In this mode, a customer on the owner's main site would not be allowed to view the products/services on the sub-tree 602 or participate in PowerBuys associated with the sub-tree 602 without first accessing the Big Animation Co.'s web site. Alternatively, the sub-tree 602 may be configured in a non-exclusive or in a semi-exclusive manner. In the non-exclusive configuration, customer could access the sub-tree 602 from any location where the customer could also access the sub-tree 601. In the semi-exclusive configuration, a customer could access the sub-tree 602 from the owner's web site and from the Big Animation Co.'s web site but from no other location. An ordinarily skilled artisan could likewise develop a range of additional non-exclusive configuration options.

The tree structure 600 may be updated periodically by the Owner and by sellers. For example, Big Animation Co. could add to the Toys category 611 a Chubby Chuckles Tractor and a Chubby Chuckles Whistle and remove the Sweet-Snuffy Puppet 613. Accordingly, a partner site that had previously selected the Toys category 611 would no longer display PowerBuys for the Sweet-Snuffy Puppet 613 but would now display PowerBuys for the Chubby Chuckles Tractor and the Chubby Chuckles Whistle as well as the Chubby Chuckles Doll 612.

FIG. 7 further illustrates a partner's PowerBuy product/service selections using the PowerBuy setup tool 400, according to an embodiment of the invention. A partner, such as the partners 406-408, may access the PowerBuy setup tool 400, which has been designed to aid in the selection of appropriate products/services for the partner's site. For example, the partner 406 may select one or more specific products/services, and/or one or more product/service categories, and/or one or more abstract terms that could be associated with a particular product/service. Regardless of how the partner 406 selects products/services of interest, the PowerBuy setup tool 400 stores the partner's selections in a partner characteristics data set 701.

The partner characteristics data set 701 may contain other pertinent data regarding the partner and the partner's site. For example, the PowerBuy setup tool 400 may also acquire from the partner 406 identification data for retention in the partner characteristics data set 701. A partner's first use of the PowerBuy setup tool 400 may likely result in the input of considerably more data to the partner characteristics data set 701 than the partner's subsequent uses of the PowerBuy setup tool 701.

The PowerBuy close server 404 may access the partner characteristics data set 701 to determine which PowerBuy products/services to display to customers/visitors entering the Owner's main site via a link from a partner site, such as from the partners 406-408. Once the PowerBuy close server 404 has accessed the partner characteristics data set 701 for a customer/visitor entering the Owner's site, the PowerBuy close server 404 may access a PowerBuy menu tree 702 to determine which products/services presently being offered in PowerBuys may be accessed by the visitor/customer. The PowerBuy close server 404 may then display at least one selected product/service to the customer/visitor using the PowerBuy Partner Product Display Page 402. Of course, multiple customers may enter the Owner's main site from multiple partner sites at any given time. Accordingly, multiple PowerBuy Partner Product Display Pages 402 may be used in any given time interval.

FIG. 8 shows an exemplary seller's screen 800 that may be used to describe a product/service for a PowerBuy, according to an embodiment of the invention. As previously discussed, the invention enables a super demand aggregation for the sale of products. In addition, the invention allows a plethora of sellers to provide numerous products/services for sale via PowerBuys. Accordingly, the seller's screen 800 could be used by sophisticated manufacturers and retailers for the sale of large quantities of goods, as well as by smaller scale sellers, such as clubs, artisans, and charities.

The seller's screen 800 includes a name field 801, an address field 802, a goods for sale field 803, a maximum quantity field 804, and a description of goods field 805. The name field 801 allows the seller to enter his/her business name. The address field 802 allows the seller to enter his/her address, e.g., an e-mail address and/or a mailing address. The goods for sale field 803 allows the seller to enter a name for the goods being sold, and the maximum quantity field 804 allows the seller to enter the amount of goods being sold, e.g., 64 boots. The description of goods field 805 allows the seller to describe the goods in greater detail, e.g., "Edmund Hillary hiking boots; rated AAA by the Am. Hikers Assoc., also known as 'Good to Go Boots.'" The description of goods field 805 may include a link to an HTML page or a digital photograph.

The seller's screen 800 may include an initial price field 806, a minimum price field 807, a minimum sale quantity 808, an order quantity limit 809, an offer reject threshold 810, and a pricing scheme 811. The initial price field 806 represents the PowerBuy starting price. The minimum price field 807 represents the lowest price for which a good may be sold. The order quantity limit 809 represents the maximum number of goods which may be sold to a single customer. The offer reject threshold 810 represents the highest price for which an offer will be considered "reasonable." The pricing scheme 811 defines whether price curve is represented in line segments or step-wise.

The seller's screen 800 may include a cost curve 812, an ignore scheme 813, a window price 814, a seller's bonus program 815, a buyer's bonus program 816, and product delivery information 817. The cost curve 812 defines whether the cost curve is in line segments or step-wise. The ignore scheme 813 defines whether the ignore curve is line segments or step-wise. The window price 814 defines the height of the price window and is used to encourage customers to notify their friends of the PowerBuy. The seller's bonus program 815 and the buyer's bonus program 816 may be part of a loyalty management program; e.g., Mercata bucks that may be used for subsequent PowerBuys. The product delivery information 817 may be used to specify how purchased products are shipped and corresponding pricing information.

The seller's screen 800 may include an abstract for partner sites 818 and a seller security/certification data field 819. The abstract for partner sites 818 allows the seller to enter abstract terms that may be recognized by the PowerBuy system in order to link the seller's products/services to partner sites interested in hosting PowerBuys for products/services represented by the abstract terms. For example, a seller might use the abstract terms "hiking; boots." One partner site may be setup to host PowerBuys related to "hiking" and another partner site may be setup to host PowerBuys related to "boots." Accordingly, the seller will have super-aggregated demand to include two partner sites, in addition to the owner's site. While "boots" might represent a product/service category in the PowerBuy menu tree, more abstract terms such as "hiking" might not be specifically represented in the PowerBuy menu tree, although products/services might well be describable by the term. The seller security/certification data field 819 allows a seller to provide information related to the seller's financial responsibility.

One skilled in the art will recognize that the seller's screen 800 may include a different number of fields than shown in FIG. 8. In addition, an ordinary artisan will recognize that a streamlined screen may be provided to large-scale sellers who frequently provide products/services for PowerBuys.

FIG. 9 shows an exemplary seller's screen 900 as completed by a particular seller, a Girl Scout troop from Bellevue, Wash., for the sale of a specific lot of goods, Girl Scout thin mint cookies, according to an embodiment of the invention.

The completed seller's screen 900 includes a name field 901, an address field 902, a goods for sale field 903, a maximum quantity field 904, and a description of goods field 905. The name field 901 provides the seller's name, "Troop 36-Bellevue." The address field 902 includes the seller's e-mail address, "troop36@msn.com." The goods for sale field 903 lists the item for sale as "cookies." The maximum quantity field 904 lists 200 boxes as being offered for sale. The description of goods field 905 allows the scouts to describe their cookies in greater detail, including providing an offer to donate some of their profits to charity.

The seller's screen 900 may include an initial price field 906, a minimum price field 907, a minimum sale quantity 908, an order quantity limit 909, an offer reject threshold 910, and a pricing scheme 911. The initial price field 906 indicates that the PowerBuy starting price will be $5.00. The minimum price field 907 states that the lowest price for a box of cookies will be $3.00. The order quantity limit 909 indicates that any number of cookie boxes may be sold to a single customer. The offer reject threshold 910 indicates that any offer at or above $3.00 will be considered "reasonable."

The pricing scheme 911 states that the price curve is defined as "PowerBuy automatic." As previously indicated in this application and related applications, the price curve may be defined in line segments or step-wise. To expand PowerBuys to larger groups of sellers, certain features may be selected in an "automatic" mode so that sellers are not required to understand the intricacies of micro-economics or the pricing tool. In the automatic mode, the pricing tool will render all items selected as "automatic" to be consistent with all other related selections. The pricing tool may include a sophisticated automatic selection mechanism that makes appropriate selections based on the specific type of goods offered, for example, or the pricing tool may include lesser sophistication, such as simply defining the "automatic" mode as being either "line segments" or "step-wise" for all selections. In any configuration, the automatic mode frees the seller from having to understand precisely how the PowerBuy will be conducted. The seller may also actuate a "show me" button 911a that illustrates precisely how the automatically selected feature will operate and provide the seller with greater information with which to make an informed choice.

The seller's screen 900 may include a cost curve 912, an ignore scheme 913, a window price 914, a seller's bonus program 915, a buyer's bonus program 916, and product delivery information 917. The cost curve 912 typically defines whether the cost curve is line segment or step-wise. As shown here, the cost curve 912 may be selected in an "automatic" mode that operates similarly to the "automatic" mode described in pricing curve 911. Likewise, the ignore scheme 913 and the window price 914 have also been established to operate in an automatic mode. Each automatic mode selection may include a corresponding "show me" button, e.g., "show me" buttons 911a-914a.

The sellers have indicated that their participation earns them points in a bonus program 915 while buyers do not automatically earn points in a bonus program 916. The product delivery information field 917 indicates that products will be shipped via UPS a cost of 50 cents per box.

An abstract for traffic sites 919 field indicates that the seller's have entered the system recognized terms of "King County; Snohomish County; Girl Scouts; Charity; Youth, and Food." Accordingly, a partner site automatically linked to host PowerBuys for one or more of these abstract terms could be configured to provide a link to the scouts' thin mint cookie PowerBuy. Accordingly, the scouts should attain a super-aggregated demand for their cookie sales efforts. In the event that a particular partner does not operate in an abstract mode, then the partner will only display the scouts' PowerBuy when the partner has selected a category/product in the PowerBuy menu tree that contains the product "cookies."

A seller security/certification data field 919 indicates that the sellers have shown their financial responsibility by providing the name of their bank and a contact person at the bank.

One skilled in the art will recognize that the seller's screen 900 may include a different number of fields than shown in FIG. 9. In addition, an ordinary artisan will recognize that a streamlined screen may be provided to large-scale sellers who frequently provide items for PowerBuys.

FIG. 10 illustrates an exemplary partner screen 1000 that could be used by a partner to select which PowerBuys to display, according to an embodiment of the invention. The screen 1000 may include the partner's name, such as the King County News Bureau and Shoppers' Net 203.

The screen 1000 contains a display PowerBuy products/ services field 1001 which allows the partner to specify a precise product/service. As shown in FIG. 10, the partner has selected to display the product category "food." In addition, if the partner actuates a Search PowerBuy Menu Tree button 1012, then the partner may search all the products/categories in the PowerBuy menu tree and may select additional products/services or categories.

The partner may also select PowerBuys by using an abstract terms field 1002. The partner need not use the abstract terms field 1002, and the partner may select whether the abstract terms will be used either exclusively or non-exclusively with the products/services field 1001. As shown in FIG. 10, the partner has turned on the abstract terms field 1002 and indicated that it will be used non-exclusively with the products/services field 1001. In the abstract terms field 1002, the partner has selected "King County; All-weather gear; Boats/sailing; Computers; Huskies, and Food" as abstract terms. The screen 1000 may also contain a search abstracts button 1003 whose actuation will produce a list of selectable abstract terms. In some embodiments, the abstracts button 1003 may also indicate how many products/ services are presently associated with the abstract term in the PowerBuy menu tree. One skilled in the art can easily develop a variety of alternative schemes, some based upon the volume of products/services available for PowerBuys.

A display links field 1004 allows the partner to determine whether all links will be displayed for abstract terms 1005 by selecting a box 1006 or whether links will only be displayed for some selected number of common abstract terms 1007 by a selecting box 1008. For example, if a partner selected box 1006, then the partner would display PowerBuys for all products/services located by a search of the abstract terms 1002. On the other hand, if the partner selected the box 1008, and indicated two abstract terms, then the partner would display PowerBuys for all products/services having two or more of the abstract terms listed in the abstract terms 1002. Referring to the partner sites field 919 of FIG. 9 and the abstract terms 1002, if the partner indicated that two abstract terms 1007 were necessary, then the Girl Scouts' thin mint cookies would be available via a PowerBuy from the partner site 203. On the other hand, if the abstract terms 1007 required more than two similar terms, then partner site 203 would not display a PowerBuy of the Girl Scouts' thin mint cookies. Of course, the partner has additionally selected the product/service "food," which may represent a category containing the product "cookies," in which case, the scouts' PowerBuy would be displayed on the partner site 203.

The partner may also decide how the site displays Power-Buy products/services by making a selection in a field 1010, such as selecting a "carousel" display mode in which displayed products/services rotate according a partner-selectable time field 1011, e.g., every 20 seconds. For example, once the partner has submitted this selection, then the rules engine 401 and the display selector 410 would have further guidance in determining which particular PowerBuy to display at a given instance for customers arriving from the partner's site. Of course, one skilled in the art can easily imagine other display schemes besides a carousel display mode, such as a weighted display mode where products/ services are displayed for differing time periods on some particular basis, such as having a greater number of matching abstract terms than another displayable product/service. Other applicable schemes could include a "random" display scheme or a "shuffle" display scheme.

FIG. 11A illustrates a multi-seller, multi-partner system 1101, according to an embodiment of the invention. The system 1101 comprises a PowerBuy platform 1102, multiple sellers 1104-1106, and multiple partners 1107-1108. A seller/traffic filter 1103 associated with the PowerBuy platform 1102 includes rules for determining which partner sites receive which particular PowerBuy product/service at any given instance. For example, using the thin mint cookie PowerBuy shown in FIG. 9 and the partner site 203 having the characteristics shown in FIG. 10, the seller/traffic filter 1103 would determine when to display the thin mint cookie PowerBuy on the partner site 203. A skilled artisan can easily tell that the seller/traffic filter 1103 would perform a high volume of calculations in many multiple seller/multiple partner environments. For example, assume seller groups collectively place 12,000 products into the PowerBuy platform 1102 having connections to 1,000 partner sites. Assume further that each partner site operates in either a carousel, random, or shuffle mode with updates/changes several times per minute. Accordingly, the seller/traffic filter 1103 will be required to provide at least one new display/link every few seconds, depending upon customer volume. Knowing the required throughput of the seller/traffic filter 1103, a skilled artisan should be able to identify an appropriate calculation engine to drive the seller/traffic filter's operations. Of course, the seller/traffic filter 1103 could combine features of the rules engine 401 and the display selector 410.

FIG. 11A illustrates sellers inputting PowerBuy product/service data into the PowerBuy platform 1102 via the seller/partner filter 1103. FIG. 11B is a flowchart showing the seller/partner filter's processing of partner tags arriving at the PowerBuy platform 1102 from customers at the partner sites, according to an embodiment of the invention.

The seller/partner filter 1103 receives a tag from a customer at a partner site, e.g. the partner site 1 1107 (step 1109). The seller/partner filter 1103 searches the PowerBuy menu tree using the received tag to locate the respective partner's PowerBuy products/services, e.g. the products, services and categories previously registered by the partner (step 1111).

The seller/partner filter 1103 determines if more than one PowerBuy product/service is available for display to the customer (step 1113). For example, more than one product or service may be available when the partner has registered a product category having multiple products and more than one of those products are currently offered in PowerBuys. If the seller/partner filter 1103 determines that only a single product/service is presently offered in a PowerBuy, then the seller/partner filter 1103 displays to the customer a link to the selected PowerBuy product/service (step 1123).

If the seller/partner filter 1103 determines that multiple products/services are available for display to the customer (step 1113), then the seller/partner filter 1103 examines the partner characteristics data to locate any filtering information provided by the partner hosting the partner site from which the customer's tag originated (step 1115). The seller/partner filter 1103 filters the available PowerBuy products/services using the located partner filter (step 1117). For example, as previously discussed, a partner may indicate that PowerBuy products/services will be displayed on the basis of a carousel arrangement. In such a situation, the seller/partner filter 1103 would determine which of the products/services presently being offered in PowerBuys and previously selected by the partner as a displayable product/service is presently marked for carousel display.

Applying the partner's filter may not necessarily result in a single PowerBuy product/service. Accordingly, the seller/partner filter 1103 determines whether more than one PowerBuy product/service is still available for display (step 1119). If the seller/partner filter 1103 determines that only a single PowerBuy product/service is available for display after filtering (step 1119), then the seller/partner filter 1103 displays to the customer the appropriate link to the PowerBuy product/service (step 1123).

If the seller/partner filter 1103 determines that more than one PowerBuy product/service is still available for display after filtering (step 1119), then the seller/partner filter 1103 applies logic from the PowerBuy platform 1102 to reduce the PowerBuy product/service choices down to a single PowerBuy product/service (step 1121). For example, the PowerBuy platform 1102 may have embedded rules for resolving multiple product/service choices down to a single choice. The seller/partner filter 1103 then displays a link to the PowerBuy product/service to the customer (step 1123).

As previously indicated, the seller/partner filter 1103 will receive numerous tags from customers visiting partner sites. Accordingly, the seller/partner filter 1103 may process customer tags in an essentially endless loop. Of course, as one skilled in the art will recognize, the PowerBuy platform 1102, and/or the seller/partner filter 1103, will to contain an ability to terminate processing of the customer tags when necessary, such as a shut down of the PowerBuy platform 1102 for maintenance.

A skilled artisan will recognize that some partner sites may allow display of multiple PowerBuy links. In such circumstances, the seller/partner filter 1103 will not need to select a single PowerBuy product/service but will instead determine which of the partner's previously selected products/services are presently active in PowerBuys and display all pertinent links to the customer.

FIG. 12 illustrates the PowerBuy platform 1102 hosting an exclusive PowerBuy, according to an embodiment of the invention. As shown in FIG. 3, the PowerBuy platform may be used to host exclusive PowerBuys for particular manufacturers, merchants, or other sellers. In such arrangements, the PowerBuy platform 1102 essentially partitions a portion of its site off for an exclusive PowerBuy 1202. The Big Animation Co. category 602 provides an exemplary exclusive PowerBuy 1202.

In a completely exclusive PowerBuy, customers 1200 access a Partner Site 1201 where they can access a link 1203 to the exclusive PowerBuy 1202 hosted on the PowerBuy platform 1102. For example, the Partner Site 1201 may represent an entity who does not have the sophistication, or computing power, to host a PowerBuy without resort to the facilities provided by the PowerBuy platform 1102. In addition, the Owner of the PowerBuy platform 1102 may decline to license the PowerBuy technology to the Partner Site 1201. In the alternative, the Owner can license the PowerBuy technology to the Partner Site 1201 which can then host its own PowerBuys without necessity for using the Power Buy Platform 1102.

FIG. 13 shows a representative data flow that occurs when PowerBuys are selected by an operator of a partner site for use in connection with that site, according to an alternative embodiment of the invention. The data flow shown in FIG. 13 is applicable to both non-exclusive and exclusive PowerBuys. The data flow shown is applicable to the embodiment of the invention in which administration of the PowerBuy is carried out by the Owner.

A partner uses the PowerBuy setup tool 400 to indicate in a PowerBuy table 1301 which particular product(s) the partner wants displayed to customers who link to the Owner's main site from the partner's site. When the PowerBuy close server 404 begins a PowerBuy, the PowerBuy close server 404 accesses a product table 1302 to determine which partners may display the PowerBuy. Accordingly, the PowerBuy Partner Product Display Page 402 will display the PowerBuy to partners 406-408 provided the partner is identified in the Product Table 1302.

Embodiments of the invention may further include a help system, including a wizard that directs a seller through the steps of completing any or all of the PowerBuy screens or configurable parameters.

The Owner's main site and its related functions may be written for operation with any computer operating system and for operation in any computing environment. In addition, the PowerBuy system may be designed using CORBA, ACTIVEX® controls, and/or Java applets. According to one embodiment of the invention, Java applets may provide a plug-in PowerBuy production system for use with another application on both a single computer and in a networked embodiment. Java is a useful language for programming applications for the World Wide Web since users access the web from many different types of computers.

The PowerBuy screens may be displayed using any application user interface techniques but will preferably utilize the "what-you-see-is-what-you-get" ("WYSIWYG") display paradigm. One skilled in the art may easily recognize numerous alternate approaches to providing a user interface to receive the information needed to support a PowerBuy.

Under embodiments of the invention, a remote customer computing system having browsing software may participate in the PowerBuy system via Hypertext Markup Language ("HTML") documents, Dynamic Hypertext Mark-Up Language ("DHTML") documents, Extensible Mark-Up Language ("XML") documents, and/or other similar formats over an electronic network, such as the World Wide Web. A remote computing system associated with the PowerBuy production system may further utilize protocols such as SNMP, TCP, and UDP/IP in order to send instructions and otherwise communicate with various other PowerBuy components. The PowerBuy system may operate with protocols and languages in addition to those specifically disclosed herein. Similarly, the PowerBuy system may be developed using an object-oriented programming methodology or using any other programming methodology that results in a computing system having equivalent functionality.

The invention has been discussed in terms of computer programs but is equally applicable for systems utilizing hardware that performs similar functions, such as application specific integrated circuits ("ASICs").

An ordinary artisan should require no additional explanation in developing the methods and systems described herein but may nevertheless find some possibly helpful guidance in the preparation of these methods and systems by examining standard reference works in the relevant art.

All U.S. patents and applications are incorporated herein by reference as if set forth in their entirety.

The invention has been discussed in terms of goods/services offered for sale by a PowerBuy business method. Of course, other embodiments of the invention are application to the sales of goods/services using other business methods, including but not limited to the sale of goods by auction.

These and other changes can be made to the invention in light of the above detailed description. In general, in the following claims, the terms used should not be construed to limit the invention to the specific embodiments disclosed in the specification and the claims, but should be construed to include all electronic commerce systems that operate under the claims set forth hereinbelow. Accordingly, the invention is not limited by the disclosure, but instead its scope is to be determined entirely by the following claims.

What is claimed is:

1. A system for designating among a plurality of group buying offers which offers to display on a website, the system comprising:
 a product/service characteristics repository configured to store descriptions of product/service group buying offers from a plurality of different and non-affiliated partners, the descriptions comprising designations made by a plurality of different and non-affiliated partners of which of the group buying offers to make available to users of a partner website;
 a network buying cooperative website configured to display group buying offers to a user of a partner website who accesses the cooperative website from the partner website, wherein the group buying offers that are displayed to the user depend on the partner website from which the cooperative website is accessed; and
 a rules engine configured to access the product/service characteristics repository and select, based on the partner website from which a user accesses the cooperative website and any designations made by the partner and stored in the repository, which of a plurality of group buying offers to display to the user.

2. The system of claim 1, further comprising:
 a display selector configured to select one group buying offer to display to a user from among a plurality of group buying offers.

3. The system of claim 1, further comprising:
 a setup tool configured to allow a partner to remotely access the product/service characteristics repository and select a set of products/services for display to users accessing the cooperative website from a link on the partner website.

4. The system of claim 1, further comprising:
 a setup tool configured to allow a partner—to remotely access the product/service characteristics repository and add product/service data to the repository.

5. The system of claim 1, wherein the network buying cooperative website is a World Wide Website.

6. The system of claim 1, wherein the product/service repository is further configured to organize descriptions of offers provided by a plurality of different and nonaffiliated partners in a tree structure.

7. The system of claim 1, wherein the descriptions of product/service offers comprise a set of abstract terms related to products/services and wherein the rules engine locates a set of products/services matching the set of abstract terms and displays at least one product/service from the set of products/services to the user.

8. The system of claim 1 wherein a product/service group buying offer description comprise a display scheme and wherein the rules engine is configured to use the group buying offer description to determine at least one group buying offer suitable for display to a user.

9. The system of claim 8, wherein the display scheme is one of a carousel display, a shuffle display, and a random display.

10. A method for designating among a plurality of group buying offers which offers to display on a website, the method comprising:
 providing a product/service characteristics repository configured to store descriptions of product/service group buying offers from a plurality of different and non-affiliated partners, the descriptions comprising designations from a partner of which of the group buying offers to make available to users of a partner website;
 supplying a link to a network buying cooperative website to the partner based on the designations made by the partner through which a user of the partner website can access the cooperative website; and
 selecting based on the partner website from which a user accesses the cooperative website and any designations made by the partner and stored in the repository which of a plurality of group buying offers to display to the user.

11. The method of claim 10, further comprising:
 displaying a group buying offer to the user from among a plurality of group buying offers.

12. The method of claim 10, further comprising:
 providing a setup tool that allows a partner to remotely access the product/service characteristics repository and select a set of network products/services for display to the user accessing the cooperative website from the partner website.

13. The method of claim 10, further comprising:
providing a setup tool configured to allow a partner to remotely access the product/service characteristics repository and add network buying cooperative product/service group buying offers to the repository.

14. The method of claim 10, wherein the network buying cooperative website is a World Wide Web site.

15. The method of claim 10, further comprising organizing the product/service repository in a tree structure configured to receive descriptions provided by different and non-affiliated partners.

16. The method of claim 10, the designations from the partner further comprising abstract data adapted to be used to select at least one group buying offer to display to the user.

17. The method of claim 10, further comprising:
displaying a group buying offer to the user from among a plurality of group buying offers.

18. The method of claim 10, wherein the designations from the partner are in the form of abstract terms.

19. The method of claim 10, wherein the product/service characteristics repository is further configured to store display schemes provided by a plurality of different and non-affiliated partners.

20. The method of claim 19, wherein the display schemes provided by a plurality of different and non-affiliated partners include a carousel display, a shuffle display, or a random display.

21. A system for filtering network buying cooperative products/services for selection and displaying products/services to customers linked to a network buying cooperative website from a partner website, comprising:
a partner identification data receiver configured to receive identification data for a partner for the partner website, wherein the partner is any of a plurality of different and nonaffiliated partners;
a product/service category receiver configured to receive product/service identification data and category data for the partner website, wherein the partner is any of a plurality of different and nonaffiliated partners, and wherein the product/service identification data and category data is adapted for use in determining a set of network buying cooperative products/services suitable for selection and display to customers linked from the partner website; and
a terms receiver configured to receive abstract terms related to network buying cooperative products/services from the partner website and use the received abstract terms to select a set of network buying cooperative products/services suitable for selection and display to the customers.

22. The system of claim 21, further comprising:
an exclusivity receiver configured to receive instructions from a partner indicating whether the product/service category receiver should be disabled.

23. The system of claim 21, further comprising:
a display receiver configured to receive instructions from a partner regarding the selection of network buying cooperative products/services to display to the customers.

24. The system of claim 23, wherein the display receiver has been configured to receive instructions for one of a carousel display, shuffle display, or random display.

25. A system for selecting from a plurality of products/services which products/services to display to a user, the system comprising:
a product/service characteristics repository configured to store descriptions of products/services from a plurality of different and non-affiliated partners, the descriptions comprising designations from a partner of which products/services to make available to users of a partner website;
a product/service display website configured to display products/services to a user of the partner website who accesses the product/service display website from the partner website, wherein the offers displayed to the user depend on the partner website from which the product/service display website is accessed; and
a rules engine configured to access the product/service characteristics repository and select, based on the partner website from which a user accesses the product/service display website and any designations made by the partner and stored in the repository, which of a plurality of products/services to display to the user.

26. The system of claim 25, further comprising:
a display selector configured to select a product/service to display to a user from among a plurality of products/services.

27. The system of claim 25, further comprising:
a setup tool configured to allow a partner to remotely access the product/service characteristics repository and select a set of products/services for display to customers accessing the product/service display website from the partner website.

28. The system of claim 25, further comprising:
a setup tool configured to aid sellers in adding product/service characteristics to the product/service characteristics repository.

29. The system of claim 25, further comprising:
a group communication medium configured to allow a user to communicate with other users on the partner website.

30. The system of claim 29, wherein the group communication medium is at least one of a message board or a chat facility.

31. A method of selecting from a plurality of products/services which products/services to display on a product/service display website, the method comprising:
providing a product/service characteristics repository configured to store descriptions of products/services from a plurality of different and non-affiliated partners, the descriptions comprising designations from a partner of which products/services offers to make available to users of a partner website;
supplying a link to a product/service display website to the partner based on designations made by the partner through which a user of the partner website can access the product/service display website; and
selecting based on the partner website from which a user accesses the and any designations made by the partner and stored in the repository which of a plurality of products/services to display to the user.

32. The method of claim 31, further comprising displaying one product/service to the user from among a plurality of products/services.

33. The method of claim 31, further comprising:
providing a setup tool that allows a partner to remotely access the product/service characteristics repository and select a set of products/services for display to users accessing the product/service display website from the partner website.

34. The method of claim 31, further comprising:
providing a setup tool configured to allow a partner to remotely access the product/service characteristics repository and add product/service characteristics to the repository.

35. The method of claim 31, wherein the product/service display website is a World Wide Web site.

36. A system for designating among a plurality of group buying offers which offers to display on a website, the system comprising:
a product/service characteristics repository configured to store descriptions of product/service group buying offers from a plurality of different and non-affiliated partners, the descriptions comprising designations made by a plurality of different and non-affiliated partners of which of the group buying offers to make available to users of a partner website, wherein the plurality of group buying offers includes at least one group buying offer that is exclusively available to users associated with a single specific partner;
a network buying cooperative website configured to display group buying offers to a user of a partner website who accesses the cooperative website from the partner website, wherein the group buying offers displayed to the user depend on the partner website from which the cooperative website is accessed; and
a rules engine configured to access the product/service characteristics repository and select, based on the partner website from which a user accesses the cooperative website and any designations made by the partner and stored in the repository, which of a plurality of group buying offers to display to the user, wherein at least one group buying offer is available for display exclusively to users accessing the cooperative website from the partner website.

37. A method of designating among a plurality of group buying offers which offers to display on a website, the method comprising:
providing a product/service characteristics repository configured to store descriptions of product/service group buying offers from a plurality of different and non-affiliated partners, the descriptions comprising designations from a partner of which of the group buying offers to make available to users of a partner website, wherein the plurality of group buying offers includes at least one group buying offer exclusively available to users of the partner website;
supplying a link to a network buying cooperative website to the partner based on the designations made by the partner through which a user of the partner website can access the cooperative website;
selecting based on the partner website from which a user accesses the cooperative website and any designations made by the partner and stored in the repository which of a plurality of group buying offers to display to the user; and
displaying the at least one group buying offer exclusively available to users of the partner website.

38. A computer-readable medium having computer-executable instructions for performing the steps of selecting from a plurality of group buying offers which offers to display on a website, the medium comprising:
providing a product/service characteristics repository configured to store descriptions of product/service offers from a plurality of different and non-affiliated partners, the descriptions comprising designations from a partner of which of the group buying offers to make available to users of a partner own website;
supplying a link to a group buying cooperative website to the partner based on the designations made by the partner through which a user of the partner website can access the cooperative website; and
selecting, based on the partner website from which a user accesses the cooperative website and any designations made by the partner and stored in the repository which of a plurality of group buying offers to display to the user.

39. A system for adding product/service offers to a network buying cooperative website configured to select products/services for customers visiting a partner website, comprising:
a seller identification data receiver configured to receive seller identification data for a seller of offered products/services;
a product/service data receiver configured to receive products/services identification data for offered products/services;
a maximum quantity receiver configured to receive maximum sale quantity data for offered products/services;
an initial price receiver configured to receive an initial price for an offered products/services; and
a terms receiver configured to receive abstract terms related to offered product/services from a partner, wherein the partner is any of a plurality of different nonaffiliated partners, and wherein the abstract terms are adapted for use by the cooperative website to select product/service offers to display to a customer visiting the partner website.

40. A method for displaying products/services to a customer of a plurality of customers linked to a display website from a partner website of a plurality of partner websites, comprising:
receiving a link from the customer of the plurality of customers at the partner website of the plurality of partner sites wherein the partner is one of a plurality of different and nonaffiliated partners;
examining a data repository to determine an exclusive product/services set previously selected for customer viewing at the partner website using partner website exclusivity data provided by the partner;
identifying products/services in the exclusive product/service set that are presently offered for sale; and
selecting one product/service of the identified product/services for display to the customer consistent with the exclusivity data provided by the partner.

* * * * *